US006492316B1

(12) United States Patent
Herbots et al.

(10) Patent No.: US 6,492,316 B1
(45) Date of Patent: Dec. 10, 2002

(54) CLEANING COMPOSITIONS COMPRISING A CYTOCHROME

(75) Inventors: Ivan Maurice Alfons Jan Herbots, Wetteren (BE); Alfred Busch, Londerzeel (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/462,612

(22) PCT Filed: Jul. 9, 1997

(86) PCT No.: PCT/US97/12446

§ 371 (c)(1),
(2), (4) Date: Jan. 10, 2000

(87) PCT Pub. No.: WO99/02641

PCT Pub. Date: Jan. 21, 1999

(51) Int. Cl.[7] .............................. C11D 3/00; C11D 7/42; C12S 9/00

(52) U.S. Cl. ........................ 510/392; 510/392; 510/300; 510/305; 510/320; 510/374; 510/306; 510/530; 435/189

(58) Field of Search ................................. 510/392, 300, 510/305, 306, 320, 374, 530, 114; 435/189

(56) References Cited

U.S. PATENT DOCUMENTS

| | | | | |
|---|---|---|---|---|
| 3,802,997 A | | 4/1974 | Messing | 195/68 |
| 5,413,915 A | * | 5/1995 | Case et al. | 435/25 |
| 5,420,027 A | * | 5/1995 | Fisher et al. | 435/189 |

FOREIGN PATENT DOCUMENTS

| | | | |
|---|---|---|---|
| EP | 136728 | 4/1985 | C07K/1/02 |
| WO | WO 96/10079 | 4/1996 | C12N/9/02 |

OTHER PUBLICATIONS

Roper, "Enhanced Enzymatic Removal of Chlorophenols in the Presence of Co–Substrates", *Wat. Res.* vol 29, No. 12, pp. 2720–2724, Mar. 1995.
Shuttleworth, K.KL et al., "Soluble and immobilized laccase as catalysts for the transformation of substituted phenols", *Enzyme Microb. Technol.*, vol. 8, pp. 171–177, Mar. 1986.
Roper, J. Chadwick et al., "Enhanced enzymic removal of chlorophenols in the presence of co–substrates", Chem abstracts, vol. 123, No. 22, p. 677, The Abstract No. 295447h, Nov. 27, 1993, Columbus, OH, USA.
Shingo Kawai et al., Wood Research Abstract, "Oxidation of Methoxylated Benzyl Alcohols by Laccase of Coriolus Versicolor in the Presence of Syringaldehyde", vol. 76, p. 10–11, Aug. 31, 1989.

* cited by examiner

*Primary Examiner*—Yogendra N. Gupta
*Assistant Examiner*—Eisa Elhilo
(74) *Attorney, Agent, or Firm*—Frank Taffy; Kim W. Zerby; Steve M. Miller

(57) ABSTRACT

Cleaning compositions, including laundry, dishwashing, hard surface and/or oral/dental compositions comprising a cytochrome, particularly cytochrome P450. Said compositions provide effective and efficient cleaning of colored and/or everyday body stains and/or soils and provide sanitization of the treated surfaces. When formulated into a laundry detergent composition, the present invention provides fabric realistic item cleaning and enhanced whitening.

28 Claims, No Drawings

CLEANING COMPOSITIONS COMPRISING A CYTOCHROME

FIELD OF THE INVENTION

The present invention relates to cleaning compositions, including laundry, dishwashing, hard surface cleaner, oral/dental cleaning compositions, comprising a cytochrome enzyme.

BACKGROUND OF THE INVENTION

Performance of a cleaning product, for use in washing or cleaning method, is judged by a number of factors, including the ability to remove soils, and the ability to prevent the redeposition of the soils, or the breakdown products of the soils on the articles in the wash.

Coloured stains/soils are often difficult to remove effectively from a soiled item. Highly coloured stains and soils i.e. derived from fruit and/or vegetables are particularly challenging soils to remove. This stains and soils contain colour-bodies based on carotenoids compounds such as α-, β- and γ-carotene and lycopene and xanthophyls, on porphyrins such as chlorophyll and on flavonoid pigments and dye components. This latter group of natural flavonoid based dye components comprises the highly coloured anthocyanins dyes and pigments based on pelargonidin, cyanidin, delphidin and their methyl esters and the antoxanthins. These compounds are the origin of most of the orange, red, violet and blue colours occurring in fruits and are abundant in all berries, cherry, red and black currents, grapefruits, passion fruit, oranges, lemons, apples, pears, pommegranate, red cabbage, red beets and also flowers. Derivatives of cyanidin are present in up to 80% of the pigmented leaves, in up to 70% of fruits and in up to 50% of flowers. Specific examples of such soils would include tea, coffee, spices such as curry and paprika, orange, tomato, banana, tea, mango, broccoli, carrot, beetroot, spinach soils and grass. Ball pens' ink are also known to be highly difficult coloured stains to be removed.

In addition, the complex nature of everyday "body" soils typically found on pillow cases, T-shirts, collars and socks, provides a continuous thorough cleaning challenge for detergents. These soils are difficult to remove completely and often residues build up on fabric leading to dinginess and yellowing. Everyday body soils are also found on sanitary and kitchen surfaces such as bathtubs, toilet bowl and dishware.

The items can be fabrics, hard surfaces, dishware such as plasticware, glassware or chinaware, teeth and mouth.

Traditionally, high levels of bleaching compounds, optionally with bleach precursors and/or bleach enhancers, are incorporated in detergent compositions. Bleaching agents are compounds which are precursors of hydrogen peroxide which is formed in the course of the washing procedure. Perborates and percarbonates are the most important examples of such hydrogen peroxide precursors.

In view of the above, there exits clearly a continuous need to provide cleaning compositions which have an excellent detergency performance. Accordingly it is an object of the present invention to provide a cleaning composition which provides effective and efficient cleaning of coloured and/or everyday body stains and/or soils. It is a further object to provide a cleaning composition which provides fabric realistic items cleaning and whitening.

The above objective has been met by formulating cleaning compositions comprising a cytochrome, especially a cytochrome P450.

It has been surprisingly found that a cytochrome, especially a cytochrome P450, based enzymatic bleach system delivers in a cleaning composition, bleach-like benefits in an unexpected broad range of performance areas such as dingy cleaning, whiteness maintenance and stain removal. It has also been found that the cleaning compositions of the present invention provide sanitisation of the treated surfaces. It has been further found that the performance of the cleaning compositions of the present invention is enhanced by the addition of another enzymatic bleach system, a conventional activated bleach system, a metallo catalyst based bleach system and/or another detergent enzyme.

In a preferred embodiment, the present invention relates to a laundry and/or fabric care composition comprising a cytochrome, especially a cytochrome P450, further providing fabric realistic items cleaning and whitening. In a second embodiment, the present invention relates to dishwashing or household cleaning compositions comprising a cytochrome, especially a cytochrome P450 and in a third embodiment, the present invention relates to oral/dental care compositions comprising a cytochrome, especially a cytochrome P450.

Cytochrome enzymes have been extensively described in the art mainly in the medical context (U.S. Pat. No. 5,607,691, U.S. Pat. No. 5,604,198, RU2 063 758) and in biotechnological applications (J09 028 373, RU2 063 985). In particular, cytochrome P450 enzymes have been described for pharmaceutical applications such as in the recently published WO97/01349, WO96109042, WO96/04789 and WO95/34679. Cytochrome P450 are also used in analytical methods for testing cytotoxicity (U.S. Pat. No. 5,525,482), safety of a compound (J08056695) or identifying specific drugs (WO95/30766).

However, the use of cytochrome, especially cytochrome P450 in a cleaning composition, has never been previously recognised.

SUMMARY OF THE INVENTION

The present invention relates to cleaning compositions, including laundry, fabric care, dishwashing, hard surface cleaner, oral/dental cleaning compositions, comprising a cytochrome, especially a cytochrome P450. Said compositions provide effective and efficient cleaning of coloured and/or everyday body stains and/or soils and provide sanitisation of the treated surfaces. In particular, the composition of the present invention provides fabric realistic items cleaning and whitening when formulated as laundry detergent compositions.

DETAILED DESCRIPTION OF THE INVENTION

Essential components of the cleaning compositions of the present invention are a cytochrome, especially a cytochrome P450, and its electron transfer system. It has been found that the cleaning compositions of the present invention provide effective and efficient cleaning of coloured and everyday body stains and/or soils and in particular provide fabric realistic items cleaning and whitening when formulated as a laundry detergent composition.

Without wishing to be bound by theory, it is believed that "everyday body soils" contain sebum excreted by the human body. Sebum is believed to contain large quantities of saturated and unsaturated fatty acids, sterols and sterols esters (The physiology and Pathology of the skin, Vol. 9, A. Jarret, (1986)). The fragmentation of the substrate and the formation of ionizable groups or hydrophilic substituents by a cytochrome enzyme renders the enzymatic reaction products more soluble and hence easier to be removed from the soiled items.

Without wishing to be bound by theory, it is believed that the cytochromes can react with a broad range of organic compounds catalysing diverse reaction such as oxidative Carbon-Carbon bond cleavage; hydrocarbon hydroxylation; alkene epoxidation and oxygenation; arene epoxidation; N—,S— and O-dealkylations; N— and S-oxidation; oxidative and reductive dehalogenation; oxidations of alcohols and aldehydes; de-hydrogenation reactions; dehydration; reduction of N-oxides and epoxides and isomerisations.

Coloured plant and fruit stains contain highly coloured colour-bodies associated with cell wall constituents. These natural dye components are based on highly conjugated poly-aromatic compounds. It is believed that the colour of these materials fades upon oxidation by the cytochrome due to disruption of the colour-forming conjugated system in the compound.

In addition, the cleaning compositions of the present invention provide sanitisation of the treated surfaces.

Sanitisation includes all positive effects obtained by the inhibition or reduction of microbial activity on fabrics and other surfaces, such as the prevention of malodour development and bacterial/fungal growth. For example, it provides prevention of malodour development on stored and weared fabrics, on stored dishware, especially plastic kitchen gear and in toilets. In particular, the composition of the invention will inhibit or at least reduce the bacterial and/or fungal development on moist fabric waiting for further laundry processing and thereby preventing the formation of malodour. In addition, bacterial and/or fungal growth on hard surfaces such as tiles and their silicone joints, sanitary installations, will be prevented.

The sanitisation potential of the cleaning compositions of the present invention can be enhanced by the addition of chemical sanitisers such as Triclosan and/or hexemidine. Parfums Cosmétiques Actualités No 125, November 1995, 51–4 describes suitable chemical sanitisers.

The sanitisation benefits of the cleaning compositions of the present invention can be evaluated by the Minimum Inhibitory Concentration (MIC) as described in Tuber. Lung. Dis. 1994 August; 75(4):286–90; J. Clin. Microbiol. 1994 May; 32(5):1261–7 and J. Clin. Microbiol. 1992 October; 30(10):2692–7.

The Cytochrome Enzymes

Cytochrome enzymes are heme containing proteins involving the transfer of reducing equivalents associated with a reversible change in the oxidation state of the prosthetic group. The oxidation state change involves a single electron, reversible equilibrium between the Fe(II) and Fe(III) states of the central iron atom. The term "heme" is usually understood as "any tetrapyrrolic chelate of Iron". Four major groups of cytochrome are currently recognised:

Cytochrome a: cytochrome in which the heme prosthetic group is heme a, i.e. the iron chelate of cytoporphyrin IX. Examples are al (Nitrobacter agilis) and aa3 (two heme groups low-spin a and high spin a3).

Cytochrome b: cytochrome with protoheme (the iron chelate of cytoporphyrin IX) as prosthetic group but which lacks a covalent bond between the porphyrin and the protein. Examples are b1 (*E.coli*); b2 (yeast; EC 1.1.2.3); b3 (non-photosynthetic plants); b5 (animal microsomes, cytoplasm of erythrocytes); b6 or B-563 (green plants, photosynthetic bacteria); b7 (Arum species); b8 (*E.coli*); b';b-562 (white blood cell); b-559 (green plants); P450s-super family.

Cytochrome c: cytochrome with covalent thioether linkages between either or both of the vinyl sides chains of protoheme side chains and the protein. Examples are c, c1 and c2 (eukaryotic mitochondria); c3 (anaerobic sulphate- and sulphur reducing bacteria); c-552 (*E.coli*); c4 (Azotobacter and Pseudomonas species); c5 (Azotobacter species); c6 (algae); c-551 (Pseudomonas); c-555 (green bacteria Chlorobium).

Cytochrome d: cytochrome with a tetrapyrrolic chelate of iron as a prosthetic group in which the degree of conjugaison of double bonds is less than in porphyrin. Examples are d (aerobic bacteria; *E.coli* and Areobacter species). Cytochromes of the above listed classes can form mixed complexes e.g.: bc complex in green plants (also called Cytochrome f); bd complex (*Photobacterium phosphoreum* and *E. coli*); cd1 complex (denitrifying bacteria Pseudomonas-, Paracoccus- and Thiobacillus species).

Other metal ions can replace the iron in the heme-group e.g. vanadium, molybdenum, nickel and cobalt.

The cytochrome enzyme is incorporated into the cleaning compositions in accordance with the invention preferably at a level of from 0.0001% to 2%, more preferably from 0.001% to 0.5%, most preferably from 0.005% to 0.1% pure enzyme by weight of the composition.

Preferred cytochromes for specific applications are alkaline cytochromes, i.e. enzymes having an enzymatic activity of at least 10%, preferably at least 25%, more preferably at least 40% of its maximum activity at a pH ranging from 7 to 12. More preferred cytochromes are enzymes having their maximum activity at a pH ranging from 7 to 12.

Suitable cytochromes for the purpose of the present invention are all the naturally occurring cytochromes of procaryotic and eucaryotic organisms or therein expressed. Examples are the following (Microbial Enzymes for oxidation of organic molecules, F. Sima Sariaslani in Critical Reviews in Biotechnology, Vol 9, Issue 3 (1989)). Examples are:

1. Procaryotic organisms:

Bacterial: *Pseudomonas putida, Pseudomonas putida* PpG777*, Pseudomonas putida* 777 var. *incognita, Bacillus megaterium* ATCC13368*, Bacillus megaterium* ATCC 14581), *E.coli* cloned, *Rhodococcus rhodcoccus* ATCC 19067 (former Corynebacterium strain 7EIC), Nocardia NH1*, Acinetobacter calcoacetica*, Xanthobacter species and Moraxella species.

Actinomyces: *Saccharoployspora erythraea, Streptomyces setonii, Streptomyces griseolus* and Streptomyces-griseus (ATCC 13273).

2. Eucaryotic organism:

*Cyanidinium caldarium* (red algae), *Apergillus ochraceus, Cunninghamella bainieri, Saccharomyces cerevisiae, Fusariom oxysporum, Candida tropicalis, Nectria haematococca.*

Preferred for the purpose of the present invention are the cytochrome P450 enzymes. The cytochromes of the P450 super family have been characterised as a class of heme-thiolate proteins of the cytochrome b group. With their oxygen-transfer characteristic mode of action the cytochrome P450 family is an exception to the characteristic mode of electron-transfer of cytochromes.

Cytochromes P450 are distinct multi-components heme enzymes which play a central role in the oxidative reactions in biological systems and therefore have been extensively studied. For example, Critical Review in Biotechnology, Vol. 9, Issue 3 (1989) pp 215–227, F. S. Sariasiani and H. Dalton—Chem. Rev., Vol. 96, No. 7, (1996), 2841–2087, M. Sono, M. P. Roach, E. D. Coulter and J. H. Dawson. These enzymes are similar to other classic monooxygenases in performing the AND(P)H-dependant oxidation of a diverse array of organic molecules through cleavage of dioxygen, yielding one molecule of water and the oxidised substrate. Cytochrome P450 substrates are diverse and include physiological substrates such as steroids, hydrocarbons, vitamins and fatty acids, as well as xenobiotic such as drugs, pesticides and carcinogens. Several reactions are catalysed by cytochromes P450 such as hydroxylation, dehalogenation, dealkylation, N-oxide reduction, N-oxidation, epoxidation, deamination, desulfuration and sulfoxidation (FIG. 3. Chem. Rev., Vol. 96, No. 7, (1996) p2845).

Suitable cytochromes P450 are the enzymes encompassed in the EC classification under the references EC 1.14.13, EC 1.14.14, EC 1.14.15 and EC 1.14.99. Examples are:

| | |
|---|---|
| 1.14.13.11 | trans-cinnamate 4-monooxygenase |
| 1.14.13.17 | cholesterol 7alfa-monooxygenase |
| 1.14.13.28 | 3,9-dihydroxypterocarpan 6a-monooxygenase |
| 1.14.13.30 | leukotriene-b4 20-monooxygenase |
| 1.14.13.37 | methyltetrahydroprotoberberine 14-monooxygenase |
| 1.14.13.41 | tyrosine N-monooxygenase |
| 1.14.13.42 | hydroxyphenylacetonitrile 2-monooxygenase |
| 1.14.13.47 | Limonene 3-monooxygenase |
| 1.14.13.48 | Limonene 6-monooxygenase |
| 1.14.13.49 | Limonene 7-monooxygenase |
| 1.14.13.52 | Isoflavone 3'-hydroxylase |
| 1.14.13.53 | Isoflavone 2'-hydroxylase |
| 1.14.14.1 | Unspecific monooxygenase |
| 1.14.15.1 | Camphor 5-monooxygenase |
| 1.14.15.3 | alkane 1-monooxygenase |
| 1.14.15.4 | steroid 11beta-monooxygenase |
| 1.14.15.6 | Cholesterol-monooxygenase (side chain cleaving) |
| 1.14.99.9 | Steroid 17alfa-monooxygenase |
| 1.14.99.10 | Steroid 21-monooxygenase |
| 1.14.99.22 | Ecdyson 20-monooxygenase |
| 1.14.99.28 | Linalool 8-monooxygenase |

A preferred cytochrome P450 for the present invention is the cytochrome P450 bm3 enzyme type which catalyses the hydroxylation of saturated and monounsaturated fatty acids, alcohol's and amides. These enzymes are unique self-sufficient cytochromes P450, comprising both a heme group containing the P450 domain and a flavoprotein NADPH-cytochrome P450 reductase and therefore do not require an electron carrier. Moreover, these enzymes have a significantly larger substrate binding domain versus other cytochromes P450.

Enzymes homologue to the cytochrome enzymes of the present invention are also contemplated. The term "homologue" is intended to indicate a polypeptide encode by DNA which hybridises to the same probe as the DNA coding for the cytochrome enzyme with this amino acid sequence under certain specific conditions (such as presoaking in 5×SSC and prehybridising for 1 h at ~40° C. in a solution of 20% formamide, 5×Denhardt's solution, 50 mM sodium phosphate, pH 6.8, and 50 $\mu$g of denaturated sonicated calf thymus DNA, followed by hybridisation in the same solution supplemented with 100 $\mu$M ATP for 18 h at ~40° C.). The term is intended to include derivatives of the cytochrome enzyme sequence obtained by addition of one or more amino acid residues to either or both the C- and N-terminal of the native sequence, substitution of one or more amino acid residues at one or more sites in the native sequence, deletion of one or more amino acid residues at either or both ends of the native amino acid sequence or at one or more sites within the native sequence, or insertion of one or more amino acid residues at one or more sites of the native sequence.

The above-mentioned enzymes may be of any suitable origin, such as vegetable, animal, bacterial, fungal and yeast origin. Origin can further be mesophilic or extremophilic (psychrophilic, psychrotrophic, thermophilic, barophilic, alkalophilic, acidophilic, halophilic, etc.). Purified or non-purified forms of these enzymes may be used. Nowadays, it is common practice to modify wild-type enzymes via protein I genetic engineering techniques in order to optimise their performance efficiency in the cleaning compositions of the invention. For example, the variants may be designed such that the compatibility of the enzyme to commonly encountered ingredients of such compositions is increased. Alternatively, the variant may be designed such that the optimal pH, bleach or chelant stability, catalytic activity and the like, of the enzyme variant is tailored to suit the particular cleaning application.

In particular, attention should be focused on amino acids sensitive to oxidation in the case of bleach stability and on surface charges for the surfactant compatibility. The isoelectric point of such enzymes may be modified by the substitution of some charged amino acids, e.g. an increase in isoelectric point may help to improve compatibility with anionic surfactants. The stability of the enzymes may be further enhanced by the creation of e.g. additional salt bridges and enforcing calcium binding sites to increase chelant stability.

The Electron Transfer System

The cytochrome based enzymatic bleaching system requires the presence of an electron transfer system comprising an electron donor compound and an electron carrier.

The electron donor compound is an essential element of the cleaning compositions of the present invention and is comprised in the cleaning compositions of the present invention generally at a level of from $10^{-6}$% to 15%, preferably from $10^{-5}$% to 5%, more preferably from 0.0001% to 1% by weight of total composition. The weight ratio of pure cytochrome enzyme to electron donor compound is preferably comprised between 10:1 and 1:1000, more preferably between 2:1 and 1:100, most preferably between 1:1 and 1:10. Potential electron donor compounds are NADH : nicotine amide adenine dinucleotide (reduced), NADPH: nicotine amide adenine dinucleotide phosphate (reduced) and/or sodium sulphite as described in U.S. Pat. No. 5,362,856 of the University of Toronto Innovations Found.

The electron carriers co-operating with the cytochromes are flavoproteins, proteins containing reducible disulfide groups, iron proteins, copper proteins, molybdenum proteins, nickel proteins , vanadium proteins and quino proteins. The flavoproteins commonly contain one of two prosthetic groups, FMN: flavine mononucleotide and FAD: flavine adenine dinucleotide and these proteins have oxidoreductase activity. The iron proteins are mostly iron-sulfur proteins such as rubredoxin and/or ferredoxin reductase. The electron carrier is comprised in the cleaning compositions of the present invention generally at a level of from 0.0001% to 2%, preferably 0.001% to 0.5%, more preferably 0.005% to 0.1% by weight of total composition. The weight ratio of pure cytochrome enzyme to electron carrier is preferably comprised between 10:1 and 1:1000, more preferably between 2:1 and 1:100, most preferably between 1:1 and 1:10.

These AND(P)H, reduced flavin or flavoproteins or any other suitable electron acceptor compatible with the cytochrome enzymes can be (re-) generated enzymatically through an enzymatic reaction:

Oxidoreductase

AH+NADP+→A++NADPH

Any oxidoreductase that uses AND(P)+ as electron acceptor in the enzymatic oxidation of an organic subtrate is suitable. This substrate can be the reaction product of the main reaction of the cytochrome itself. Suitable oxidoreductases are:

E.C. 1.1.1.x, members acting on alchols such as alcohol dehydrogenases e.g. 1.1.1.2 forming aldehydes reaction products.

E.C. 1.2.1.x members acting on aldehydes such as aldehyde dehydrogenase e.g. 1.2.1.4 forming organic acids.

E.C. 1.8.1.2 a sulfite reductase converting hydrogen sulfide in sulfite. Single enzymes or mixtures e.g of alcohol- and aldehyde- dehydrogenases can be applied.

Similarly, the majority of the cytochrome P450 systems are multicomponent, requiring the involvement of additional proteins for transport of reducing equivalents from AND (P)H to the terminal cytochrome P450 component. These systems have been divided into two types based on the nature and organisation of their redox components. Type I systems, which have been identified in the cytoplasmic reticulum of eucaryotic systems, consists of FAD- and FMN-containing reductases that transport reducing electron from NADPH to cytochrome P450. Type II systems , which have been detected in mitochondria and bacterial systems, consist of FAD-containing reductases that transfer electron from AND(P)H to the terminal cytochrome P450 through the intermediacy of a small redox iron-sulfur (ferredoxin) protein AS exemplified in FIG. 38 page 216 in Critical Review in Biotechnology, Vol. 9, Issue 3 (1989), F. S. Sariaslani and H. Dalton.

In catalysing monooxygenation reactions, the cytochrome P450 enzymes are able to use either NADP or NADPH as electron donor according the following reaction scheme in which R is the substrate to be oxidised:

$$RH+O_2+NAD(P)H+H^+ \rightarrow ROH+H_2O+NAD(P)^+$$

Detergent Components

The cleaning compositions of the present invention may also contain additional detergent components. The precise nature of these additional components, and levels of incorporation thereof will depend on the physical form of the composition, and the nature of the cleaning operation for which it is to be used.

The cleaning compositions preferably further comprise another enzymatic bleach system, a conventional activated bleach system, a metallo catalyst based bleach system and/or another detergent enzyme.

in a preferred embodiment, the present invention relates to a laundry and/or fabric care composition comprising a cytochrome (Examples 1–18). In a second embodiment, the present invention relates to dishwashing or household cleaning compositions including sanitisation compositions (Examples 19–28). and in a third embodiment, the present invention relates to oral/dental care compositions (Examples 29–31).

The cleaning compositions according to the invention can be liquid, paste, gels, bars, tablets, spray, foam, powder or granular forms. Granular compositions can also be in "compact" form, the liquid compositions can also be in a "concentrated" form.

The compositions of the invention may for example, be formulated as hand and machine dishwashing compositions, hand and machine laundry detergent compositions including laundry additive compositions and compositions suitable for use in the soaking and/or pretreatment of stained fabrics, rinse added fabric softener compositions, and compositions for use in general household hard surface cleaning operations. Compositions containing such cytochrome can also be formulated as oral/dental care compositions.

When formulated as compositions for use in manual dishwashing methods the compositions of the invention preferably contain a surfactant and preferably other detergent compounds selected from organic polymeric compounds, suds enhancing agents, group II metal ions, solvents, hydrotropes and additional enzymes.

When formulated as compositions suitable for use in a laundry machine washing method, the compositions of the invention preferably contain both a surfactant and a builder compound and additionally one or more detergent components preferably selected from organic polymeric compounds, bleaching agents, additional enzymes, suds suppressors, dispersants, lime-soap dispersants, soil suspension and anti-redeposition agents and corrosion inhibitors. Laundry compositions can also contain softening agents, as additional detergent components.

Such compositions containing cytochrome can provide fabric cleaning, stain removal, whiteness maintenance, softening, color appearance, dye transfer inhibition and sanitisation when formulated as laundry detergent compositions.

The compositions of the invention can also be used as detergent additive products. Such additive products are intended to supplement or boost the performance of conventional detergent compositions.

If needed the density of the laundry detergent compositions herein ranges from 400 to 1200 g/liter, preferably 600 to 950 g/liter of composition measured at 20° C.

The "compact" form of the compositions herein is best reflected by density and, in terms of composition, by the amount of inorganic filler salt; inorganic filler salts are conventional ingredients of detergent compositions in powder form; in conventional detergent compositions, the filler salts are present in substantial amounts, typically 17–35% by weight of the total composition.

In the compact compositions, the filler salt is present in amounts not exceeding 15% of the total composition, preferably not exceeding 10%, most preferably not exceeding 5% by weight of the composition.

The inorganic filler salts, such as meant in the present compositions are selected from the alkali and alkaline-earth-metal salts of sulphates and chlorides.

A preferred filler salt is sodium sulphate.

Liquid detergent compositions according to the present invention can also be in a "concentrated form", in such case, the liquid detergent compositions according the present invention will contain a lower amount of water, compared to conventional liquid detergents.

Typically the water content of the concentrated liquid detergent is preferably less than 40%, more preferably less than 30%, most preferably less than 20% by weight of the detergent composition.

Conventional Detergent Enzymes

The cleaning compositions of the present invention can in addition to the cytochrome enzyme further comprise one or more enzymes which provide cleaning performance, fabric care and/or sanitisation benefits. It has been found that the combination of the cytochrome with detergent enzyme provides improved cleaning of coloured and/or everyday body stains and/or soils and when formulated as laundry composition, improved fabric realistic items cleaning and whitening.

Said enzymes include enzymes selected from cellulases, hemicellulases, peroxidases, proteases, gluco-amylases, amylases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase or mixtures thereof.

A preferred combination is a cleaning composition having cocktail of conventional applicable enzymes like protease, amylase, lipase, cutinase and/or cellulase in conjunction with one or more plant cell wall degrading enzymes.

The cellulases usable in the present invention include both bacterial or fungal cellulases. Preferably, they will have a pH optimum of between 5 and 12 and an activity above 50 CEVU (Cellulose Viscosity Unit). Suitable cellulases are disclosed in U.S. Pat. No. 4,435,307, Barbesgoard et al, J61078384 and WO96102653 which discloses fungal cellulase produced respectively from Humicola insolens, Trichoderma, Thielavia and Sporotrichum. EP 739 982 describes cellulases isolated from novel Bacillus species. Suitable cellulases are also disclosed in GB-A-2.075.028; GB-A-2.095.275; DE-OS-2.247.832 and WO95/26398.

Examples of such cellulases are cellulases produced by a strain of *Humicola insolens* (*Humicola grisea* var. *thermoidea*), particularly the Humicola strain DSM 1800.

Other suitable cellulases are cellulases originated from Humicola insolens having a molecular weight of about 50 KDa, an isoelectric point of 5.5 and containing 415 amino acids; and a 43 kD endoglucanase derived from Humicola insolens, DSM 1800, exhibiting cellulase activity; a preferred endoglucanase component has the amino acid sequence disclosed in PCT Patent Application No. WO 91/17243. Also suitable cellulases are the EGIII cellulases from *Trichoderma longibrachiatum* described in WO94121801, Genencor, published Sep. 29, 1994. Especially suitable cellulases are the cellulases having color care benefits. Examples of such cellulases are cellulases described in European patent application No. 91202879.2, filed Nov. 6, 1991 (Novo). Carezyme and Celluzyme (Novo Nordisk ANS) are especially useful. See also WO91117244 and WO91/21801. Other suitable cellulases for fabric care and/or cleaning properties are described in WO96134092, WO96/17994 and WO95/24471.

Said cellulases are normally incorporated in the detergent composition at levels from 0.0001% to 2% of active enzyme by weight of the detergent composition.

Other preferred enzymes that can be included in the detergent compositions of the present invention include lipases. Suitable lipase enzymes for detergent usage include those produced by microorganisms of the Pseudomonas group, such as Pseudomonas stutzeri ATCC 19.154, as disclosed in British Patent 1,372,034. Suitable lipases include those which show a positive immunological cross-reaction with the antibody of the lipase, produced by the microorganism *Pseudomonas fluorescent* IAM 1057. This lipase is available from Amano Pharmaceutical Co. Ltd., Nagoya, Japan, under the trade name Lipase P "Amano," hereinafter referred to as "Amano-P". Other suitable commercial lipases include Amano-CES, lipases ex *Chromobacter viscosum*, e.g. *Chromobacter viscosum* var. *lipolyticum* NRRLB 3673 from Toyo Jozo Co., Tagata, Japan; *Chromobacter viscosum* lipases from U.S. Biochemical Corp., U.S.A. and Disoynth Co., The Netherlands, and lipases ex *Pseudomonas gladioli*. Especially suitable lipases are lipases such as M1 Lipase$^R$ and Lipomax$^R$ (Gist-Brocades) and Lipolase$^R$ and Lipolase Ultra$^R$(Novo) which have found to be very effective when used in combination with the compositions of the present invention. Also suitables are the lipolytic enzymes described in EP 258 068, WO 92/05249 and WO 95/22615 by Novo Nordisk and in WO 94103578, WO 95/35381 and WO 96/00292 by Unilever.

Also suitable are cutinases [EC 3.1.1.50] which can be considered as a special kind of lipase, namely lipases which do not require interfacial activation. Addition of cutinases to detergent compositions have been described in e.g. WO-A-88/09367 (Genencor); WO 90/09446 (Plant Genetic System) and WO 94/14963 and WO 94/14964 (Unilever).

The lipases and/or cutinases are normally incorporated in the detergent composition at levels from 0.0001% to 2% of active enzyme by weight of the detergent composition.

Suitable proteases are the subtilisins which are obtained from particular strains of *B. subtilis* and *B. licheniformis* (subtilisin BPN and BPN'). One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE®, DURAZYM® and SAVINASE® from Novo and MAXATASE®, MAXACAL®, PROPERASE® and MAXAPEM® (protein engineered Maxacal) from Gist-Brocades. Proteolytic enzymes also encompass modified bacterial serine proteases, such as those described in European Patent Application Serial Number 87 303761.8, filed Apr. 28, 1987 (particularly pages 17, 24 and 98), and which is called herein "Protease B", and in European Patent Application 199,404, Venegas, published Oct. 29, 1986, which refers to a modified bacterial serine protealytic enzyme which is called "Protease A" herein. Suitable is what is called herein "Protease C", which is a variant of an alkaline serine protease from Bacillus in which lysine replaced arginine at position 27, tyrosine replaced valine at position 104, serine replaced asparagine at position 123, and alanine replaced threonine at position 274. Protease C is described in EP 90915958:4, corresponding to WO 91/06637, Published May 16, 1991. Genetically modified variants, particularly of Protease C, are also included herein.

A preferred protease referred to as "Protease D" is a carbonyl hydrolase variant having an amino acid sequence not found in nature, which is derived from a precursor carbonyl hydrolase by substituting a different amino acid for a plurality of amino acid residues at a position in said carbonyl hydrolase equivalent to position +76, preferably also in combination with one or more amino acid residue positions equivalent to those selected from the group consisting of +99, +101, +103, +104, +107, +123, +27, +105, +109, +126, +128, +135, +156, +166, +197, +204, +206, +210, +216, +217, +218, +222, +260, +265, and/or +274 according to the numbering of *Bacillus amyloliquefaciens* subtilisin, as described in WO95/10591 and in the patent application of C. Ghosh, et al, "Bleaching Compositions Comprising Protease Enzymes" having U.S. Ser. No. 08/322,677, filed Oct. 13, 1994.

Also suitable for the present invention are proteases described in patent applications EP 251 446 and WO 91/06637, protease BLAP® described in WO91102792 and their variants described in WO 95/23221.

See also a high pH protease from Bacillus sp. NCIMB 40338 described in WO 93/18140 A to Novo. Enzymatic detergents comprising protease, one or more other enzymes, and a reversible protease inhibitor are described in WO 92103529 A to Novo. When desired, a protease having decreased adsorption and increased hydrolysis is available as described in WO 95/07791 to Procter & Gamble. A recombinant trypsin-like protease for detergents suitable herein is described in WO 94/25583 to Novo. Other suitable proteases are described in EP 516 200 by Unilever.

The proteolytic enzymes are incorporated in the detergent compositions of the present invention a level of from 0.0001% to 2%, preferably from 0.001% to 0.2%, more preferably from 0.005% to 0.1% pure enzyme by weight of the composition.

Amylases (αand/or β) can be included for removal of carbohydrate-based stains. WO94/02597, Novo Nordisk ANS published Feb. 3, 1994, describes cleaning compositions which incorporate mutant amylases. See also WO95/10603, Novo Nordisk A/S, published Apr. 20, 1995. Other amylases known for use in cleaning compositions include both α- and β-amylases. α-Amylases are known in the art and include those disclosed in U.S. Pat. No. 5,003,257; EP 252,666; WO/91/00353; FR 2,676,456; EP 285,123; EP 525,610; EP 368,341; and British Patent specification no. 1,296,839 (Novo). Other suitable amylases are stability-enhanced amylases described in WO94/18314, published Aug. 18, 1994 and WO96/05295, Genencor, published February 22, 1996 and amylase variants having additional modification in the immediate parent available from Novo Nordisk A/S, disclosed in WO 95/10603, published April 95. Also suitable are amylases described in EP 277 216, WO95/26397 and WO96/23873 (all by Novo Nordisk).

Examples of commercial α-amylases products are Purafect Ox Am® from Genencor and Termamyl®, Ban®, Fungamyl® and Duramyl®, all available from Novo Nordisk A/S Denmark. WO95/26397 describes other suitable amylases: α-amylases characterised by having a specific activity at least 25% higher than the specific activity of Termamyl® at a temperature range of 25° C. to 55° C. and at a pH value in the range of 8 to 10, measured by the Phadebas® α-amylase activity assay. Suitable are variants of the above enzymes, described in WO96/23873 (Novo Nordisk). Other amylolytic enzymes with improved properties with respect to the activity level and the combination of thermostability and a higher activity level are described in WO95/35382.

The amylolytic enzymes are incorporated in the detergent compositions of the present invention a level of from 0.0001% to 2%, preferably from 0.00018% to 0.06%, more preferably from 0.00024% to 0.048% pure enzyme by weight of the composition.

The above-mentioned enzymes may be of any suitable origin, such as vegetable, animal, bacterial, fungal and yeast origin. Origin can further be mesophilic or extremophilic (psychrophilic, psychrotrophic, thermophilic, barophilic, alkalophilic, acidophilic, halophilic, etc.). Purified or non-purified forms of these enzymes may be used. Also included by definition, are mutants of native enzymes. Mutants can be obtained e.g. by protein and/or genetic engineering, chemical and/or physical modifications of native enzymes. Common practice as well is the expression of the enzyme via host organisms in which the genetic material responsible for the production of the enzyme has been cloned.

Said enzymes are normally incorporated in the detergent composition at levels from 0.0001% to 2% of active enzyme by weight of the detergent composition. The enzymes can be added as separate single ingredients (prills, granulates, stabilized liquids, etc . . . containing one enzyme ) or as mixtures of two or more enzymes (e.g. cogranulates ).

Other suitable detergent ingredients that can be added are enzyme oxidation scavengers which are described in Copending European Patent application 92870018.6 filed on Jan. 31, 1992. Examples of such enzyme oxidation scavengers are ethoxylated tetraethylene polygamies.

A range of enzyme materials and means for their incorporation into synthetic detergent compositions is also disclosed in WO 9307263 A and WO 9307260 A to Genencor International, WO 8908694 A to Novo, and U.S. Pat. No. 3,553,139, Jan. 5, 1971 to McCarty et al. Enzymes are further disclosed in U.S. Pat. No. 4,101,457, Place et al, Jul. 18, 1978, and in U.S. pat. No. 4,507,219, Hughes, Mar. 26, 1985. Enzyme materials useful for liquid detergent formulations, and their incorporation into such formulations, are disclosed in U.S. Pat. No. 4,261,868, Hora et al, Apr. 14, 1981. Enzymes for use in detergents can be stabilised by various techniques. Enzyme stabilisation techniques are disclosed and exemplified in U.S. Pat. No. 3,600,319, Aug. 17, 1971, Gedge et al, EP 199,405 and EP 200,586, Oct. 29, 1986, Venegas. Enzyme stabilisation systems are also described, for example, in U.S. Pat. No. 3,519,570. A useful Bacillus, sp. AC13 giving proteases, xylanases and cellulases, is described in WO 9401532 A to Novo.

Bleaching Agent

Preferred additional optional detergent ingredients that can be included in the cleaning compositions of the present invention include conventional activated-, other enzymatic- and/or metallo catalyst- based bleach systems. It has been found that the combination of the cytochrome with another bleach system provides improved cleaning of coloured and/or everyday body stains and/or soils and when formulated as laundry composition, improved fabric realistic items cleaning and whitening.

The bleaching agent component for use herein can be any of the bleaching agents useful for cleaning compositions including oxygen bleaches as well as others known in the art. The bleaching agent suitable for the present invention can be an activated or non-activated bleaching agent.

Bleaching agents are such as hydrogen peroxide, PB1, PB4 and percarbonate with a particle size of 400–800 microns. These bleaching agent components can include one or more oxygen bleaching agents and, depending upon the bleaching agent chosen, one or more bleach activators. When present oxygen bleaching compounds will typically be present at levels of from about 1% to about 25%.

The hydrogen peroxide releasing agents can be used in combination with bleach activators such as tetraacetylethylenediamine (TAED), nonanoyloxybenzene-sulfonate (NOBS, described in U.S. Pat. No. 4,412,934), 3,5,-trimethylhexanoloxybenzenesulfonate (ISONOBS, described in EP 120,591) or pentaacetylglucose (PAG)or Phenolsulfonate ester of N-nonanoyl-6-aminocaproic acid (NACA-OBS, described in WO94/281 06), which are perhydrolyzed to form a peracid as the active bleaching species, leading to improved bleaching effect. Also suitable activators are acylated citrate esters such as disclosed in Copending European Patent Application No. 91870207.7 and unsymetrical acyclic imide bleach activator of the following formula as disclosed in the Procter & Gamble co-pending patent applications U.S. Ser. No. 60/022,786 (filed Jul. 30, 1996) and No. 60/028,122 (filed Oct. 15, 1996):

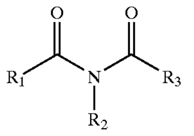

wherein $R_1$ is a $C_7$–$C_{13}$ linear or branched chain saturated or unsaturated alkyl group, $R_2$ is a $C_1$–$C_8$, linear or branched chain saturated or unsaturated alkyl group and $R_3$ is a $C_1$–$C_4$ linear or branched chain saturated or unsaturated alkyl group.

One category of oxygen bleaching agent that can be used encompasses percarboxylic acid bleaching agents and salts thereof. Suitable examples of this class of agents include magnesium monoperoxyphthalate hexahydrate, the magnesium salt of meta-chloro perbenzoic acid, 4-nonylamino4-oxoperoxybutyric acid and diperoxydodecanedioic acid. Such bleaching agents are disclosed in U.S. Pat. No. 4,483,781, U.S. patent application Ser. No. 740,446, European Patent Application 0,133,354 and U.S. Pat. No. 4,412,934. Highly preferred bleaching agents also include 6-nonylamino-6-oxoperoxycaproic acid as described in U.S. Pat. No. 4,634,551.

Another category of bleaching agents that can be used encompasses the halogen bleaching agents. Examples of hypohalite bleaching agents, for example, include trichloro isocyanuric acid and the sodium and potassium dichloroisocyanurates and N-chloro and N-bromo alkane sulphonamides. Such materials are normally added at 0.5–10% by weight of the finished product, preferably 1–5% by weight.

Useful bleaching agents, including peroxyacids and bleaching systems comprising bleach activators and peroxygen bleaching compounds for use in detergent compositions according to the invention are described in our co-pending applications U.S. Ser. No. 081136,626, PCT/U.S. 95/07823, WO95/27772, WO95/27773, WO95/27774 and WO95/27775.

The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

Peroxidase enzymes are used in combination with oxygen, hydrogen peroxide sources, e.g. percarbonate, perborate, persulfate, hydrogen peroxide, etc and a bleach enhancer. They are used for "solution bleaching", i.e. to prevent transfer of dyes or pigments removed from substrates during wash operations to other substrates in the wash solution. Peroxidase enzymes are known in the art, and include, for example, horseradish peroxidase, ligninase and haloperoxidase such as chloro- and bromo-peroxidase. Peroxidase-containing detergent compositions are disclosed, for example, in PCT International Application WO 89/099813, WO89/09813 and in European Patent application EP No. 91202882.6, filed on Nov. 6, 1991 and EP No. 96870013.8, filed Feb. 20, 1996. Also suitable is the laccase enzyme.

Enhancers are generally comprised at a level of from 0.1% to 5% by weight of total composition. Preferred enhancers are substitued phenthiazine and phenoxazine 10-Phenothiazinepropionicacid (PPT), 10-ethylphenothiazine-4-carboxylic acid (EPC), 10-phenoxazinepropionic acid (POP) and 10-methylphenoxazine (described in WO 94/12621) and substitued syringates (C3–C5 substitued alkyl syringates) and phenols. Sodium percarbonate or perborate are preferred sources of hydrogen peroxide.

Said peroxidases are normally incorporated in the detergent composition at levels from 0.0001% to 2% of active enzyme by weight of the detergent composition.

Metal-containing catalysts for use in bleach compositions, include cobalt-containing catalysts such as Pentaamine acetate cobalt(III) salts and manganese-containing catalysts such as those described in EPA 549 271; EPA 549 272; EPA 458 397; U.S. Pat. No. 5,246,621; EPA 458 398; EPA 458 397; U.S. Pat. No. 5,194,416 and U.S. Pat. No. 5,114,611. Bleaching composition comprising a peroxy compound, a manganese-containing bleach catalyst and a chelating agent is described in the patent application No 94870206.3.

Preferred metal-containing catalyst for the purpose of the present invention is a transition metal complex of a macropolycyclic rigid ligand. The phrase "macropolycyclic rigid ligand" is sometimes abbreviated as "MRL" in discussion below. The amount used is a catalytically effective amount, suitably about 1 ppb or more, for example up to about 99.9%, more typically about 0.001 ppm or more, preferably from about 0.05 ppm to about 500 ppm (wherein "ppb" denotes parts per billion by weight and "ppm" denotes parts per million by weight).

Suitable transition metals e.g., Mn are illustrated hereinafter. "Macropolycyclic" means a MRL is both a macrocycle and is polycyclic. "Polycyclic" means at least bicyclic. The term "rigid" as used herein herein includes "having a superstructure" and "cross-bridged". "Rigid" has been defined as the constrained converse of flexibility: see D. H. Busch., *Chemical Reviews.*, (1993), 93, 847–860, incorporated by reference. More particularly, "rigid" as used herein means that the MRL must be determinably more rigid than a macrocycle ("parent macrocycle") which is otherwise identical (having the same ring size and type and number of atoms in the main ring) but lacking a superstructure (especially linking moieties or, preferably cross-bridging moieties) found in the MRL's. In determining the comparative rigidity of macrocycles with and without superstructures, the practitioner will use the free form (not the metal-bound form) of the macrocycles. Rigidity is well-known to be useful in comparing macrocycles; suitable tools for determining, measuring or comparing rigidity include computational methods (see, for example, Zimmer, *Chemical Reviews*, (1995), 95(38), 2629–2648 or Hancock et al., *Inorganica Chimica Acta*, (1989), 164, 73–84. A determination of whether one macrocycle is more rigid than another can be often made by simply making a molecular model, thus it is not in general essential to know configurational energies in absolute terms or to precisely compute them. Excellent comparative determinations of rigidity of one macrocycle vs. another can be made using inexpensive personal computer-based computational tools, such as ALCHEMY lit, commercially available from Tripos Associates. Tripos also has available more expensive software permitting not only comparative, but absolute determinations; alternately, SHAPES can be used (see Zimmer cited supra). One observation which is significant in the context of the present invention is that there is an optimum for the present purposes when the parent macrocycle is distinctly flexible as compared to the cross-bridged form. Thus, unexpectedly, it is preferred to use parent macrocycles containing at least four donor atoms, such as cyclam derivatives, and to cross-bridge them, rather than to start with a more rigid parent macrocycle. Another observation is that cross-bridged macrocycles are significantly preferred over macrocycles which are bridged in other manners.

Preferred MRL's herein are a special type of ultra-rigid ligand which is cross-bridged. A "cross-bridge" is nonlimitingly illustrated in 1.11 hereinbelow. In 1.11, the cross-bridge is a $—CH_2CH_2—$ moiety. It bridges $N^1$ and $N^8$ in the illustrative structure. By comparison, a "same-side" bridge, for example if one were to be introduced across $N^1$ and $N^{12}$ in 1.11, would not be sufficient to constitute a "cross-bridge" and accordingly would not be preferred.

Suitable metals in the rigid ligand complexes include Mn(II), Mn(III), Mn(IV), Mn(V), Fe(II), Fe(III), Fe(IV), Co(I), Co(II), Co(III), Ni(I), Ni(II), Ni(III), Cu(I), Cu(II), Cu(III), Cr(II), Cr(III), Cr(IV), Cr(V), Cr(VI), V(III), V(IV), V(V), Mo(IV), Mo(M), Mo(VI), W(IV), W(V), W(VI), Pd(II), Ru(II), Ru(II), and Ru(IV). Preferred transition-metals in the instant transition-metal bleach catalyst include manganese, iron and chromium. Preferred oxidation states include the (II) and (III) oxidation states. Manganese(II) in both the low-spin configuration and high spin complexes are included. It is to be noted that complexes such as low-spin Mn(II) complexes are rather rare in all of coordination chemistry. The designation (II) or (III) denotes a coordinated transition metal having the requisite oxidation state; the coordinated metal atom is not a free ion or one having only water as a ligand.

In general, as used herein, a "ligand" is any moiety capable of direct covalent bonding to a metal ion. Ligands can be charged or neutral and may range widely, including simple monovalent donors, such as chloride, or simple amines which form a single coordinate bond and a single point of attachment to a metal; to oxygen or ethylene, which can form a three-membered ring with a metal and thus can be said to have two potential points of attachment, to larger moieties such as ethylenediamine or aza macrocycles, which form up to the maximum number of single bonds to one or more metals that are allowed by the available sites on the metal and the number of lone pairs or alternate bonding sites of the free ligand. Numerous ligands can form bonds other than simple donor bonds, and can have multiple points of attachment.

Ligands useful herein can fall into several groups: the MRL, preferably a cross-bridged macropolycycle (preferably there will be one MRL in a useful transition-metal complex, but more, for example two, can be present, but not in preferred mononuclear transition-metal complexes); other, optional ligands, which in general are different from the MRL (generally there will be from 0 to 4, preferably from 1 to 3 such ligands); and ligands associated transiently with the metal as part of the catalytic cycle, these latter typically being related to water, hydroxide, oxygen or peroxides. Ligands of the third group are not essential for defining the metal bleach catalyst, which is a stable, isolable chemical compound that can be fully characterized. Ligands which bind to metals through donor atoms each having at least a single lone pair of electrons available for donation to a metal have a donor capability, or potential denticity, at least equal to the number of donor atoms. In general, that donor capability may be fully or only partially exercised.

Generally, the MRL's herein can be viewed as the result of imposing additional structural rigidity on specifically selected "parent macrocycles".

More generally, the MRL's (and the corresponding transition-metal catalysts) herein suitably comprise:

(a) at least one macrocycle main ring comprising four or more heteroatoms; and (b) a covalently connected non-metal superstructure capable of increasing the rigidity of the macrocycle, preferably selected from (i) a bridging superstructure, such as a linking moiety;

(ii) a cross-bridging superstructure, such as a cross-bridging linking moiety; and (iii) combinations thereof.

The term "superstructure" is used herein as defined in the literature by Busch et al., see, for example, articles by Busch in "Chemical Reviews".

Preferred superstructures herein not only enhance the rigidity of the parent macrocycle, but also favor folding of the macrocycle so that it co-ordinates to a metal in a cleft. Suitable superstructures can be remarkably simple, for example a linking moiety such as any of those illustrated in 1.9 and 1.10 below, can be used.

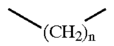

1.9 wherein n is an integer, for example from 2 to 8, preferably less than 6, typically 2 to 4, or 1.10

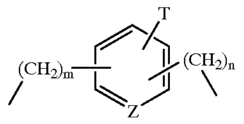

wherein m and n are integers from about 1 to 8, more preferably from 1 to 3; Z is N or CH; and T is a compatible substituent, for example H, alkyl, trialkylammonium, halogen, nitro, sulfonate, or the like. The aromatic ring in 1.10 can be replaced by a saturated ring, in which the atom in Z connecting into the ring can contain N, O, S or C.

Without intending to be limited by theory, it is believed that the preorganization built into the MRL—s herein that leads to extra kinetic and/or thermodynamic stability of their metal complexes arises from either or both of topological constraints and enhanced rigidity (loss of flexibility) compared to the free parent macrocycle which has no superstructure. The MRL's as defined herein and their preferred cross-bridged sub-family, which can be said to be "ultra-rigid", combine two sources of fixed preorganization. In preferred MRL's herein, the linking moieties and parent macrocycle rings are combined to form ligands which have a significant extent of "fold", typically greater than in many known superstructured ligands in which a superstructure is attached to a largely planar, often unsaturated macrocycle. See, for example: D. H. Busch, *Chemical Reviews*, (1993), 93, 847–880. Further, the preferred MRL's herein have a number of particular properties, including (1) they are characterized by very high proton affinities, as in so-called "proton sponges"; (2) they tend to react slowly with multivalent transition metals, which when combined with (1) above, renders synthesis of their complexes with certain hydrolyzable metal ions difficult in hydroxylic solvents; (3) when they are coordinated to transition metal atoms as identified herein, the MRL's result in complexes that have exceptional kinetic stability such that the metal ions only dissociate extremely slowly under conditions that would destroy complexes with ordinary ligands; and (4) these complexes have exceptional thermodynamic stability; however, the unusual kinetics of MRL dissociation from the transition metal may defeat conventional equilibrium measurements that might quantitate this property.

In one aspect of the present invention, the MRL's include those comprising:

(i) an organic macrocycle ring containing four or more donor atoms (preferably at least 3, more preferably at least 4, of these donor atoms are N) separated from each other by covalent linkages of at least one, preferably 2 or 3, non-donor atoms, two to five (preferably three to four, more preferably four) of these donor atoms being coordinated to the same transition metal in the complex; and (ii) a linking moiety, preferably a cross-bridging chain, which covalently connects at least 2 (preferably non-adjacent) donor atoms of the organic macrocycle ring, said covalently connected (preferably non-adjacent) donor atoms being bridgehead donor atoms which are coordinated to the same transition metal in the complex, and wherein said linking moiety (preferably a cross-bridged chain) comprises from 2 to about 10 atoms (preferably the cross-bridged chain is selected from 2, 3 or 4 non-donor atoms, and 4–6 non-donor atoms with a further donor atom).

Suitable MRL's are further nonlimitingly illustrated by the following compound:

1.11

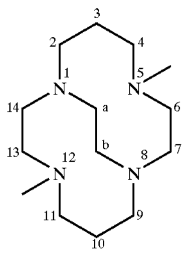

This is a MRL in accordance with the invention which is a highly preferred, cross-bridged, methyl-substituted (all nitrogen atoms tertiary) derivative of cyclam. Formally, this ligand is named 5,12-dimethyl-1,5,8,12-tetraazabicyclo [6.6.2]hexadecane using the extended von Baeyer system. See "A Guide to IUPAC Nomenclature of Organic Compounds: Recommendations 1993", R. Panico, W. H. Powell and J-C Richer (Eds.), Blackwell Scientific Publications, Boston, 1993; see especially section R-2.4.2.1. According to conventional terminology, N1 and N8 are "bridgehead atoms"; as defined herein, more particularly "bridgehead donor atoms" since they have lone pairs capable of donation to a metal. N1 is connected to two non-bridgehead donor atoms, N5 and N12, by distinct saturated carbon chains 2,3,4 and 14,13 and to bridgehead donor atom N8 by a "linking moiety" a,b which here is a saturated carbon chain of two carbon atoms. N8 is connected to two non-bridgehead donor atoms, N5 and N12, by distinct chains 6,7 and 9,10,11. Chain a,b is a "linking moiety" as defined herein, and is of the special, preferred type referred to as a "cross-bridging" moiety. The "macrocyclic ring" of the ligand supra, or "main ring" (IUPAC), includes all four donor atoms and chains 2,3,4; 6,7; 9,10,11 and 13,14 but not a,b. This ligand is conventionally bicyclic. The short bridge or "linking moiety" a,b is a "cross-bridge" as defined herein, with a,b bisecting the macrocyclic ring.

The MRL's herein are of course not limited to being synthesized from any preformed macrocycle plus preformed "rigidizing" or "conformation-modifying" element: rather, a wide variety of synthetic means, such as template syntheses, are useful. See for example Busch et al., reviewed in "Heterocyclic compounds: Aza-crown macrocycles", J. S. Bradshaw et. al.

Transition-metal bleach catalysts useful in the invention compositions can in general include known compounds where they conform with the definition herein, as well as, more preferably, any of a large number of novel compounds expressly designed for the present laundry or cleaning uses, and non-limitingly illustrated by any of the following:

Dichloro-5,12dimethyl-1,5,8,12-tetraazabicyclo[6.6.2] hexadecane Manganese(II) Dichloro4,10-dimethyl-1,4,7,10-tetraazabicyclo[5.5.2]tetradecane Manganese(II) Diaquo-5,12-dimethyl-1,5,8,12-tetraazabicyclo[6.6.2] hexadecane Manganese(II) Hexafluorophosphate Aquo-hydroxy-5,12-dimethyl-1,5,8,12-tetraazabicyclo [6.6.2]hexadecane Manganese(III) Hexafluorophosphate Diaquo4,10-dimethyl-1,4,7,10-tetraazabicyclo [5.5.2]hetradecane Manganese(II) Hexafluorophosphate Diaquo-5,12-dimethyl-1,5,8,12-tetraazabicyclo[6.6.2]hexadecane Manganese(II) Tetrafluoroborate Diaquo4,10-dimethyl-1,4,7,10-tetraazabicyclo[5.5.2]tetradecane Manganese(II) Tetrafluoroborate Dichloro-5,12-dimethyl-1,5,8,12-tetraazabicyclo[6.6.2]hexadecane Manganese(III) Hexafluorophosphate Dichloro-5,12-di-n-butyl-1,5,8, 12-tetraaza- bicyclo[6.6.2]hexadecane Manganese(II) Dichloro-5,12-dibenzyl-1,5,8,12-tetraazabicyclo [6.6.2]hexadecane Manganese(II) Dichloro-5-n-butyl-12-methyl-1,5,8,12-tetraaza-bicyclo[6.6.2]hexadecane Manganese(II) Dichloro-5-n-octyl-12-methyl-1,5,8,12-tetraaza-bicyclo[6.6.2]hexadecane Manganese(II) Dichloro-5-n-butyl-12-methyl-1,5,8,12-tetraaza-bicyclo[6.6.2]hexadecane Manganese(II) Dichloro-5, 12-dimethyl-1 ,5,8,12-tetraazabicyclo[6.6.2] hexadecane Iron(II) Dichloro4,10-dimethyl-1,4,7,10-tetraazabicyclo[5.5.2]tetradecane Iron(II) Dichloro-5, 12-dimethyl-1,5,8,12-tetraazabicyclo[6.6.2] hexadecane Copper(II) Dichloro4,10-dimethyl-1,4,7, 10-tetraazabicyclo[5.5.2]tetradecane Copper(II) Dichloro-5,12-dimethyl-1,5,8,12-tetraazabicyclo [6.6.2]hexadecane Cobalt(II) Dichloro4,10-dimethyl-1, 4,7,10-tetraazabicyclo[5.5.2]tetradecane Cobalt(II) Dichloro 5,12-dimethyl-4-phenyl-1,5,8,12-tetraazabicyclo[6.6.2]hexadecane Manganese(II) Dichloro-4,10-dimethyl-3-phenyl-1,4,7,10-tetraazabicyclo[5.5.2]tetradecane Manganese(II) Dichloro-5,12-dimethyl-4,9-diphenyl-1,5,8,12-tetraazabicyclo[6.6.2]hexadecane Manganese(II) Dichloro4,10-dimethyl-3,8-diphenyl-1,4,7,10-tetraazabicyclo[5.5.2]tetradecane Manganese(II) Dichloro-5,12-dimethyl-2,11-diphenyl-1,5,8,12-tetraazabicyclo[6.6.2]hexadecane Manganese(II) Dichloro-4,10-dimethyl-4,9-diphenyl-1,4,7,10-tetraazabicyclo[5.5.2]tetradecane Manganese(II) Dichloro-2,4,5,9,11,12-hexamethyl-1,5,8,12-tetraazabicyclo[6.6.2]hexadecane Manganese(II) Dichloro-2,3,5,9,10,12-hexamethyl-1,5,8,12-tetraazabicyclo[6.6.2]hexadecane Manganese(II) Dichloro-2,2,4,5,9,9,11,12-octamethyl-1,5,8,12-tetraazabicyclo[6.6.2]hexadecane Manganese(II) Dichloro-2,2,4,5,9,11,11,12-octamethyl-1,5,8,12-tetraazabicyclo[6.6.2]hexadecane Manganese(II) Dichloro-3,3,5,10,10,12-hexamethyl-1,5,8,12-tetraazabicyclo[6.6.2]hexadecane Manganese(II) Dichloro-3,5,10,12-tetramethyl-1,5,8,12-tetraazabicyclo[6.6.2]hexadecane Manganese(II) Dichloro-3-butyl-5,10,12-trimethyl-1,5,8,12-tetraazabicyclo[6.6.2]hexadecane Manganese(II)

Dichloro-1,5,8,12-tetraazabicyclo[6.6.2]hexadecane Manganese(II) Dichloro-1,4,7,10-tetraazabicyclo [5.5.2]tetradecane Manganese(II) Dichloro-1,5,8,12-tetraazabicyclo[6.6.2]hexadecane Iron(II) Dichloro-1, 4,7,10-tetraazabicyclo[5.5.23hetradecane Iron(II) Aquo-chloro-2-(2-hydroxyphenyl)-5,12-dimethyl1,5,8, 12-tetraazabicyclo[6.6.2]hexadecane Manganese(II) Aquo-chloro-10-(2-hydroxybenzyl)-4,10-dimethyl-1, 4,7,10-tetraazabicyclo[5.5.2]tetradecane Manganese (II) Chloro-2-(2-hydroxybenzyl)-5-methyl-5,8,12-tetraazabicyclo[6.6.2]hexadecane Manganese(II) Chloro-1 0-(2-hydroxybenzyl)-4-methyl-1,4,7,10-tetraazabicyclo[5.5.2]tetradecane Manganese(II) Chloro-5-methyl-12-(2-picolyl)-1,5,8,12-tetraazabicyclo[6.6.2]hexadecane Manganese(II) Chloride Chloro4-methyl-10-(2-picolyl)-1,4,7,10-tetraazabicyclo[5.5.2]tetradecane Manganese(II) Chloride Dichloro-5-(2-sulfato)dodecyl-12-methyl-1, 5,8,12-tetraazabicyclo[6.6.2]hexadecane Manganese (III) Aquo-Chloro-5-(2-sulfato)dodecyl-12-methyl-1,5, 8,12-tetraazabicyclo[6.6.2]hexadecane Manganese(II) Aquo-Chloro-5-(3-sulfonopropyl)-12-methyl-1,5,8,12-tetraazabicyclo[6.6.2]hexadecane Manganese(II) Dichloro-5-(Trimethylammoniopropyl)dodecyl-12-methyl-1,5,8,12-tetraazabicyclo[6.6.2]hexadecane Manganese(III) Chloride Dichloro-5,12-dimethyl-1,4, 7,10,1 3-pentaazabicyclo[8.5.2]heptadecane Manganese(II) Dichloro-14,20-dimethyl-1,10,14,20-tetraazatriyclo[8.6.6]docosa-3(8),4,6-triene Manganese(II) Dichloro-4,11-dimethyl-1,4,7,11-tetraazabicyclo[6.5.2]pentadecane Manganese(II) Dichloro-5,12-dimethyl-1,5,8,12-tetraazabicyclo [7.6.2]heptadecane Manganese(II) Dichloro-5,13-dimethyl-1,5,9,13-tetraazabicyclo[7.7.2]heptadecane Manganese(II) Dichloro-3,10-bis(butylcarboxy)-5,12-dimethyl-1,5,8,12-tetraazabicyclo(6.6.2]hexadecane Manganese(II) Diaquo-3,10-dicarboxy-5,12-dimethyl-1,5,8,12-tetraazabicyclo[6.6.2]hexadecane Manganese (II) Chloro-20-methyl-1,9,20,24,25-pentaaza-tetracyclo[7.7.7.$1^{3,7}$.$1^{11,15}$.]pentacosa-3,5,7(24),11,13, 15(25)-hexaene Manganese(II) Hexafluorophosphate Trifluoromethanesulfono-20-methyl-1,9,20,24,25-pentaaza-tetracyclo[7.7.7.$1^{3,7}$.$1^{11,1}$ $^{5}$.]pentacosa-3,5,7 (24), 11,13,15(25)-hexaene Manganese(II) Trifluoromethanesulfonate Trifluoromethanesulfono-20-methyl-1,9,20,24,25-pentaaza-tetracyclo[7.7.7.$1^{3,7}$.$1^{11,}$ 15.]pentacosa-3,5,7(24),11,13,15(25)-hexaene Iron(II) Trifluoromethanesulfonate Chloro-5,12,17-trimethyl-1,5,8,12,17-pentaazabicyclo[6.6.5]nonadecane Manganese(II) Hexafluorophosphate Chloro4,10,15-trimethyl-1,4,7,10,15-pentaazabicyclo[5.5.5] heptadecane Manganese(II) Hexafluorophosphate Chloro-5,12,17-trimethyl-1,5,8,12,17-pentaazabicyclo [6.6.5]nonadecane Manganese(II) Chloride Chloro4, 10,15-trimethyl-1,4,7,10,15-pentaazabicyclo[5.5.5] heptadecane Manganese(II) Chloride The practitioner may further benefit if certain terms receive additional definition and illustration. As used herein, "macrocyclic rings" are covalently connected rings formed from four or more donor atoms (i.e., heteroatoms such as nitrogen or oxygen) with carbon chains connecting them, and any macrocycle ring as defined herein must contain a total of at least ten, preferably at least twelve, atoms in the macrocycle ring. A MRL herein may contain more than one ring of any sort per ligand, but at least one macrocycle ring must be identifiable. Moreover, in the preferred embodiments, no two hetero-atoms are directly connected. Preferred transition-metal bleach catalysts are those wherein the MRL comprises an organic macrocycle ring (main ring) containing at least 10–20 atoms, preferably 12–18 atoms, more preferably from about 12 to about 20 atoms, most preferably 12 to 16 atoms.

"Donor atoms" herein are heteroatoms such as nitrogen, oxygen, phosphorus or sulfur, which when incorporated into a ligand still have at least one lone pair of electrons available for forming a donor-acceptor bond with a metal. Preferred transition-metal bleach catalysts are those wherein the donor atoms in the organic macrocycle ring of the cross-bridged MRL are selected from the group consisting of N, O, S, and P, preferably N and O, and most preferably all N. Also preferred are cross-bridged MRL's comprising 4 or 5 donor atoms, all of which are coordinated to the same transition metal. Most preferred transition-metal bleach catalysts are those wherein the cross-bridged MRL comprises 4 nitrogen donor atoms all coordinated to the same transition metal, and those wherein the cross-bridged MRL comprises 5 nitrogen atoms all coordinated to the same transition metal.

"Non-donor atoms" of the MRL herein are most commonly carbon, though a number of atom types can be included, especially in optional exocyclic substituents (such as "pendant" moieties, illustrated hereinafter) of the macrocycles, which are neither donor atoms for purposes essential to form the metal catalysts, nor are they carbon. Thus, in the broadest sense, the term "non-donor atoms" can refer to any atom not essential to forming donor bonds with the metal of the catalyst. Examples of such atoms could include heteroatoms such as sulfur as incorporated in a non-coordinatable sulfonate group, phosphorus as incorporated into a phosphonium salt moiety, phosphorus as incorporated into a P(V) oxide, a non-transition metal, or the like. In certain preferred embodiments, all non-donor atoms are carbon.

Transition metal complexes of MRL's can be prepared in any convenient manner. Two such preparations are illustrated as follows:

Synthesis of [Mn(Bcyclam)$Cl_2$]

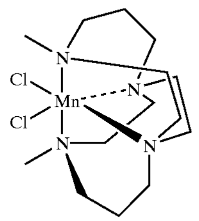

(a) Method I.

"Bcyclam" (5,12-dimethyl-1,5,8,12-tetraaza-bicyclo [6.6.2]hexadecane) is prepared by a synthesis method described by G. R. Weisman, et al., *J.Amer.Chem.Soc.*, (1990), 112, 8604. Bcyclam (1.00 g., 3.93 mmol) is dissolved in dry $CH_3CN$ (35 mL, distilled from $CaH_2$). The solution is then evacuated at 15 mm until the $CH_3CN$ begins to boil. The flask is then brought to atmospheric pressure with Ar. This degassing procedure is repeated 4 times. Mn(pyridine)$_2Cl_2$ (1.12 g., 3.93 mmol), synthesized according to the literature procedure of H. T. Witteveen et al., *J. Inorg. Nucl. Chem.* (1974), 36, 1535, is added under Ar. The cloudy reaction solution slowly begins to darken. After stirring overnight at room temperature, the reaction solution becomes dark brown with suspended fine particulates. The reaction solution is filtered with a 0.2μ filter. The filtrate is a light tan color. This filtrate is evaporated to dryness using a rotoevaporator. After drying overnight at 0.05 mm at room temperature, 1.35 g. off-white solid product is collected, 90% yield. Elemental Analysis: %Mn, 14.45; %C, 44.22; %H, 7.95; theoretical for [Mn(Bcyclam)$Cl_2$], $MnC_{14}H_{30}N_4Cl_2$, MW=380.26. Found: %Mn, 14.98; %C, 44.48; %H, 7.86; Ion Spray Mass Spectroscopy shows one major peak at 354 mu corresponding to [Mn(Bcyclam)(formate)]$^+$.

(b) Method II.

Freshly distilled Bcyclam (25.00 g., 0.0984 mol), which is prepared by the same method as above, is dissolved in dry $CH_3CN$ (900 mL, distilled from $CaH_2$). The solution is then evacuated at 15 mm until the $CH_3CN$ begins to boil. The flask is then brought to atmospheric pressure with Ar. This degassing procedure is repeated 4 times. $MnCl_2$ (11.25 g., 0.0894 mol) is added under Ar. The cloudy reaction solution immediately darkens. After stirring 4 hrs. under reflux, the reaction solution becomes dark brown with suspended fine particulates. The reaction solution is filtered through a 0.2$\mu$ filter under dry conditions. The filtrate is a light tan color. This filtrate is evaporated to dryness using a rotoevaporator. The resulting tan solid is dried overnight at 0.05 mm at room temperature. The solid is suspended in toluene (100 mL) and heated to reflux. The toluene is decanted off and the procedure is repeated with another 100 mL of toluene. The balance of the toluene is removed using a rotoevaporator. After drying overnight at 0.05 mm at room temperature, 31.75 g. of a light blue solid product is collected, 93.5% yield. Elemental Analysis: %Mn, 14.45; %C, 44.22; %H, 7.95; %N, 14.73; %Cl, 18.65; theoretical for [Mn(Bcyclam)$Cl_2$], $MnC_{14}H_{30}N_4Cl_2$, MW=380.26. Found: %Mn, 14.69; %C, 44.69; %H, 7.99; %N, 14.78; %CI, 18.90 (Karl Fischer Water, 0.68%). Ion Spray Mass Spectroscopy shows one major peak at 354 mu corresponding to [Mn(Bcyclam)(formate)]$^+$.

Bleaching agents other than oxygen bleaching agents are also known in the art and can be utilized herein. One type of non-oxygen bleaching agent of particular interest includes photoactivated bleaching agents such as the sulfonated zinc and/or aluminum phthalocyanines. These materials can be deposited upon the substrate during the washing process. Upon irradiation with light, in the presence of oxygen, such as by hanging clothes out to dry in the daylight, the sulfonated zinc phthalocyanine is activated and, consequently, the substrate is bleached. Preferred zinc phthalocyanine and a photoactivated bleaching process are described in U.S. Pat. No. 4,033,718. Typically, detergent compositions will contain about 0.025% to about 1.25%, by weight, of sulfonated zinc phthalocyanine.

Surfactant System

The cleaning compositions according to the present invention generally comprise a surfactant system wherein the surfactant can be selected from nonionic and/or anionic and/or cationic and/or ampholytic and/or zwitterionic and/or semi-polar surfactants.

The surfactant is typically present at a level of from 0.1% to 60% by weight. More preferred levels of incorporation are 1% to 35% by weight, most preferably from 1% to 30% by weight of cleaning compositions in accord with the invention.

The surfactant is preferably formulated to be compatible with enzyme components present in the composition. In liquid or gel compositions the surfactant is most preferably formulated such that it promotes, or at least does not degrade, the stability of any enzyme in these compositions.

Preferred surfactant systems to be used according to the present invention comprise as a surfactant one or more of the nonionic and/or anionic surfactants described herein.

Polyethylene, polypropylene, and polybutylene oxide condensates of alkyl phenols are suitable for use as the nonionic surfactant of the surfactant systems of the present invention, with the polyethylene oxide condensates being preferred. These compounds include the condensation products of alkyl phenols having an alkyl group containing from about 6 to about 14 carbon atoms, preferably from about 8 to about 14 carbon atoms, in either a straight-chain or branched-chain configuration with the alkylene oxide. In a preferred embodiment, the ethylene oxide is present in an amount equal to from about 2 to about 25 moles, more preferably from about 3 to about 15 moles, of ethylene oxide per mole of alkyl phenol. Commercially available nonionic surfactants of this type include Igepal™ CO-630, marketed by the GAF Corporation; and Triton™ X-45, X-114, X-100 and X-102, all marketed by the Rohm & Haas Company. These surfactants are commonly referred to as alkylphenol alkoxylates (e.g., alkyl phenol ethoxylates).

The condensation products of primary and secondary aliphatic alcohols with from about 1 to about 25 moles of ethylene oxide are suitable for use as the nonionic surfactant of the nonionic surfactant systems of the present invention. The alkyl chain of the aliphatic alcohol can either be straight or branched, primary or secondary, and generally contains from about 8 to about 22 carbon atoms. Preferred are the condensation products of alcohols having an alkyl group containing from about 8 to about 20 carbon atoms, more preferably from about 10 to about 18 carbon atoms, with from about 2 to about 10 moles of ethylene oxide per mole of alcohol. About 2 to about 7 moles of ethylene oxide and most preferably from 2 to 5 moles of ethylene oxide per mole of alcohol are present in said condensation products. Examples of commercially available nonionic surfactants of this type include Tergitol™ 15-S-9 (the condensation product of $C_{11}$—$C_{15}$ linear alcohol with 9 moles ethylene oxide), Tergitol™ 24-L-6 NMW (the condensation product of $C_{12}$–$C_{14}$ primary alcohol with 6 moles ethylene oxide with a narrow molecular weight distribution), both marketed by Union Carbide Corporation; Neodol™ 45–9 (the condensation product of $C_{14}$–$C_{15}$ linear alcohol with 9 moles of ethylene oxide), Neodol™ 23–3 (the condensation product of $C_{12}$–$C_{13}$ linear alcohol with 3.0 moles of ethylene oxide), Neodol™ 45-7 (the condensation product of $C_{14}$–$C_{15}$ linear alcohol with 7 moles of ethylene oxide), Neodol™ 45-5 (the condensation product of $C_{14}$–$C_{15}$ linear alcohol with 5 moles of ethylene oxide) marketed by Shell Chemical Company, Kyro™ EOB (the condensation product of $C_{13}$–$C_{15}$ alcohol with 9 moles ethylene oxide), marketed by The Procter & Gamble Company, and Genapol LA O3O or O5O (the condensation product of $C_{12}$–$C_{14}$ alcohol with 3 or 5 moles of ethylene oxide) marketed by Hoechst. Preferred range of HLB in these products is from 8–11 and most preferred from 8–10.

Also useful as the nonionic surfactant of the surfactant systems of the present invention are the alkylpolysaccharides disclosed in U.S. Pat. NO. 4,565,647, Llenado, issued Jan. 21, 1986, having a hydrophobic group containing from about 6 to about 30 carbon atoms, preferably from about 10 to about 16 carbon atoms and a polysaccharide, e.g. a polyglycoside, hydrophilic group containing from about 1.3 to about 10, preferably from about 1.3 to about 3, most preferably from about 1.3 to about 2.7 saccharide units. Any reducing saccharide containing 5 or 6 carbon atoms can be used, e.g., glucose, galactose and galactosyl moieties can be substituted for the glucosyl moieties (optionally the hydrophobic group is attached at the 2-, 3-, 4-, etc. positions thus giving a glucose or galactose as opposed to a glucoside or galactoside). The intersaccharide bonds can be, e.g., between the one position of the additional saccharide units and the 2-, 3-, 4-, and/or 6- positions on the preceding saccharide units. The preferred alkylpolyglycosides have the formula $$R^2O(C_nH_{2n}O)_t(\text{glycosyl})_x$$

wherein $R^2$ is selected from the group consisting of alkyl, alkylphenyl, hydroxyalkyl, hydroxyalkylphenyl, and mixtures thereof in which the alkyl groups contain from about 10 to about 18, preferably from about 12 to about 14, carbon atoms; n is 2 or 3, preferably 2; t is from 0 to about 10, preferably 0; and x is from about 1.3 to about 10, preferably from about 1.3 to about 3, most preferably from about 1.3 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4- and/or 6-position, preferably predominately the 2-position.

The condensation products of ethylene oxide with a hydrophobic base formed by the condensation of propylene oxide with propylene glycol are also suitable for use as the additional nonionic surfactant systems of the present invention. The hydrophobic portion of these compounds will preferably have a molecular weight of from about 1500 to about 1800 and will exhibit water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially-available Plurafac™ LF404 and Pluronic™ surfactants, marketed by BASF.

Also suitable for use as the nonionic surfactant of the nonionic surfactant system of the present invention, are the condensation products of ethylene oxide with the product resulting from the reaction of propylene oxide and ethylenediamine. The hydrophobic moiety of these products consists of the reaction product of ethylenediamine and excess propylene oxide, and generally has a molecular weight of from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic™ compounds, marketed by BASF.

Preferred for use as the nonionic surfactant of the surfactant systems of the present invention are polyethylene oxide condensates of alkyl phenols, condensation products of primary and secondary aliphatic alcohols with from about 1 to about 25 moles of ethylene oxide, alkylpolysaccharides, and mixtures thereof. Most preferred are $C_8$–$C_{14}$ alkyl phenol ethoxylates having from 3 to 15 ethoxy groups and $C_8$–$C_{18}$ alcohol ethoxylates (preferably $C_{10}$ avg.) having from 2 to 10 ethoxy groups, and mixtures thereof.

Highly preferred nonionic surfactants are polyhydroxy fatty acid amide surfactants of the formula.

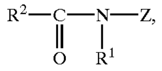

wherein $R^1$ is H, or $R^1$ is $C_{1-4}$ hydrocarbyl, 2-hydroxy ethyl, 2-hydroxy propyl or a mixture thereof, $R^2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R^1$ is methyl, $R^2$ is a straight $C_{11-15}$ alkyl or $C_{16-18}$ alkyl or alkenyl chain such as coconut alkyl or mixtures thereof, and Z is derived from a reducing sugar such as glucose, fructose, maltose, lactose, in a reductive amination reaction.

Suitable anionic surfactants to be used are linear alkyl benzene sulfonate, alkyl ester sulfonate surfactants including linear esters of $C_8$–$C_{20}$ carboxylic acids (i.e., fatty acids) which are sulfonated with gaseous $SO_3$ according to "The Journal of the American Oil Chemists Society", 52 (1975), pp. 323–329. Suitable starting materials would include natural fatty substances as derived from tallow, palm oil, etc.

The preferred alkyl ester sulfonate surfactant, especially for laundry applications, comprise alkyl ester sulfonate surfactants of the structural formula:

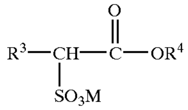

wherein $R^3$ is a $C_8$–$C_{20}$ hydrocarbyl, preferably an alkyl, or combination thereof, $R^4$ is a $C_1$–$C_6$ hydrocarbyl, preferably an alkyl, or combination thereof, and M is a cation which forms a water soluble salt with the alkyl ester sulfonate. Suitable salt-forming cations include metals such as sodium, potassium, and lithium, and substituted or unsubstituted ammonium cations, such as monoethanolamine, diethanolamine, and triethanolamine. Preferably, $R^3$ is $C_{10}$–$C_{16}$ alkyl, and $R^4$ is methyl, ethyl or isopropyl. Especially preferred are the methyl ester sulfonates wherein $R^3$ is $C_{10}$–$C_{16}$ alkyl.

Other suitable anionic surfactants include the alkyl sulfate surfactants which are water soluble salts or acids of the formula $ROSO_3M$ wherein R preferably is a $C_{10}$–$C_{24}$ hydrocarbyl, preferably an alkyl or hydroxyalkyl having a $C_{10}$–$C_{20}$ alkyl component, more preferably a $C_{12}$–$C_{18}$ alkyl or hydroxyalkyl, and M is H or a cation, e.g., an alkali metal cation (e.g. sodium, potassium, lithium), or ammonium or substituted ammonium (e.g. methyl-, dimethyl-, and trimethyl ammonium cations and quaternary ammonium cations such as tetramethyl-ammonium and dimethyl piperdinium cations and quaternary ammonium cations derived from alkylamines such as ethylamine, diethylamine, triethylamine, and mixtures thereof, and the like). Typically, alkyl chains of $C_{12}$–$C_{16}$ are preferred for lower wash temperatures (e.g. below about 50° C.) and $C_{16-18}$ alkyl chains are preferred for higher wash temperatures (e.g. above about 50° C.).

Other anionic surfactants useful for detersive purposes can also be included in the cleaning compositions of the present invention. These can include salts (including, for example, sodium, potassium, ammonium, and substituted ammonium salts such as mono-, di- and triethanolamine salts) of soap, $C_8$–$C_{22}$ primary of secondary alkanesulfonates, $C_8$–$C_{24}$ olefinsulfonates, sulfonated polycarboxylic acids prepared by sulfonation of the pyrolyzed product of alkaline earth metal citrates, e.g., as described in British patent specification No. 1,082,179, $C_8$–$C_{24}$ alkylpolyglycolethersulfates (containing up to 10 moles of ethylene oxide); alkyl glycerol sulfonates, fatty acyl glycerol sulfonates, fatty oleyl glycerol sulfates, alkyl phenol ethylene oxide ether sulfates, paraffin sulfonates, alkyl phosphates, isethionates such as the acyl isethionates, N-acyl taurates, alkyl succinamates and sulfosuccinates, monoesters of sulfosuccinates (especially saturated and unsaturated $C_{12}$–$C_{18}$ monoesters) and diesters of sulfosuccinates (especially saturated and unsaturated $C_6$–$C_{12}$ diesters), acyl sarcosinates, sulfates of alkylpolysaccharides such as the sulfates of alkylpolyglucoside (the nonionic nonsulfated compounds being described below), branched primary alkyl sulfates, and alkyl polyethoxy carboxylates such as those of the formula $RO(CH_2CCH_2O)_k$—$CH_2COO$—M+ wherein R is a $C_8$–$C_{22}$ alkyl, k is an integer from 1 to 10, and M is a soluble salt-forming cation. Resin acids and hydrogenated resin acids are also suitable, such as rosin, hydrogenated rosin, and resin acids and hydrogenated resin acids present in or derived from tall oil.

Further examples are described in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23 (herein incorporated by reference).

When included therein, the laundry detergent compositions of the present invention typically comprise from about 1% to about 40%, preferably from about 3% to about 20% by weight of such anionic surfactants.

Highly preferred anionic surfactants include alkyl alkoxylated sulfate surfactants hereof are water soluble salts or acids of the formula $RO(A)_mSO_3M$ wherein R is an unsubstituted $C_{10}$–$C_{24}$ alkyl or hydroxyalkyl group having a $C_{10}$–$C_{24}$ alkyl component, preferably a $C_{12}$–$C_{20}$ alkyl or hydroxyalkyl, more preferably $C_{12}$–$C_{18}$ alkyl or hydroxyalkyl, A is an ethoxy or propoxy unit, m is greater than zero, typically between about 0.5 and about 6, more preferably between about 0.5 and about 3, and M is H or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates are contemplated herein. Specific examples of substituted ammonium cations include methyl-, dimethyl, trimethylammonium cations and quaternary ammonium cations such as tetramethyl-ammonium and dimethyl piperdinium cations and those derived from alkylamines such as ethylamine, diethylamine, triethylamine, mixtures thereof, and the like. Exemplary surfactants are $C_{12}$–$C_{18}$ alkyl polyethoxylate (1.0) sulfate ($C_{12}$–$C_{18}E(1.0)M$), $C_{12}$–$C_{18}$ alkyl polyethoxylate (2.25) sulfate ($C_{12}$–$C_{18}E(2.25)M$), $C_{12}$–$C_{18}$ alkyl polyethoxylate (3.0) sulfate ($C_{12}$–$C_{18}E(3.0)M$), and $C_{12}$–$C_{18}$ alkyl polyethoxylate (4.0) sulfate ($C_{12}$–$C_{18}E(4.0)M$), wherein M is conveniently selected from sodium and potassium.

The cleaning compositions of the present invention may also contain cationic, ampholytic, zwitterionic, and semi-polar surfactants, as well as the nonionic and/or anionic surfactants other than those already described herein.

Cationic detersive surfactants suitable for use in the cleaning compositions of the present invention are those having one long-chain hydrocarbyl group. Examples of such cationic surfactants include the ammonium surfactants such as alkyltrimethylammonium halogenides, and those surfactants having the formula:

$$[R^2(OR^3)_y][R^4(OR^3)_y]_2R^5N+X—$$

wherein $R^2$ is an alkyl or alkyl benzyl group having from about 8 to about 18 carbon atoms in the alkyl chain, each $R^3$ is selected from the group consisting of —$CH_2CH_2$—, —$CH_2CH(CH_3)$—, —$CH_2CH(CH_2OH)$—, —$CH_2CH_2CH_2$—, and mixtures thereof; each $R^4$ is selected from the group consisting of $C_1$–$C_4$ alkyl, $C_1$–$C_4$ hydroxyalkyl, benzyl ring structures formed by joining the two $R^4$ groups, —$CH_2CHOH$—$CHOHCOR^6CHOHCH_2OH$ wherein $R^6$ is any hexose or hexose polymer having a molecular weight less than about 1000, and hydrogen when y is not 0; $R^5$ is the same as $R^4$ or is an alkyl chain wherein the total number of carbon atoms of $R^2$ plus $R^5$ is not more than about 18; each y is from 0 to about 10 and the sum of the y values is from 0 to about 15; and X is any compatible anion.

Quaternary ammonium surfactant suitable for the present invention has the formula (I):

Formula I

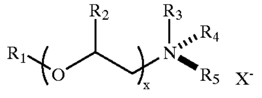

whereby R1 is a short chainlength alkyl (C6–C10) or alkylamidoalkyl of the formula (II);

Formula II

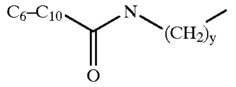

y is 2–4, preferably 3.

whereby R2 is H or a C1–C3 alkyl, whereby x is 0–4, preferably 0–2, most preferably 0, whereby R3, R4 and R5 are either the same or different and can be either a short chain alkyl (C1–C3) or alkoxylated alkyl of the formula III, whereby $X^-$ is a counterion, preferably a halide, e.g. chloride or methylsulfate.

Formula III

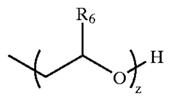

R6 is $C_1$–$C_4$ and z is 1 or 2.

Preferred quat ammonium surfactants are those as defined in formula I whereby $R_1$ is $C_8$, $C_{10}$ or mixtures thereof, x=o, $R_3$, $R_4$=$CH_3$ and $R_5$=$CH_2CH_2OH$.

Highly preferred cationic surfactants are the water-soluble quaternary ammonium compounds useful in the present composition having the formula:

$$R_1R_2R_3R_4N^+X^- \quad (i)$$

wherein $R_1$ is $C_8$–$C_{16}$ alkyl, each of $R_2$, $R_3$ and $R_4$ is independently $C_1$–$C_4$ alkyl, $C_1$–$C_4$ hydroxy alkyl, benzyl, and —$(C_2H_{40})_xH$ where x has a value from 2 to 5, and X is an anion. Not more than one of $R_2$, $R_3$ or $R_4$ should be benzyl. The preferred alkyl chain length for $R_1$ is $C_{12}$–$C_{15}$ particularly where the alkyl group is a mixture of chain lengths derived from coconut or palm kernel fat or is derived synthetically by olefin build up or OXO alcohols synthesis. Preferred groups for $R_2R_3$ and $R_4$ are methyl and hydroxyethyl groups and the anion X may be selected from halide, methosulphate, acetate and phosphate ions.

Examples of suitable quaternary ammonium compounds of formulae (i) for use herein are:

coconut trimethyl ammonium chloride or bromide;

coconut methyl dihydroxyethyl ammonium chloride or bromide;

decyl triethyl ammonium chloride;

decyl dimethyl hydroxyethyl ammonium chloride or bromide;

$C_{12-15}$ dimethyl hydroxyethyl ammonium chloride or bromide;

coconut dimethyl hydroxyethyl ammonium chloride or bromide;

myristyl trimethyl ammonium methyl sulphate;

lauryl dimethyl benzyl ammonium chloride or bromide;

lauryl dimethyl $(ethenoxy)_4$ ammonium chloride or bromide;

choline esters (compounds of formula (i) wherein $R_1$ is

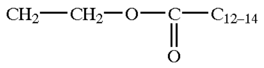

alkyl and $R_2R_3R_4$ are methyl).

di-alkyl imidazolines [compounds of formula (i)].

Other cationic surfactants useful herein are also described in U.S. Pat. No. 4,228,044, Cambre, issued October 14, 1980 and in European Patent Application EP 000,224

Typical cationic fabric softening components include the water-insoluble quaternary-ammonium fabric softening actives or thei corresponding amine precursor, the most commonly used having been di-long alkyl chain ammonium chloride or methyl sulfate.

Preferred cationic softeners among these include the following:

1) ditallow dimethylammonium chloride (DTDMAC);
2) dihydrogenated tallow dimethylammonium chloride;
3) dihydrogenated tallow dimethylammonium methylsulfate;
4) distearyl dimethylammonium chloride;
5) dioleyl dimethylammonium chloride;
6) dipalmityl hydroxyethyl methylammonium chloride;
7) stearyl benzyl dimethylammonium chloride;
8) tallow trimethylammonium chloride;
9) hydrogenated tallow trimethylammonium chloride;
10) $C_{12-14}$ alkyl hydroxyethyl dimethylammonium chloride;
11) $C_{12-18}$ alkyl dihydroxyethyl methylammonium chloride;
12) di(stearoyloxyethyl) dimethylammonium chloride (DSOEDMAC);
13) di(tallow-oxy-ethyl) dimethylammonium chloride;
14) ditallow imidazolinium methylsulfate;
15) 1-(2-tallowylamidoethyl)-2-tallowyl imidazolinium methylsulfate.

Biodegradable quaternary ammonium compounds have been presented as alternatives to the traditionally used di-long alkyl chain ammonium chlorides and methyl sulfates. Such quaternary ammonium compounds contain long chain alk(en)yl groups interrupted by functional groups such as carboxy groups. Said materials and fabric softening compositions containing them are disclosed in numerous publications such as EP-A-0,040,562, and EP-A-0,239,910.

The quaternary ammonium compounds and amine precursors herein have the formula (I) or (II), below:

(I)

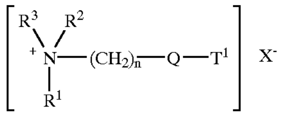

or (II)

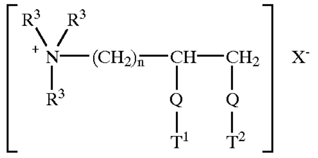

wherein Q is selected from —O—C(O)—, —C(O)—O—, —O—C(O)—O—, —$NR^4$—C(O)—, —C(O)—$NR^4$—;

$R^1$ is $(CH_2)_n$—Q—$T^2$ or $T^3$;

$R^2$ is $(CH_2)_m$—Q—$T^4$ or $T^5$ or $R^3$;

$R^3$ is $C_1$–$C_4$ alkyl or $C_1$–$C_4$ hydroxyalkyl or H;

$R^4$ is H or $C_1$–$C_4$ alkyl or $C_1$–$C_4$ hydroxyalkyl;

$T^1$, $T^2$, $T^3$, $T^4$, $T^5$ are independently $C_{11}$–$C_{22}$ alkyl or alkenyl;

n and m are integers from 1 to 4; and $X^-$ is a softener-compatible anion.

Non-limiting examples of softener-compatible anions include chloride or methyl sulfate.

The alkyl, or alkenyl, chain $T^1$, $T^2$, $T^3$, $T^4$, $T^5$ must contain at least 11 carbon atoms, preferably at least 16 carbon atoms. The chain may be straight or branched.

T allow is a convenient and inexpensive source of long chain alkyl and alkenyl material. The compounds wherein $T^1$, $T^2$, $T^3$, $T^4$, $T^5$ represents the mixture of long chain materials typical for tallow are particularly preferred.

Specific examples of quaternary ammonium compounds suitable for use in the aqueous fabric softening compositions herein include:

1) N,N-di(tallowyl-oxy-ethyl)-N,N-dimethyl ammonium chloride;
2) N,N-di(tallowyl-oxy-ethyl)-N-methyl, N-(2-hydroxyethyl) ammonium methyl sulfate;
3) N,N-di(2-tallowyl-oxy-2-oxo-ethyl)-N,N-dimethyl ammonium chloride;
4) N,N-di(2-tallowyl-oxy-ethylcarbonyl-oxy-ethyl)-N,N-dimethyl ammonium chloride;
5) N-(2-tallowyl-oxy-2-ethyl)-N-(2-tallowyl-oxy-2-oxo-ethyl)-N,N-dimethyl ammonium chloride;
6) N,N,N-tri(tallowyl-oxy-ethyl)-N-methyl ammonium chloride;
7) N-(2-tallowyl-oxy-2-oxo-ethyl)-N-(tallowyl-N,N-dimethyl-ammonium chloride; and
8) 1,2-ditallowyl-oxy-3-trimethylammoniopropane chloride; and mixtures of any of the above materials.

When included therein, the cleaning compositions of the present invention typically comprise from 0.2% to about 25%, preferably from about 1% to about 8% by weight of such cationic surfactants.

Ampholytic surfactants are also suitable for use in the cleaning compositions of the present invention. These surfactants can be broadly described as aliphatic derivatives of secondary or tertiary amines, or aliphatic derivatives of heterocyclic secondary and tertiary amines in which the aliphatic radical can be straight- or branched-chain. One of the aliphatic substituents contains at least about 8 carbon atoms, typically from about 8 to about 18 carbon atoms, and at least one contains an anionic water-solubilizing group, e.g. carboxy, sulfonate, sulfate. See U.S. Pat. No. 3,929,678 to Laughlin et al., issued Dec. 30, 1975 at column 19, lines 18–35, for examples of ampholytic surfactants.

When included therein, the cleaning compositions of the present invention typically comprise from 0.2% to about 15%, preferably from about 1% to about 10% by weight of such ampholytic surfactants.

Zwitterionic surfactants are also suitable for use in cleaning compositions. These surfactants can be broadly described as derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants.

When included therein, the cleaning compositions of the present invention typically comprise from 0.2% to about 15%, preferably from about 1% to about 10% by weight of such zwitterionic surfactants.

Semi-polar nonionic surfactants are a special category of nonionic surfactants which include water-soluble amine oxides containing one alkyl moiety of from about 10 to about 18 carbon atoms and 2 moieties selected from the group consisting of alkyl groups and hydroxyalkyl groups containing from about 1 to about 3 carbon atoms; water-soluble phosphine oxides containing one alkyl moiety of from about 10 to about 18 carbon atoms and 2 moieties selected from the group consisting of alkyl groups and hydroxyalkyl groups containing from about 1 to about 3 carbon atoms; and water-soluble sulfoxides containing one alkyl moiety of from about 10 to about 18 carbon atoms and a moiety selected from the group consisting of alkyl and hydroxyalkyl moieties of from about 1 to about 3 carbon atoms.

Semi-polar nonionic detergent surfactants include the amine oxide surfactants having the formula

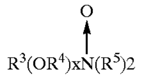

wherein $R^3$ is an alkyl, hydroxyalkyl, or alkyl phenyl group or mixtures therof containing from about 8 to about 22 carbon atoms; $R^4$ is an alkylene or hydroxyalkylene group containing from about 2 to about 3 carbon atoms or mixtures thereof; x is from 0 to about 3; and each $R^5$ is an alkyl or hydroxyalkyl group containing from about 1 to about 3 carbon atoms or a polyethylene oxide group containing from about 1 to about 3 ethylene oxide groups. The $R^5$ groups can be attached to each other, e.g., through an oxygen or nitrogen atom, to form a ring structure.

These amine oxide surfactants in particular include $C_{10}$–$C_{18}$ alkyl dimethyl amine oxides and $C_8$–$C_{12}$ alkoxy ethyl dihydroxy ethyl amine oxides.

When included therein, the cleaning compositions of the present invention typically comprise from 0.2% to about 15%, preferably from about 1% to about 10% by weight of such semi-polar nonionic surfactants.

The cleaning composition of the present invention may further comprise a co-surfactant selected from the group of primary or tertiary amines. Suitable primary amines for use herein include amines according to the formula $R_1NH_2$ wherein $R_1$ is a $C_6$–$C_{12}$, preferably $C_6$–$C_{10}$ alkyl chain or $R_4X(CH_2)_n$, X is —O—, —C(O)NH— or —NH—, $R_4$ is a $C_6$–$C_{12}$ alkyl chain n is between 1 to 5, preferably 3. $R_1$ alkyl chains may be straight or branched and may be interrupted with up to 12, preferably less than 5 ethylene oxide moieties. Preferred amines according to the formula herein above are n-alkyl amines. Suitable amines for use herein may be selected from 1-hexylamine, 1-octylamine, 1-decylamine and laurylamine. Other preferred primary amines include C8–C10 oxypropylamine, octyloxypropylamine, 2-ethylhexyl-oxypropylamine, lauryl amido propylamine and amido propylamine.

Suitable tertiary amines for use herein include tertiary amines having the formula $R_1R_2R_3N$ wherein R1 and R2 are $C_1$–$C_8$ alkylchains or

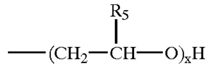

$R_3$ is either a $C_6$–$C_{12}$, preferably $C_6$–$C_{10}$ alkyl chain, or $R_3$ is $R_4X(CH_2)_n$, whereby X is —O—, —C(O)NH— or —NH—, $R_4$ is a $C_4$–$C_{12}$, n is between 1 to 5, preferably 2–3. $R_5$ is H or $C_1$–$C_2$ alkyl and x is between 1 to 6.

$R_3$ and $R_4$ may be linear or branched ; $R_3$ alkyl chains may be interrupted with up to 12, preferably less than 5, ethylene oxide moieties.

Preferred tertiary amines are $R_1R_2R_3N$ where R1 is a C6–C12 alkyl chain, R2 and R3 are C1–C3 alkyl or

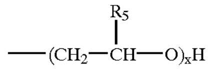

where R5 is H or CH3 and x=1–2.

Also preferred are the amidoamines of the formula:

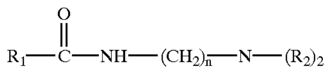

wherein $R_1$ is $C_6$–$C_{12}$ alkyl; n is 2–4, preferably n is 3; $R_2$ and $R_3$ is $C_1$–$C_4$ Most preferred amines of the present invention include 1-octylamine, 1-hexylamine, 1-decylamine, 1-dodecylamine, $C_{8-10}$oxypropylamine, N coco 1-3diaminopropane, coconutalkyldimethylamine, lauryidimethylamine, lauryl bis(hydroxyethyl)amine, coco bis(hydroxyethyl)amine, lauryl amine 2 moles propoxylated, octyl amine 2 moles propoxylated, lauryl amidopropyldimethylamine, $C_{8-10}$ amidopropyldimethylamine and C10 amidopropyldimethylamine.

The most preferred amines for use in the compositions herein are 1-hexylamine, 1-octylamine, 1-decylamine, 1-dodecylamine. Especially desirable are n-dodecyldimethylamine and bishydroxyethylcoconutalkylamine and oleylamine 7 times ethoxylated, lauryl amido propylamine and cocoamido propylamine.

Color Care and Fabric Care Benefits

Technologies which provide a type of color care benefit can also be included. Examples of these technologies are metallo catalysts for color maintenance. Such metallo catalysts are described in copending European Patent Application No. 92870181.2. Dye fixing agents, polyolefin dispersion for anti-wrinkles and improved water absorbancy, perfume and amino-functional polymer for color care treatment and perfume substantivity are further examples of color care/fabric care technologies and are described in the co-pending Patent Application No. 96870140.9, filed Nov. 7, 1996.

Fabric softening agents can also be incorporated into cleaning compositions in accordance with the present invention. These agents may be inorganic or organic in type. Inorganic softening agents are exemplified by the smectite clays disclosed in GB-A-1 400 898 and in U.S. Pat. No. 5,019,292. Organic fabric softening agents include the water insoluble tertiary amines as disclosed in GB-A1 514 276 and EP-B0 011 340 and their combination with mono C12–C14 quaternary ammonium salts are disclosed in EP-B-0 026 527 and EP-B-0 026 528 and di-long-chain amides as disclosed in EP-B-0 242 919. Other useful organic ingredients of fabric softening systems include high molecular weight polyethylene oxide materials as disclosed in EP-A-0 299 575 and 0 313 146.

Levels of smectite clay are normally in the range from 2% to 20%, more preferably from 5% to 15% by weight, with the material being added as a dry mixed component to the remainder of the formulation. Organic fabric softening agents such as the water-insoluble tertiary amines or dilong chain amide materials are incorporated at levels of from 0.5% to 5% by weight, normally from 1% to 3% by weight whilst the high molecular weight polyethylene oxide materials and the water soluble cationic materials are added at levels of from 0.1% to 2%, normally from 0.15% to 1.5% by weight. These materials are normally added to the spray dried portion of the composition, although in some instances it may be more convenient to add them as a dry mixed particulate, or spray them as molten liquid on to other solid components of the composition.

Builder System

The compositions according to the present invention may further comprise a builder system. Any conventional builder system is suitable for use herein including aluminosilicate materials, silicates, polycarboxylates, alkyl- or alkenyl-succinic acid and fatty acids, materials such as ethylenediamine tetraacetate, diethylene triamine pentamethyleneacetate, metal ion sequestrants such as aminopolyphosphonates, particularly ethylenediamine tetramethylene phosphonic acid and diethylene triamine pentamethylenephosphonic acid.

Phosphate builders can also be used herein.

Suitable builders can be an inorganic ion exchange material, commonly an inorganic hydrated aluminosilicate material, more particularly a hydrated synthetic zeolite such as hydrated zeolite A, X, B, HS or MAP.

Another suitable inorganic builder material is layered silicate, e.g. SKS-6 (Hoechst). SKS-6 is a crystalline layered silicate consisting of sodium silicate ($Na_2Si_2O_5$).

Suitable polycarboxylates containing one carboxy group include lactic acid, glycolic acid and ether derivatives thereof as disclosed in Belgian Patent Nos. 831,368, 821,369 and 821,370. Polycarboxylates containing two carboxy groups include the water-soluble salts of succinic acid, malonic acid, (ethylenedioxy) diacetic acid, maleic acid, diglycollic acid, tartaric acid, tartronic acid and fumaric acid, as well as the ether carboxylates described in German Offenlegenschrift 2,446,686, and 2,446,687 and U.S. Pat. No. 3,935,257 and the sulfinyl carboxylates described in Belgian Patent No. 840,623. Polycarboxylates containing three carboxy groups include, in particular, water-soluble citrates, aconitrates and citraconates as well as succinate derivatives such as the carboxymethyloxysuccinates described in British Patent No. 1,379,241, lactoxysuccinates described in Netherlands Application 7205873, and the oxypolycarboxylate materials such as 2-oxa-1,1,3-propane tricarboxylates described in British Patent No. 1,387,447.

Polycarboxylates containing four carboxy groups include oxydisuccinates disclosed in British Patent No. 1,261,829, 1,1,2,2-ethane tetracarboxylates, 1,1,3,3-propane tetracarboxylates and 1,1,2,3-propane tetracarboxylates. Polycarboxylates containing sulfo substituents include the sulfosuccinate derivatives disclosed in British Patent Nos. 1,398,421 and 1,398,422 and in U.S. Pat. No. 3,936,448, and the sulfonated pyrolysed citrates described in British Patent No. 1,082,179, while polycarboxylates containing phosphone substituents are disclosed in British Patent No. 1,439,000.

Alicyclic and heterocyclic polycarboxylates include cyclopentane-cis,cis,cis-tetracarboxylates, cyclopentadienide pentacarboxylates, 2,3,4,5-tetrahydro-furan-cis, cis, cis-tetracarboxylates, 2,5-tetrahydro-furan-cis-dicarboxylates, 2,2,5,5-tetrahydrofuran-tetracarboxylates, 1,2,3,4,5,6-hexane-hexacar-boxylates and and carboxymethyl derivatives of polyhydric alcohols such as sorbitol, mannitol and xylitol. Aromatic poly-carboxylates include mellitic acid, pyromellitic acid and the phthalic acid derivatives disclosed in British Patent No. 1,425,343.

Of the above, the preferred polycarboxylates are hydroxy-carboxylates containing up to three carboxy groups per molecule, more particularly citrates.

Preferred builder systems for use in the present compositions include a mixture of a water-insoluble aluminosilicate builder such as zeolite A or of a layered silicate (SKS-6), and a water-soluble carboxylate chelating agent such as citric acid.

Preferred builder systems include a mixture of a water-insoluble aluminosilicate builder such as zeolite A, and a watersoluble carboxylate chelating agent such as citric acid. Preferred builder systems for use in liquid detergent compositions of the present invention are soaps and polycarboxylates.

Other builder materials that can form part of the builder system for use in granular compositions include inorganic materials such as alkali metal carbonates, bicarbonates, silicates, and organic materials such as the organic phosphonates, amino polyalkylene phosphonates and amino polycarboxylates.

Other suitable water-soluble organic salts are the homo- or co-polymeric acids or their salts, in which the polycarboxylic acid comprises at least two carboxyl radicals separated from each other by not more than two carbon atoms. Polymers of this type are disclosed in GB-A-1,596,756. Examples of such salts are polyacrylates of MW 2000–5000 and their copolymers with maleic anhydride, such copolymers having a molecular weight of from 20,000 to 70,000, especially about 40,000.

Detergency builder salts are normally included in amounts of from 5% to 80% by weight of the composition preferably from 10% to 70% and most usually from 30% to 60% by weight.

Chelating Agents

The cleaning compositions herein may also optionally contain one or more iron and/or manganese chelating agents.

Such chelating agents can be selected from the group consisting of amino carboxylates, amino phosphonates, polyfunctionally-substituted aromatic chelating agents and mixtures therein, all as hereinafter defined. Without intending to be bound by theory, it is believed that the benefit of these materials is due in part to their exceptional ability to remove iron and manganese ions from washing solutions by formation of soluble chelates.

Amino carboxylates useful as optional chelating agents include ethylenediaminetetracetates, N-hydroxyethylethylenediaminetriacetates, nitrilotriacetates, ethylenediamine tetraproprionates, triethylenetetraaminehexacetates, diethylenetriaminepentaacetates, and ethanoldiglycines, alkali metal, ammonium, and substituted ammonium salts therein and mixtures therein.

Amino phosphonates are also suitable for use as chelating agents in the compositions of the invention when at lease low levels of total phosphorus are permitted in detergent compositions, and include ethylenediaminetetrakis (methylenephosphonates) as DEQUEST. Preferred, these amino phosphonates to not contain alkyl or alkenyl groups with more than about 6 carbon atoms.

Polyfunctionally-substituted aromatic chelating agents are also useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A preferred biodegradable chelator for use herein is ethylenediamine disuccinate ("EDDS"), especially the [S,S] isomer as described in U.S. Pat. No. 4,704,233, Nov. 3, 1987, to Hartman and Perkins.

The compositions herein may also contain water-soluble methyl glycine diacetic acid (MGDA) salts (or acid form) as a chelant or co-builder useful with, for example, insoluble builders such as zeolites, layered silicates and the like.

If utilized, these chelating agents will generally comprise from about 0.1% to about 15% by weight of the detergent compositions herein. More preferably, if utilized, the chelating agents will comprise from about 0.1% to about 3.0% by weight of such compositions.

Suds Suppressor

Another optional ingredient is a suds suppressor, exemplified by silicones, and silica-silicone mixtures. Silicones can be generally represented by alkylated polysiloxane materials while silica is normally used in finely divided forms exemplified by silica aerogels and xerogels and hydrophobic silicas of various types. These materials can be incorporated as particulates in which the suds suppressor is advantageously releasably incorporated in a water-soluble or water-dispersible, substantially non-surface-active detergent impermeable carrier. Alternatively the suds suppressor can be dissolved or dispersed in a liquid carrier and applied by spraying on to one or more of the other components.

A preferred silicone suds controlling agent is disclosed in Bartollota et al. U.S. Pat. No. 3,933,672. Other particularly useful suds suppressors are the self-emulsifying silicone suds suppressors, described in German Patent Application DTOS 2 646 126 published Apr. 28, 1977. An example of such a compound is DC-544, commercially available from Dow Corning, which is a siloxane-glycol copolymer. Especially preferred suds controlling agent are the suds suppressor system comprising a mixture of silicone oils and 2-alkyl-alcanols. Suitable 2-alkyl-alkanols are 2-butyl-octanol which are commercially available under the trade name Isofol 12 R.

Such suds suppressor systems are described in Copending European Patent application N 92870174.7 filed Nov. 10, 1992.

Especially preferred silicone suds controlling agents are described in Copending European Patent application No. 92201649.8. Said compositions can comprise a silicone/silica mixture in combination with fumed nonporous silica such as Aerosil$^R$.

The suds suppressors described above are normally employed at levels of from 0.001% to 2% by weight of the composition, preferably from 0.01% to 1% by weight.

Others

Other components used in cleaning compositions may be employed, such as soil-suspending agents, soil-release agents, optical brighteners, abrasives, bactericides, tarnish inhibitors, coloring agents, and/or encapsulated or non-encapsulated perfumes.

Especially suitable encapsulating materials are water soluble capsules which consist of a matrix of polysaccharide and polyhydroxy compounds such as described in GB 1,464,616.

Other suitable water soluble encapsulating materials comprise dextrins derived from ungelatinized starch acid-esters of substituted dicarboxylic acids such as described in U.S. Pat. No. 3,455,838. These acid-ester dextrins are, preferably, prepared from such starches as waxy maize, waxy sorghum, sago, tapioca and potato. Suitable examples of said encapsulating materials include N-Lok manufactured by National Starch. The N-Lok encapsulating material consists of a modified maize starch and glucose. The starch is modified by adding monofunctional substituted groups such as octenyl succinic acid anhydride.

Antiredeposition and soil suspension agents suitable herein include cellulose derivatives such as methylcellulose, carboxymethylcellulose and hydroxyethylcellulose, and homo- or co-polymeric polycarboxylic acids or their salts. Polymers of this type include the polyacrylates and maleic anhydride-acrylic acid copolymers previously mentioned as builders, as well as copolymers of maleic anhydride with ethylene, methylvinyl ether or methacrylic acid, the maleic anhydride constituting at least 20 mole percent of the copolymer. These materials are normally used at levels of from 0.5% to 10% by weight, more preferably from 0.75% to 8%, most preferably from 1% to 6% by weight of the composition.

Preferred optical brighteners are anionic in character, examples of which are disodium 4,4'-bis-(2-diethanolamino-4-anilino-s-triazin-6-ylamino)stilbene-2:2'disulphonate, disodium 4, -4'-bis-(2-morpholino-4-anilino-s-triazin-6-ylamino-stilbene-2:2'-disulphonate, disodium 4,4'-bis-(2,4-dianilino-s-triazin-6-ylamino)stilbene-2:2'-disulphonate, monosodium 4',4"-bis-(2,4-dianilino-s-triazin-6 ylamino) stilbene-2-sulphonate, disodium 4,4'-bis-(2-anilino4-(N-methyl-N-2-hydroxyethylamino)-s-triazin-6-ylamino) stilbene-2,2'- disulphonate, di-sodium 4,4'-bis-(4-phenyl-2,1,3-triazol-2-yl)-stilbene-2,2'disulphonate, di-so-dium 4,4'bis(2-anilino-4-(1-methyl-2-hydroxyethylamino)-s-triazin-6- ylami-no)stilbene-2,2'disulphonate, sodium 2(stilbyl-4"-(naphtho-1',2':4,5)-1,2,3- triazole-2"-sulphonate and 4,4'-bis(2-sulphostyryl)biphenyl. Highly preferred brighteners are the specific brighteners of copending European Patent application No. 95201943.8.

Other useful polymeric materials are the polyethylene glycols, particularly those of molecular weight 1000–10000, more particularly 2000 to 8000 and most preferably about 4000. These are used at levels of from 0.20% to 5% more preferably from 0.25% to 2.5% by weight. These polymers and the previously mentioned homo- or co-polymeric polycarboxylate salts are valuable for improving whiteness maintenance, fabric ash deposition, and cleaning performance on clay, proteinaceous and oxidizable soils in the presence of transition metal impurities.

Soil release agents useful in compositions of the present invention are conventionally copolymers or terpolymers of terephthalic acid with ethylene glycol and/or propylene glycol units in various arrangements. Examples of such polymers are disclosed in the commonly assigned U.S. Pat. Nos. 4,116,885 and 4,711,730 and European Published Patent Application No. 0 272 033. A particular preferred polymer in accordance with EP-A-0 272 033 has the formula $$(CH_3(PEG)_{43})_{0.75}(POH)_{0.25}[T\text{-}PO)_{2.8}(T\text{-}PEG)_{0.4}]T(PO\text{-}H)_{0.25}((PEG)_{43}CH_3)_{0.75}$$

where PEG is —$(OC_2H_4)O$—, PO is $(OC_3H_6O)$ and T is $(PcOC_6H_4CO)$.

Also very useful are modified polyesters as random copolymers of dimethyl terephthalate, dimethyl sulfoisophthalate, ethylene glycol and 1–2 propane diol, the end groups consisting primarily of sulphobenzoate and secondarily of mono esters of ethylene glycol and/or propane-diol. The target is to obtain a polymer capped at both end by sulphobenzoate groups, "primarily", in the present context most of said copolymers herein will be end-capped by sulphobenzoate groups. However, some copolymers will be less than fully capped, and therefore their end groups may consist of monoester of ethylene glycol and/or propane 1–2 diol, thereof consist "secondarily" of such species.

The selected polyesters herein contain about 46% by weight of dimethyl terephthalic acid, about 16% by weight of propane—1.2 diol, about 10% by weight ethylene glycol about 13% by weight of dimethyl sulfobenzoic acid and about 15% by weight of sulfoisophthalic acid, and have a molecular weight of about 3.000. The polyesters and their method of preparation are described in detail in EPA 311 342.

Is is well known in the art that free chlorine in tap water rapidly deactivates the enzymes comprised in detergent compositions. Therefore, using chlorine scavenger such as perborate, ammonium sulfate, sodium sulphite or polyethyleneimine at a level above 0.1% by weight of total composition, in the formulas will provide improved through the wash stability of the detergent enzymes. Compositions comprising chlorine scavenger are described in the European patent application 92870018.6 filed Jan. 31, 1992.

Alkoxylated polycarboxylates such as those prepared from polyacrylates are useful herein to provide additional grease removal performance. Such materials are described in WO 91/08281 and PCT 90/01815 at p. 4 et seq., incorporated herein by reference. Chemically, these materials comprise polyacrylates having one ethoxy side-chain per every 7–8 acrylate units. The side-chains are of the formula —$(CH_2CH_2O)_m(CH_2)_nCH_3$ wherein m is 2–3 and n is 6–12. The side-chains are ester-linked to the polyacrylate "backbone" to provide a "comb" polymer type structure. The molecular weight can vary, but is typically in the range of about 2000 to about 50,000. Such alkoxylated polycarboxylates can comprise from about 0.05% to about 10%, by weight, of the compositions herein.

Dispersants

The cleaning compositions of the present invention can also contain dispersants: Suitable water-soluble organic salts are the homo- or co-polymeric acids or their salts, in which the polycarboxylic acid comprises at least two carboxyl radicals separated from each other by not more than two carbon atoms.

Polymers of this type are disclosed in GB-A-1,596,756. Examples of such salts are polyacrylates of MW 2000–5000 and their copolymers with maleic anhydride, such copolymers having a molecular weight of from 1,000 to 100,000.

Especially, copolymer of acrylate and methylacrylate such as the 480N having a molecular weight of 4000, at a level from 0.5–20% by weight of composition can be added in the cleaning compositions of the present invention.

The compositions of the invention may contain a lime soap peptiser compound, which has preferably a lime soap dispersing power (LSDP), as defined hereinafter of no more than 8, preferably no more than 7, most preferably no more than 6. The lime soap peptiser compound is preferably present at a level from 0% to 20% by weight.

A numerical measure of the effectiveness of a lime soap peptiser is given by the lime soap dispersant power (LSDP) which is determined using the lime soap dispersant test as described in an article by H. C. Borghetty and C. A. Bergman, J. Am. Oil. Chem. Soc., volume 27, pages 88–90, (1950). This lime soap dispersion test method is widely used by practitioners in this art field being referred to, for example, in the following review articles; W. N. Linfield, Surfactant science Series, Volume 7, page 3; W. N. Linfield, Tenside surf. det., volume 27, pages 159–163, (1990); and M. K. Nagarajan, W. F. Masler, Cosmetics and Toiletries, volume 104, pages 71–73, (1989). The LSDP is the % weight ratio of dispersing agent to sodium oleate required to disperse the lime soap deposits formed by 0.025g of sodium oleate in 30ml of water of 333 ppm $CaCo_3$ (Ca:Mg=3:2) equivalent hardness.

Surfactants having good lime soap peptiser capability will include certain amine oxides, betaines, sulfobetaines, alkyl ethoxysulfates and ethoxylated alcohols.

Exemplary surfactants having a LSDP of no more than 8 for use in accord with the present invention include $C_{16}$–$C_{18}$ dimethyl amine oxide, $C_{12}$–$C_{18}$ alkyl ethoxysulfates with an average degree of ethoxylation of from 1–5, particularly $C_{12}$–$C_{15}$ alkyl ethoxysulfate surfactant with a degree of ethoxylation of amount 3 (LSDP=4), and the $C_{14}$–$C_{15}$ ethoxylated alcohols with an average degree of ethoxylation of either 12 (LSDP=6) or 30, sold under the tradenames Lutensol A012 and Lutensol A030 respectively, by BASF GmbH.

Polymeric lime soap peptisers suitable for use herein are described in the article by M. K. Nagarajan, W. F. Masler, to be found in Cosmetics and Toiletries, volume 104, pages 71–73, (1989).

Hydrophobic bleaches such as 4-[N-octanoyl-6-aminohexanoyl]benzene sulfonate, 4-[N-nonanoyl-6-aminohexanoyl]benzene sulfonate, 4-[N-decanoyl-6-aminohexanoyl]benzene sulfonate and mixtures thereof; and nonanoyloxy benzene sulfonate together with hydrophilic/hydrophobic bleach formulations can also be used as lime soap peptisers compounds.

Dye Transfer Inhibition

The cleaning compositions of the present invention can also include compounds for inhibiting dye transfer from one fabric to another of solubilized and suspended dyes encountered during fabric laundering operations involving colored fabrics.

Polymeric Dye Transfer Inhibiting Agents

The cleaning compositions according to the present invention also comprise from 0.001% to 10%, preferably from 0.01% to 2%, more preferably from 0.05% to 1% by weight of polymeric dye transfer inhibiting agents. Said polymeric dye transfer inhibiting agents are normally incorporated into cleaning compositions in order to inhibit the transfer of dyes from colored fabrics onto fabrics washed therewith. These polymers have the ability to complex or adsorb the fugitive dyes washed out of dyed fabrics before the dyes have the opportunity to become attached to other articles in the wash.

Especially suitable polymeric dye transfer inhibiting agents are polyamine N-oxide polymers, copolymers of N-vinylpyrrolidone and N-vinylimidazole, polyvinylpyrrolidone polymers, polyvinyloxazolidones and polyvinylimidazoles or mixtures thereof.

Addition of such polymers also enhances the performance of the enzymes according the invention.

a) Polyamine N-oxide Polymers

The polyamine N-oxide polymers suitable for use contain units having the following structure formula:

(I)

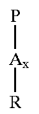

wherein P is a polymerisable unit, whereto the R—N—O group can be attached to or wherein the R—N—O group forms part of the polymerisable unit or a combination of both.

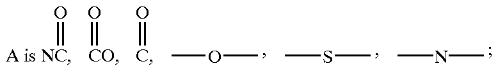

x is O or 1;

R are aliphatic, ethoxylated aliphatics, aromatic, heterocyclic or alicyclic groups or any combination thereof whereto the nitrogen of the N—O group can be attached or wherein the nitrogen of the N—O group is part of these groups.

The N—O group can be represented by the following general structures:

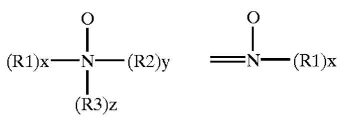

wherein R1, R2, and R3 are aliphatic groups, aromatic, heterocyclic or alicyclic groups or combinations thereof, x or/and y or/and z is 0 or 1 and wherein the nitrogen of the N—O group can be attached or wherein the nitrogen of the N—O group forms part of these groups.

The N—O group can be part of the polymerisable unit (P) or can be attached to the polymeric backbone or a combination of both.

Suitable polyamine N-oxides wherein the N—O group forms part of the polymerisable unit comprise polyamine N-oxides wherein R is selected from aliphatic, aromatic, alicyclic or heterocyclic groups.

One class of said polyamine N-oxides comprises the group of polyamine N-oxides wherein the nitrogen of the N—O group forms part of the R-group. Preferred polyamine N-oxides are those wherein R is a heterocyclic group such as pyrridine, pyrrole, imidazole, pyrrolidine, piperidine, quinoline, acridine and derivatives thereof.

Another class of said polyamine N-oxides comprises the group of polyamine N-oxides wherein the nitrogen of the N—O group is attached to the R-group.

Other suitable polyamine N-oxides are the polyamine oxides whereto the N—O group is attached to the polymerisable unit.

Preferred class of these polyamine N-oxides are the polyamine N-oxides having the general formula (I) wherein R is an aromatic, heterocyclic or alicyclic groups wherein the nitrogen of the N0 functional group is part of said R group.

Examples of these classes are polyamine oxides wherein R is a heterocyclic compound such as pyrridine, pyrrole, imidazole and derivatives thereof.

Another preferred class of polyamine N-oxides are the polyamine oxides having the general formula (I) wherein R are aromatic, heterocyclic or alicyclic groups wherein the nitrogen of the N0 functional group is attached to said R groups.

Examples of these classes are polyamine oxides wherein R groups can be aromatic such as phenyl.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof.

The amine N-oxide polymers of the present invention typically have a ratio of amine to the amine N-oxide of 10:1 to 1:1000000. However the amount of amine oxide groups present in the polyamine oxide polymer can be varied by appropriate copolymerization or by appropriate degree of N-oxidation. Preferably, the ratio of amine to amine N-oxide is from 2:3 to 1:1000000. More preferably from 1:4 to 1:1000000, most preferably from 1:7 to 1:1000000. The polymers of the present invention actually encompass random or block copolymers where one monomer type is an amine N-oxide and the other monomer type is either an amine N-oxide or not. The amine oxide unit of the polyamine N-oxides has a PKa<10, preferably PKa<7, more preferred PKa<6.

The polyamine oxides can be obtained in almost any degree of polymerisation. The degree of polymerisation is not critical provided the material has the desired water-solubility and dye-suspending power.

Typically, the average molecular weight is within the range of 500 to 1000,000; preferably from 1,000 to 50,000, more preferably from 2,000 to 30,000, most preferably from 3,000 to 20,000.

b) Copolymers of N-vinylpyrrolidone and N-vinylimidazole

The N-vinylimidazole N-vinylpyrrolidone polymers used in the present invention have an average molecular weight range from 5,000–1,000,000, preferably from 5,000–200,000.

Highly preferred polymers for use in detergent compositions according to the present invention comprise a polymer selected from N-vinylimidazole N-vinylpyrrolidone copolymers wherein said polymer has an average molecular weight range from 5,000 to 50,000 more preferably from 8,000 to 30,000, most preferably from 10,000 to 20,000.

The average molecular weight range was determined by light scattering as described in Barth H. G. and Mays J. W. Chemical Analysis Vol 113,"Modern Methods of Polymer Characterization".

Highly preferred N-vinylimidazole N-vinylpyrrolidone copolymers have an average molecular weight range from 5,000 to 50,000; more preferably from 8,000 to 30,000; most preferably from 10,000 to 20,000.

The N-vinylimidazole N-vinylpyrrolidone copolymers characterized by having said average molecular weight range provide excellent dye transfer inhibiting properties while not adversely affecting the cleaning performance of detergent compositions formulated therewith.

The N-vinylimidazole N-vinylpyrrolidone copolymer of the present invention has a molar ratio of N-vinylimidazole to N-vinylpyrrolidone from 1 to 0.2, more preferably from 0.8 to 0.3, most preferably from 0.6 to 0.4.

c) Polyvinylpyrrolidone

The detergent compositions of the present invention may also utilize polyvinylpyrrolidone ("PVP") having an average molecular weight of from about 2,500 to about 400,000, preferably from about 5,000 to about 200,000, more preferably from about 5,000 to about 50,000, and most preferably from about 5,000 to about 15,000. Suitable polyvinylpyrrolidones are commercially vailable from ISP Corporation, New York, N.Y. and Montreal, Canada under the product names PVP K-15 (viscosity molecular weight of 10,000), PVP K-30 (average molecular weight of 40,000), PVP K-60 (average molecular weight of 160,000), and PVP K-90 (average molecular weight of 360,000). Other suitable polyvinylpyrrolidones which are commercially available from BASF Cooperation include Sokalan HP 165 and Sokalan HP 12; polyvinylpyrrolidones known to persons skilled in the detergent field (see for example EP-A-262,897 and EP-A-256,696).

d) Polyvinyloxazolidone:

The detergent compositions of the present invention may also utilize polyvinyloxazolidone as a polymeric dye transfer inhibiting agent. Said polyvinyloxazolidones have an average molecular weight of from about 2,500 to about 400,000, preferably from about 5,000 to about 200,000, more preferably from about 5,000 to about 50,000, and most preferably from about 5,000 to about 15,000.

e) Polyvinylimidazole:

The detergent compositions of the present invention may also utilize polyvinylimidazole as polymeric dye transfer inhibiting agent. Said polyvinylimidazoles have an average about 2,500 to about 400,000, preferably from about 5,000 to about 200,000, more preferably from about 5,000 to about 50,000, and most preferably from about 5,000 to about 15,000.

f) Cross-linked Polymers:

Cross-linked polymers are polymers whose backbone are interconnected to a certain degree; these links can be of chemical or physical nature, possibly with active groups n the backbone or on branches; cross-linked polymers have been described in the Journal of Polymer Science, volume 22, pages 1035–1039.

In one embodiment, the cross-linked polymers are made in such a way that they form a three-dimensional rigid structure, which can entrap dyes in the pores formed by the three-dimensional structure. In another embodiment, the cross-linked polymers entrap the dyes by swelling.

Such cross-linked polymers are described in the co-pending patent application 94870213.9.

Method of Washing

The compositions of the invention may be used in essentially any washing or cleaning methods, including soaking methods, pretreatment methods and methods with rinsing steps for which a separate rinse aid composition may be added.

The process described herein comprises contacting fabrics with a laundering solution in the usual manner and exemplified hereunder.

The process of the invention is conveniently carried out in the course of the cleaning process. The method of cleaning is preferably carried out at 5° C. to 95° C., especially between 10° C. and 60° C. The pH of the treatment solution is preferably from 7 to 12.

A preferred machine dishwashing method comprises treating soiled articles with an aqueous liquid having dissolved or dispensed therein an effective amount of the machine dishwashing or rinsing composition. A conventional effective amount of the machine dishwashing composition means from 8–60 g of product dissolved or dispersed in a wash volume from 3–10 liters.

According to a manual dishwashing method, soiled dishes are contacted with an effective amount of the dishwashing composition, typically from 0.5–20g (per 25 dishes being treated). Preferred manual dishwashing methods include the application of a concentrated solution to the surfaces of the dishes or the soaking in large volume of dilute solution of the detergent composition.

The following examples are meant to exemplify compositions of the present invention, but are not necessarily meant to limit or otherwise define the scope of the invention.

In the cleaning compositions, the enzymes levels are expressed by pure enzyme by weight of the total composition and unless otherwise specified, the detergent ingredients are expressed by weight of the total compositions. The abbreviated component identifications therein have the following meanings:

| | |
|---|---|
| LAS | Sodium linear $C_{11-13}$ alkyl benzene sulphonate. |
| TAS | Sodium tallow alkyl sulphate. |
| CxyAS | Sodium $C_{1x}$–$C_{1y}$ alkyl sulfate. |
| CxySAS | Sodium $C_{1x}$–$C_{1y}$ secondary (2,3) alkyl sulfate. |
| CxyEz | $C_{1x}$–$C_{1y}$ predominantly linear primary alcohol condensed with an average of z moles of ethylene oxide. |
| CxyEzS | $C_{1x}$–$C_{1y}$ sodium alkyl sulfate condensed with an average of z moles of ethylene oxide. |
| QAS | $R_2.N+(CH_3)_2(C_2H_4OH)$ with $R_2 = C_{12}$–$C_{14}$. |
| QAS 1 | $R_2.N+(CH_3)_2(C_2H_4OH)$ with $R_2 = C_8$–$C_{11}$. |
| APA | $C_{8-10}$ amido propyl dimethyl amine. |
| Soap | Sodium linear alkyl carboxylate derived from a 80/20 mixture of tallow and coconut fatty acids. |
| Nonionic | $C_{13}$–$C_{15}$ mixed ethoxylated/propoxylated fatty alcohol with an average degree of ethoxylation of 3.8 and an average degree of propoxylation of 4.5. |
| Neodol 45-13 | C14–C15 linear primary alcohol ethoxylate, sold by Shell Chemical CO. |
| STS | Sodium toluene sulphonate. |
| CFAA | $C_{12}$–$C_{14}$ alkyl N-methyl glucamide. |
| TFAA | $C_{16}$–$C_{18}$ alkyl N-methyl glucamide. |
| TPKFA | $C_{12}$–$C_{14}$ topped whole cut fatty acids. |
| DEQA | Di-(tallow-oxy-ethyl) dimethyl ammonium chloride. |
| DEQA (2) | Di-(soft-tallowyloxyethyl) hydroxyethyl methyl ammonium methylsulfate. |
| DTDMAMS | Ditallow dimethyl ammonium methylsulfate. |
| SDASA | 1:2 ratio of stearyldimethyl amine:triple-pressed stearic acid. |
| Silicate | Amorphous Sodium Silicate ($SiO_2$:$Na_2O$ ratio = 1.6–3.2). |
| Metasilicate | Sodium metasilicate ($SiO_2$:$Na_2O$ ratio = 1.0). |
| Zeolite A | Hydrated Sodium Aluminosilicate of formula $Na_{12}(A1O_2SiO_2)_{12}.27H_2O$ having a primary particle size in the range from 0.1 to 10 micrometers (Weight expressed on an anhydrous basis). |
| Na-SKS-6 | Crystalline layered silicate of formula δ-$Na_2Si_2O_5$. |
| Citrate | Tri-sodium citrate dihydrate of activity 86.4% with a particle size distribution between 425 and 850 micrometers. |

-continued

| | |
|---|---|
| Citric | Anhydrous citric acid. |
| Borate | Sodium borate |
| Carbonate | Anhydrous sodium carbonate with a particle size between 200 and 900 micrometers. |
| Bicarbonate | Anhydrous sodium hydrogen carbonate with a particle size distribution between 400 and 1200 micrometers. |
| Sulphate | Anhydrous sodium sulphate. |
| Mg Sulphate | Anhydrous magnesium sulfate. |
| STPP | Sodium tripolyphosphate. |
| TSPP | Tetrasodium pyrophosphate. |
| MA/AA | Random copolymer of 4:1 acrylate/maleate, average molecular weight about 70,000–80,000. |
| MA/AA 1 | Random copolymer of 6:4 acrylate/maleate, average molecular weight about 10,000. |
| AA | Sodium polyacrylate polymer of average molecular weight 4,500. |
| PA30 | Polyacrylic acid of average molecular weight of between about 4,500–8,000. |
| 480N | Random copolymer of 7:3 acrylate/methacrylate, average molecular weight about 3,500. |
| Polygel/carbopol | High molecular weight crosslinked polyacrylates. |
| PB1 | Anhydrous sodium perborate monohydrate of nominal formula $NaBO_2.H_2O_2$. |
| PB4 | Sodium perborate tetrahydrate of nominal formula $NaBO_2.3H_2O.H_2O_2$. |
| Percarbonate | Anhydrous sodium percarbonate of nominal formula $2Na_2CO_3.3H_2O_2$. |
| NaDCC | Sodium dichloroisocyanurate. |
| TAED | Tetraacetylethylenediamine. |
| NOBS | Nonanoyloxybenzene sulfonate in the form of the sodium salt. |
| NACA-OBS | (6-nonamidocaproyl) oxybenzene sulfonate. |
| DTPA | Diethylene triamine pentaacetic acid. |
| HEDP | 1,1-hydroxyethane diphosphonic acid. |
| DETPMP | Diethyltriamine penta (methylene) phosphonate, marketed by Monsanto under the Trade name Dequest 2060. |
| EDDS | Ethylenediamine-N,N'-disuccinic acid, (S,S) isomer in the form of its sodium salt |
| MnTACN | Manganese 1,4,7-trimethyl-1,4,7-triazacyclononane. |
| Photoactivated Bleach | Sulfonated zinc phtalocyanine encapsulated in dextrin soluble polymer. |
| Photoactivated Bleach 1 | Sulfonated alumino phtalocyanine encapsulated in dextrin soluble polymer. |
| PAAC | Pentaamine acetate cobalt(III) salt. |
| Paraffin | Paraffin oil sold under the tradename Winog 70 by Wintershall. |
| NaBz | Sodium benzoate. |
| BzP | Benzoyl Peroxide. |
| Cytochrome I | Recombinant Cytochrome P450 bm3 from *E. coli* according to Wen and Fulco, J. Biol. Chem., 262, 6676, 1987. |
| Cytochrome II | cytochrome P450 cam isolated from *Pseudomonas putida* grown on Camphor and purified according to Peterson et al. in Methods in Enzymology, Academic Press New York 1978, Vol. 52 pp 151–157. |
| Electron donor I | NADPH, Nicotinamide Adenine Dinucleotide phosphate reduced form. Sigma product number N1630. |
| Electron donor II | Sodium sulfite $Na_2SO_3$ photographic grade (pfs) 97%. Sigma product S 6778. |
| Ferredoxin | From spinach partially purified, 25%. Sigma product F3013. |
| Ferredoxin reductase | Blend of Ferredoxin-NADP reductase (E.C. 1.18.1.2) and ferredoxin-NADP from spinach. Sigma product F 0628. |
| Dehydrogenase I | alcohol dehydrogenase E.C. 1.1.1.2 from *Thermoanaerobium brockii*. Sigma product number A9287 |
| Dehydrogenase II | alcohol dehydrogenase E.C. 1.1.1.2 from *Thermoanaerobium brockii* immobilised on agarose beads. Sigma product number A2809 |
| Dehydrogenase III | aromatic alcohol dehydrogenase E.C. 1.1.1.2 from *Lactobacillus kefir*. Sigma product number A9560. |
| Dehydrogenase IV | formate dehydrogenase E.C. 1.2.1.2 from *Candida boidinii*. Sigma product number F5632 |
| Isopropanol | 2-propanol 99%. Sigma product number 27,049-0. |

-continued

| | |
|---|---|
| Benzyl alcohol | 99%. Sigma product number B2263. |
| Protease | Proteolytic enzyme sold under the tradename Savinase, Alcalase, Durazym by Novo Nordisk NS, Maxacal, Maxapem sold by Gist-Brocades and proteases described in patents WO91/06637 and/or WO95/10591 and/or EP 251 446. |
| Amylase | Amylolytic enzyme sold under the tradename Purafact Ox $Am^R$ described in WO 94/18314, WO96/05295 sold by Genencor; Termamyl ®, Fungamyl ® and Duramyl ®, all available from Novo Nordisk A/S and those described in WO95/26397. |
| Lipase | Lipolytic enzyme sold under the tradename Lipolase, Lipolase Ultra by Novo Nordisk A/S and Lipomax by Gist-Brocades. |
| Cellulase | Cellulytic enzyme sold under the tradename Carezyme, Celluzyme and/or Endolase by Novo Nordisk A/S. |
| CMC | Sodium carboxymethyl cellulose. |
| PVP | Polyvinyl polymer, with an average molecular weight of 60,000. |
| PVNO | Polyvinylpyridine-N-Oxide, with an average molecular weight of 50,000. |
| PVPVI | Copolymer of vinylimidazole and vinylpyrrolidone, with an average molecular weight of 20,000. |
| Brightener 1 | Disodium 4,4'-bis(2-sulphostyryl)biphenyl. |
| Brightener 2 | Disodium 4,4'-bis(4-anilino-6-morpholino-1.3.5-triazin-2-yl) stilbene-2:2'-disulfonate. |
| Silicone antifoam | Polydimethylsiloxane foam controller with siloxane-oxyalkylene copolymer as dispersing agent with a ratio of said foam controller to said dispersing agent of 10:1 to 100:1. |
| Suds Suppressor | 12% Silicone/silica, 18% stearyl alcohol, 70% starch in granular form. |
| Opacifier | Water based monostyrene latex mixture, sold by BASF Aktiengesellschaft under the tradename Lytron 621. |
| SRP 1 | Anionically end capped poly esters. |
| SRP 2 | Diethoxylated poly (1,2 propylene terephtalate) short block polymer. |
| QEA | bis $((C_2H_5O)(C_2H_4O)_n)(CH_3)—N^+—C_6H_{12}—N^+—(CH_3)$ bis $((C_2H_5O)—(C_2H_4O))_n$, wherein n = from 20 to 30. |
| PEI | Polyethyleneimine with an average molecular weight of 1800 and an average ethoxylation degree of 7 ethyleneoxy residues per nitrogen. |
| SCS | Sodium cumene sulphonate. |
| HMWPEO | High molecular weight polyethylene oxide. |
| PEGx | Polyethylene glycol, of a molecular weight of x. |
| PEO | Polyethylene oxide, with an average molecular weight of 5,000. |
| TEPAE | Tetreaethylenepentaamine ethoxylate. |
| BTA | Benzotriazole. |
| Silica dental abrasive | Precipitated silica identified as Zeodent 119 offered by J. M. Huber. |
| Carboxyvinyl polymer | Carbopol offered by B. F. Goodrich Chemical Company. |
| Carrageenan | Iota Carrageenan offered by Hercules Chemical Company. |
| pH | Measured as a 1% solution in distilled water at 20° C. |

EXAMPLE 1

The following high density laundry detergent compositions were prepared according to the present invention:

| | I | II | III | IV | V | VI |
|---|---|---|---|---|---|---|
| LAS | 8.0 | 8.0 | 8.0 | 2.0 | 6.0 | 6.0 |
| TAS | — | 0.5 | — | 0.5 | 1.0 | 0.1 |
| C46(S)AS | 2.0 | 2.5 | — | — | — | — |
| C25AS | — | — | — | 7.0 | 4.5 | 5.5 |
| C68AS | 2.0 | 5.0 | 7.0 | — | — | — |
| C25E5 | — | — | 3.4 | 10.0 | 4.6 | 4.6 |
| C25E7 | 3.4 | 3.4 | 1.0 | — | — | — |
| C25E3S | — | — | — | 2.0 | 5.0 | 4.5 |
| QAS | — | 0.8 | — | — | — | — |
| QAS 1 | — | — | — | 0.8 | 0.5 | 1.0 |
| Zeolite A | 18.1 | 18.0 | 14.1 | 18.1 | 20.0 | 18.1 |
| Citric | — | — | — | 2.5 | — | 2.5 |
| Carbonate | 13.0 | 13.0 | 27.0 | 10.0 | 10.0 | 13.0 |
| Na-SKS-6 | — | — | — | 10.0 | — | 10.0 |
| Silicate | 1.4 | 1.4 | 3.0 | 0.3 | 0.5 | 0.3 |
| Citrate | — | 1.0 | — | 3.0 | — | — |
| | I | II | III | IV | V | VI |
| Sulfate | 26.1 | 26.1 | 26.1 | 6.0 | — | — |
| Mg sulfate | 0.3 | — | — | 0.2 | — | 0.2 |
| MA/AA | 0.3 | 0.3 | 0.3 | 4.0 | 1.0 | 1.0 |
| CMC | 0.2 | 0.2 | 0.2 | 0.2 | 0.4 | 0.4 |
| PB4 | 9.0 | 9.0 | 5.0 | — | — | — |
| Percarbonate | — | — | — | — | 18.0 | 18.0 |
| TAED | 1.5 | 0.4 | 1.5 | — | 3.9 | 4.2 |
| NACA-OBS | — | 2.0 | 1.0 | — | — | — |
| DETPMP | 0.25 | 0.25 | 0.25 | 0.25 | — | — |
| SRP 1 | — | — | — | 0.2 | — | 0.2 |
| EDDS | — | 0.25 | 0.4 | — | 0.5 | 0.5 |
| CFAA | — | 1.0 | — | 2.0 | — | — |
| HEDP | 0.3 | 0.3 | 0.3 | 0.3 | 0.4 | 0.4 |
| QEA | — | — | — | 0.2 | — | 0.5 |
| Cytochrome I | 0.005 | 0.005 | 0.1 | 0.1 | 0.2 | 0.5 |
| Electron donor I | 0.05 | 0.1 | 0.9 | 1.0 | 2.0 | 2.0 |
| Protease | 0.009 | 0.009 | 0.01 | 0.04 | 0.05 | 0.03 |
| Amylase | 0.002 | 0.002 | 0.002 | 0.006 | 0.008 | 0.008 |
| Cellulase | 0.0007 | — | — | 0.0007 | 0.0007 | 0.0007 |
| Lipase | 0.006 | — | — | 0.01 | 0.01 | 0.01 |
| Photoactivated bleach (ppm) | 15 | 15 | 15 | — | 20 | 20 |
| PVNO/PVPVI | — | — | — | 0.1 | — | — |
| Brightener 1 | 0.09 | 0.09 | 0.09 | — | 0.09 | 0.09 |
| Perfume | 0.3 | 0.3 | 0.3 | 0.4 | 0.4 | 0.4 |
| Silicone antifoam | 0.5 | 0.5 | 0.5 | — | 0.3 | 0.3 |
| Density in g/liter | 850 | 850 | 850 | 850 | 850 | 850 |
| Miscellaneous and minors | Up to 100% | | | | | |

EXAMPLE 2

The following granular laundry detergent compositions of particular utility under European machine wash conditions were prepared according to the present invention:

| | I | II | III | IV | V | VI |
|---|---|---|---|---|---|---|
| LAS | 5.5 | 7.5 | 5.0 | 5.0 | 6.0 | 7.0 |
| TAS | 1.25 | 1.9 | — | 0.8 | 0.4 | 0.3 |
| C24AS/C25AS | — | 2.2 | 5.0 | 5.0 | 5.0 | 2.2 |
| C25E3S | — | 0.8 | 1.0 | 1.5 | 3.0 | 1.0 |
| C45E7 | 3.25 | — | — | — | — | 3.0 |
| TFAA | — | — | 2.0 | — | — | — |
| C25E5 | — | 5.5 | — | — | — | — |
| QAS | 0.8 | — | — | — | — | — |
| QAS 1 | — | 0.7 | 1.0 | 0.5 | 1.0 | 0.7 |
| STPP | 19.7 | — | — | — | — | — |
| Zeolite A | — | 19.5 | 25.0 | 19.5 | 20.0 | 17.0 |
| NaSKS-6/citric acid (79:21) | — | 10.6 | — | 10.6 | — | — |
| Na-SKS-6 | — | — | 9.0 | — | 10.0 | 10.0 |

-continued

| | | | | | | |
|---|---|---|---|---|---|---|
| Carbonate | 6.1 | 21.4 | 9.0 | 10.0 | 10.0 | 18.0 |
| Bicarbonate | — | 2.0 | 7.0 | 5.0 | — | 2.0 |
| Silicate | 6.8 | — | — | 0.3 | 0.5 | — |
| Citrate | — | — | 4.0 | 4.0 | — | — |
| Sulfate | 39.8 | — | — | 5.0 | — | 12.0 |
| Mg sulfate | — | — | 0.1 | 0.2 | 0.2 | — |
| MA/AA | 0.5 | 1.6 | 3.0 | 4.0 | 1.0 | 1.0 |
| CMC | 0.2 | 0.4 | 1.0 | 1.0 | 0.4 | 0.4 |
| PB4 | 5.0 | 12.7 | — | — | — | — |
| Percarbonate | — | — | — | — | 18.0 | 15.0 |
| TAED | 0.5 | 3.1 | — | — | 5.0 | — |
| NACA-OBS | 1.0 | 3.5 | — | — | — | 2.5 |
| DETPMP | 0.25 | 0.2 | 0.3 | 0.4 | — | 0.2 |
| HEDP | — | 0.3 | — | 0.3 | 0.3 | 0.3 |
| QEA | — | — | 1.0 | 1.0 | 1.0 | — |
| Cytochrome I | 0.07 | 0.1 | 0.2 | 0.07 | 0.1 | 0.2 |
| Electron donor I | 0.7 | 1.0 | 1.5 | 0.1 | 1.0 | 1.5 |
| Protease | 0.009 | 0.03 | 0.03 | 0.05 | 0.05 | 0.02 |
| Lipase | 0.003 | 0.003 | 0.006 | 0.006 | 0.006 | 0.004 |
| Cellulase | 0.0006 | 0.0006 | 0.0005 | 0.0005 | 0.0007 | 0.0007 |
| | I | II | III | IV | V | VI |
| Amylase | 0.002 | 0.002 | 0.006 | 0.006 | 0.01 | 0.003 |
| PVNO/PVPVI | — | — | 0.2 | 0.2 | — | — |
| PVP | 0.9 | 1.3 | — | — | — | 0.9 |
| SRP 1 | — | — | 0.2 | 0.2 | 0.2 | — |
| Photoactivated bleach (ppm) | 15 | 27 | — | — | 20 | 20 |
| Photoactivated bleach (1) (ppm) | 15 | — | — | — | — | — |
| Brightener 1 | 0.08 | 0.2 | — | — | 0.09 | 0.15 |
| Brightener 2 | — | 0.04 | — | — | — | — |
| Perfume | 0.3 | 0.5 | 0.4 | 0.3 | 0.4 | 0.3 |
| Silicone antifoam | 0.5 | 2.4 | 0.3 | 0.5 | 0.3 | 2.0 |
| Density in g/liter | 750 | 750 | 750 | 750 | 750 | 750 |
| Miscellaneous and minors | | | Up to 100% | | | |

EXAMPLE 3

The following detergent compositions of particular utility under European machine wash conditions were prepared according to the present invention:

| | I | II | III | IV |
|---|---|---|---|---|
| Blown Powder | | | | |
| LAS | 6.0 | 5.0 | 11.0 | 6.0 |
| TAS | 2.0 | — | — | 2.0 |
| Zeolite A | 24.0 | — | — | 20.0 |
| STPP | — | 27.0 | 24.0 | — |
| Sulfate | 4.0 | 6.0 | 13.0 | — |
| MA/AA | 1.0 | 4.0 | 6.0 | 2.0 |
| Silicate | 1.0 | 7.0 | 3.0 | 3.0 |
| CMC | 1.0 | 1.0 | 0.5 | 0.6 |
| Brightener 1 | 0.2 | 0.2 | 0.2 | 0.2 |
| Silicone antifoam | 1.0 | 1.0 | 1.0 | 0.3 |
| DETPMP | 0.4 | 0.4 | 0.2 | 0.4 |
| | I | II | III | IV |
| Spray On | | | | |
| Brightener | 0.02 | — | — | 0.02 |
| C45E7 | — | — | — | 5.0 |
| C45E2 | 2.5 | 2.5 | 2.0 | — |
| C45E3 | 2.6 | 2.5 | 2.0 | — |

-continued

| | | | | |
|---|---|---|---|---|
| Perfume | 0.5 | 0.3 | 0.5 | 0.2 |
| Silicone antifoam | 0.3 | 0.3 | 0.3 | — |
| Dry additives | | | | |
| QEA | — | — | — | 1.0 |
| EDDS | 0.3 | — | — | — |
| Sulfate | 2.0 | 3.0 | 5.0 | 10.0 |
| Carbonate | 6.0 | 13.0 | 15.0 | 14.0 |
| Citric | 2.5 | — | — | 2.0 |
| QAS 1 | 0.5 | — | — | 0.5 |
| Na-SKS-6 | 10.0 | — | — | — |
| Percarbonate | 18.5 | — | — | — |
| PB4 | — | 18.0 | 10.0 | 21.5 |
| TAED | 2.0 | 2.0 | — | 2.0 |
| NACA-OBS | 3.0 | 2.0 | 4.0 | — |
| Cytochrome I | 0.007 | 0.05 | 0.1 | 0.05 |
| Electron donor I | 0.02 | 0.1 | 1.0 | 0.1 |
| Protease | 0.03 | 0.03 | 0.03 | 0.03 |
| Lipase | 0.008 | 0.008 | 0.008 | 0.004 |
| Amylase | 0.003 | 0.003 | 0.003 | 0.006 |
| Brightener 1 | 0.05 | — | — | 0.05 |
| Miscellaneous and minors | | Up to 100% | | |

EXAMPLE 4

The following granular detergent compositions were prepared according to the present invention:

| | I | II | III | IV | V | VI |
|---|---|---|---|---|---|---|
| Blown Powder | | | | | | |
| LAS | 23.0 | 8.0 | 7.0 | 9.0 | 7.0 | 7.0 |
| TAS | — | — | — | — | 1.0 | — |
| C45AS | 6.0 | 6.0 | 5.0 | 8.0 | — | — |
| C45AES | — | 1.0 | 1.0 | 1.0 | — | — |
| C45E35 | — | — | — | — | 2.0 | 4.0 |
| Zeolite A | 10.0 | 18.0 | 14.0 | 12.0 | 10.0 | 10.0 |
| MA/AA | — | 0.5 | — | — | — | 2.0 |
| MA/AA 1 | 7.0 | — | — | — | — | — |
| AA | — | 3.0 | 3.0 | 2.0 | 3.0 | 3.0 |
| Sulfate | 5.0 | 6.3 | 14.3 | 11.0 | 15.0 | 19.3 |
| Silicate | 10.0 | 1.0 | 1.0 | 1.0 | 1.0 | 1.0 |
| Carbonate | 15.0 | 20.0 | 10.0 | 20.7 | 8.0 | 6.0 |
| PEG 4000 | 0.4 | 1.5 | 1.5 | 1.0 | 1.0 | 1.0 |
| DTPA | — | 0.9 | 0.5 | — | — | 0.5 |
| Brightener 2 | 0.3 | 0.2 | 0.3 | — | 0.1 | 0.3 |
| Spray On | | | | | | |
| C45E7 | — | 2.0 | — | — | 2.0 | 2.0 |
| C25E9 | 3.0 | — | — | — | — | — |
| C23E9 | — | — | 1.5 | 2.0 | — | 2.0 |
| Perfume | 0.3 | 0.3 | 0.3 | 2.0 | 0.3 | 0.3 |
| Agglomerates | | | | | | |
| C45AS | — | 5.0 | 5.0 | 2.0 | — | 5.0 |
| LAS | — | 2.0 | 2.0 | — | — | 2.0 |
| Zeolite A | — | 7.5 | 7.5 | 8.0 | — | 7.5 |
| Carbonate | — | 4.0 | 4.0 | 5.0 | — | 4.0 |
| PEG 4000 | — | 0.5 | 0.5 | — | — | 0.5 |
| Misc (Water etc.) | — | 2.0 | 2.0 | 2.0 | — | 2.0 |
| Dry additives | | | | | | |
| QAS | — | — | — | — | 1.0 | — |
| Citric | — | — | — | — | 2.0 | — |
| PB4 | — | — | — | — | 12.0 | 1.0 |
| PB1 | 4.0 | 1.0 | 3.0 | 2.0 | — | — |
| Percarbonate | — | — | — | — | 2.0 | 10.0 |
| Carbonate | — | 5.3 | 1.8 | — | 4.0 | 4.0 |

| | I | II | III | IV | V | VI |
|---|---|---|---|---|---|---|
| NOBS | 4.0 | — | 6.0 | — | — | 0.6 |
| Methyl cellulose | 0.2 | — | — | — | — | — |
| Na-SKS-6 | 8.0 | — | — | — | — | — |
| STS | — | — | 2.0 | — | 1.0 | — |
| Culmene sulfonic acid | — | 1.0 | — | — | — | 2.0 |
| Cytochrome I | 0.05 | 0.1 | 2.0 | 0.005 | 0.1 | 2.0 |
| Electron donor I | 0.05 | 0.1 | 2.0 | 0.05 | 0.1 | 2.0 |
| Protease | 0.02 | 0.02 | 0.02 | 0.01 | 0.02 | 0.02 |
| Lipase | 0.004 | — | 0.004 | — | 0.004 | 0.008 |
| Amylase | 0.003 | — | 0.002 | — | 0.003 | — |
| Cellulase | 0.0005 | 0.0005 | 0.0005 | 0.0007 | 0.0005 | 0.0005 |
| PVPVI | — | — | — | — | 0.5 | 0.1 |
| PVP | — | — | — | — | 0.5 | — |
| PVNO | — | — | 0.5 | 0.3 | — | — |
| QEA | — | — | — | — | 1.0 | — |
| SRP 1 | 0.2 | 0.5 | 0.3 | — | 0.2 | — |
| Silicone antifoam | 0.2 | 0.4 | 0.2 | 0.4 | 0.1 | — |
| Mg sulfate | — | — | 0.2 | — | 0.2 | — |
| Miscellaneous and minors | | | Up to 100% | | | |

EXAMPLE 5

The following nil bleach-containing detergent compositions of particular use in the washing of coloured clothing were prepared according to the present invention:

| | I | II | III |
|---|---|---|---|
| Blown Powder | | | |
| Zeolite A | 15.0 | 15.0 | — |
| Sulfate | — | 5.0 | — |
| LAS | 3.0 | 3.0 | — |
| DETPMP | 0.4 | 0.5 | — |
| CMC | 0.4 | 0.4 | — |
| MA/AA | 4.0 | 4.0 | — |

| | I | II | III |
|---|---|---|---|
| Agglomerates | | | |
| C45AS | — | — | 11.0 |
| LAS | 6.0 | 5.0 | — |
| TAS | 3.0 | 2.0 | — |
| Silicate | 4.0 | 4.0 | — |
| Zeolite A | 10.0 | 15.0 | 13.0 |
| CMC | — | — | 0.5 |
| MA/AA | — | — | 2.0 |
| Carbonate | 9.0 | 7.0 | 7.0 |
| Spray-on | | | |
| Perfume | 0.3 | 0.3 | 0.5 |
| C45E7 | 4.0 | 4.0 | 4.0 |
| C25E3 | 2.0 | 2.0 | 2.0 |
| Dry additives | | | |
| MA/AA | — | — | 3.0 |
| Na-SKS-6 | — | — | 12.0 |
| Citrate | 10.0 | — | 8.0 |
| Bicarbonate | 7.0 | 3.0 | 5.0 |
| Carbonate | 8.0 | 5.0 | 7.0 |
| PVPVI/PVNO | 0.5 | 0.5 | 0.5 |
| Cytochrome I | 0.01 | 0.05 | 0.1 |
| Electron donor I | 0.05 | 0.15 | 0.1 |
| Protease | 0.03 | 0.02 | 0.05 |
| Lipase | 0.008 | 0.008 | 0.008 |
| Amylase | 0.01 | 0.01 | 0.01 |
| Cellulase | 0.001 | 0.001 | 0.001 |
| Silicone antifoam | 5.0 | 5.0 | 5.0 |
| Sulfate | — | 9.0 | — |
| Density (g/liter) | 700 | 700 | 700 |
| Miscellaneous and minors | | Up to 100% | |

EXAMPLE 6

The following detergent compositions were prepared according to the present invention:

| | I | II | III | IV |
|---|---|---|---|---|
| Base granule | | | | |
| Zeolite A | 30.0 | 22.0 | 24.0 | 10.0 |
| Sulfate | 10.0 | 5.0 | 10.0 | 7.0 |
| MA/AA | 3.0 | — | — | — |
| AA | — | 1.6 | 2.0 | — |
| MA/AA 1 | — | 12.0 | — | 6.0 |
| LAS | 14.0 | 10.0 | 9.0 | 20.0 |
| C45AS | 8.0 | 7.0 | 9.0 | 7.0 |
| C45AES | — | 1.0 | 1.0 | — |
| Silicate | — | 1.0 | 0.5 | 10.0 |
| Soap | — | 2.0 | — | — |
| Brightener 1 | 0.2 | 0.2 | 0.2 | 0.2 |
| Carbonate | 6.0 | 9.0 | 10.0 | 10.0 |
| PEG 4000 | — | 1.0 | 1.5 | — |
| DTPA | — | 0.4 | — | — |
| Spray On | | | | |
| C25E9 | — | — | — | 5.0 |
| C45E7 | 1.0 | 1.0 | — | — |

-continued

| | I | II | III | IV |
|---|---|---|---|---|
| C23E9 | — | 1.0 | 2.5 | — |
| Perfume | 0.2 | 0.3 | 0.3 | — |
| Dry additives | | | | |
| Carbonate | 5.0 | 10.0 | 18.0 | 8.0 |
| PVPVI/PVNO | 0.5 | — | 0.3 | — |
| Cytochrome 1 | 0.001 | 0.005 | 0.01 | 0.1 |
| Electron donor 1 | 0.01 | 0.05 | 0.09 | 0.9 |
| Protease | 0.03 | 0.03 | 0.03 | 0.02 |
| Lipase | 0.008 | — | — | 0.008 |
| Amylase | 0.002 | — | — | 0.002 |
| Cellulase | 0.0002 | 0.0005 | 0.0005 | 0.0002 |
| NOBS | — | 4.0 | — | 4.5 |
| PB1 | 1.0 | 5.0 | 1.5 | 6.0 |
| Sulfate | 4.0 | 5.0 | — | 5.0 |
| SRP 1 | — | 0.4 | — | — |
| Suds suppressor | — | 0.5 | 0.5 | — |
| Miscellaneous and minors | | Up to 100% | | |

EXAMPLE 7

The following granular detergent compositions were prepared according to the present invention;

| | I | II | III |
|---|---|---|---|
| Blown Powder | | | |
| Zeolite A | 20.0 | — | 15.0 |
| STPP | — | 20.0 | — |
| Sulfate | — | — | 5.0 |
| Carbonate | — | — | 5.0 |
| TAS | — | — | 1.0 |
| LAS | 6.0 | 6.0 | 6.0 |
| C68AS | 2.0 | 2.0 | — |
| Silicate | 3.0 | 8.0 | — |
| MA/AA | 4.0 | 2.0 | 2.0 |
| CMC | 0.6 | 0.6 | 0.2 |
| Brightener 1 | 0.2 | 0.2 | 0.1 |
| DETPMP | 0.4 | 0.4 | 0.1 |
| STS | — | — | 1.0 |
| Spray On | | | |
| C45E7 | 5.0 | 5.0 | 4.0 |
| Silicone antifoam 0.3 | 0.3 | 0.1 | |
| Perfume | 0.2 | 0.2 | 0.3 |
| Dry additives | | | |
| QEA | — | — | 1.0 |
| Carbonate | 14.0 | 9.0 | 10.0 |
| PB1 | 1.5 | 2.0 | — |
| PB4 | 18.5 | 13.0 | 13.0 |
| TAED | 2.0 | 2.0 | 2.0 |
| QAS | — | — | 1.0 |
| Photoactivated bleach | 15 ppm | 15 ppm | 15 ppm |
| Na-SKS-6 | — | — | 3.0 |
| Cytochrome I | 0.005 | 0.005 | 0.005 |
| Electron donor I | 0.005 | 0.05 | 0.5 |
| Dehydrogenase I | 0.015 | — | — |
| Dehydrogenase II | — | 0.015 | — |

| | I | II | III |
|---|---|---|---|
| Dehydrogenase III | — | — | 0.03 |
| Isopropanol | 0.004 | 0.004 | — |
| Benzyl alcohol | — | — | 0.08 |
| Protease | 0.03 | 0.03 | 0.007 |
| Lipase | 0.004 | 0.004 | 0.004 |
| Amylase | 0.006 | 0.006 | 0.003 |
| Cellulase | 0.0002 | 0.0002 | 0.0005 |
| Sulfate | 10.0 | 20.0 | 5.0 |

-continued

| | | | |
|---|---|---|---|
| Density (g/liter) | 700 | 700 | 700 |
| Miscellaneous and minors | | Up to 100% | |

EXAMPLE 8

The following detergent compositions were prepared according to the present invention:

| | I | II | III |
|---|---|---|---|
| Blown Powder | | | |
| Zeolite A | 15.0 | 15.0 | 15.0 |
| Sulfate | — | 5.0 | — |
| LAS | 3.0 | 3.0 | 3.0 |
| QAS | — | 1.5 | 1.5 |
| DETPMP | 0.4 | 0.2 | 0.4 |
| EDDS | — | 0.4 | 0.2 |
| CMC | 0.4 | 0.4 | 0.4 |
| MA/AA | 4.0 | 2.0 | 2.0 |
| Agglomerate | | | |
| LAS | 5.0 | 5.0 | 5.0 |
| TAS | 2.0 | 2.0 | 1.0 |
| Silicate | 3.0 | 3.0 | 4.0 |
| Zeolite A | 8.0 | 8.0 | 8.0 |
| Carbonate | 8.0 | 8.0 | 4.0 |
| Spray On | | | |
| Perfume | 0.3 | 0.3 | 0.3 |
| C45E7 | 2.0 | 2.0 | 2.0 |

| | I | II | III |
|---|---|---|---|
| C25E3 | 2.0 | — | — |
| Dry Additives | | | |
| Citrate | 5.0 | — | 2.0 |
| Bicarbonate | — | 3.0 | — |
| Carbonate | 8.0 | 15.0 | 10.0 |
| TAED | 6.0 | 2.0 | 5.0 |
| PB1 | 14.0 | 7.0 | 10.0 |
| PEO | — | — | 0.2 |
| Bentonite clay | — | — | 10.0 |
| Cytochrome II | 0.01 | 0.05 | 0.1 |
| Electron donor I | 0.09 | 0.2 | 0.1 |
| Ferredoxin | 0.003 | 0.01 | 0.1 |
| Ferredoxin reductase | 0.01 | 0.07 | 0.1 |
| Protease | 0.03 | 0.03 | 0.03 |
| Lipase | 0.008 | 0.008 | 0.008 |
| Cellulase | 0.001 | 0.001 | 0.001 |
| Amylase | 0.01 | 0.01 | 0.01 |
| Silicone antifoam | 5.0 | 5.0 | 5.0 |
| Sulfate | — | 3.0 | — |
| Density (g/liter) | 850 | 850 | 850 |
| Miscellaneous and minors | | Up to 100% | |

EXAMPLE 9

The following detergent compositions were prepared according to the present invention:

| | I | II | III | IV |
|---|---|---|---|---|
| LAS | 18.0 | 14.0 | 24.0 | 20.0 |
| QAS | 0.7 | 1.0 | — | 0.7 |
| TFAA | — | 1.0 | — | — |
| C23E56.5 | — | — | 1.0 | — |
| C45E7 | — | 1.0 | — | — |

-continued

| | I | II | III | IV |
|---|---|---|---|---|
| C45E3S | 1.0 | 2.5 | 1.0 | — |
| STPP | 32.0 | 18.0 | 30.0 | 22.0 |
| Silicate | 9.0 | 5.0 | 9.0 | 8.0 |
| Carbonate | 11.0 | 7.5 | 10.0 | 5.0 |
| Bicarbonate | — | 7.5 | — | — |
| PB1 | 3.0 | 1.0 | — | — |
| PB4 | — | 1.0 | — | — |
| NOBS | 2.0 | 1.0 | — | — |
| DETPMP | — | 1.0 | — | — |
| DTPA | 0.5 | — | 0.2 | 0.3 |
| SRP 1 | 0.3 | 0.2 | — | 0.1 |
| MA/AA | 1.0 | 1.5 | 2.0 | 0.5 |
| CMC | 0.8 | 0.4 | 0.4 | 0.2 |
| PEI | — | — | 0.4 | — |
| Sulfate | 20.0 | 10.0 | 20.0 | 30.0 |
| Mg sulfate | 0.2 | — | 0.4 | 0.9 |
| Cytochrome I | 0.1 | 0.05 | 0.1 | 0.05 |
| Electron donor I | 0.5 | 0.1 | 0.5 | 0.1 |
| Protease | 0.03 | 0.03 | 0.02 | 0.02 |
| Amylase | 0.008 | 0.007 | — | 0.004 |
| Lipase | 0.004 | — | 0.002 | — |
| Cellulase | 0.0003 | — | — | 0.0001 |
| Photoactivated bleach | 30 ppm | 20 ppm | — | 10 ppm |
| Perfume | 0.3 | 0.3 | 0.1 | 0.2 |
| Brightener 1/2 | 0.05 | 0.02 | 0.08 | 0.1 |
| Miscellaneous and minors | | Up to 100% | | |

EXAMPLE 10

The following liquid detergent formulations were prepared according to the present invention (Levels are given in parts per weight, enzymes are expressed in pure enzyme):

| | I | II | III | IV | IV |
|---|---|---|---|---|---|
| LAS | 11.5 | 8.8 | — | 3.9 | — |
| C25E2.5S | — | 3.0 | 18.0 | — | 16.0 |
| C45E2.25S | 11.5 | 3.0 | — | 15.7 | — |
| C23E9 | — | 2.7 | 1.8 | 2.0 | 1.0 |
| C23E7 | 3.2 | — | — | — | — |
| CFAA | — | — | 5.2 | — | 3.1 |
| TPKFA | 1.6 | — | 2.0 | 0.5 | 2.0 |
| Citric (50%) | 6.5 | 1.2 | 2.5 | 4.4 | 2.5 |
| Ca formate | 0.1 | 0.06 | 0.1 | — | — |
| Na formate | 0.5 | 0.06 | 0.1 | 0.05 | 0.05 |
| SCS | 4.0 | 1.0 | 3.0 | 1.2 | — |
| Borate | 0.6 | — | 3.0 | 2.0 | 2.9 |
| Na hydroxide | 5.8 | 2.0 | 3.5 | 3.7 | 2.7 |
| Ethanol | 1.75 | 1.0 | 3.6 | 4.2 | 2.9 |
| 1,2 Propanediol | 3.3 | 2.0 | 8.0 | 7.9 | 5.3 |
| Monoethanolamine | 3.0 | 1.5 | 1.3 | 2.5 | 0.8 |
| TEPAE | 1.6 | — | 1.3 | 1.2 | 1.2 |
| Cytochrome I | 0.05 | 0.05 | 0.07 | 0.07 | 0.1 |
| Electron donor I | 0.07 | 0.15 | 0.1 | 0.2 | 0.8 |
| Protease | 0.03 | 0.01 | 0.03 | 0.02 | 0.02 |
| Lipase | — | — | 0.002 | — | — |
| Amylase | — | — | — | 0.002 | — |
| Cellulase | — | — | 0.0002 | 0.0005 | 0.0001 |
| SRP 1 | 0.2 | — | 0.1 | — | — |
| DTPA | — | — | 0.3 | — | — |
| PVNO | — | — | 0.3 | — | 0.2 |
| Brightener 1 | 0.2 | 0.07 | 0.1 | — | — |
| Silicone antifoam | 0.04 | 0.02 | 0.1 | 0.1 | 0.1 |
| Miscellaneous and water | | | | | |

EXAMPLE 11

The following liquid detergent formulations were prepared according to the present invention (Levels are given in parts per weight, enzymes are expressed in pure enzyme):

| | I | II | III | IV |
|---|---|---|---|---|
| LAS | 10.0 | 13.0 | 9.0 | — |
| C25AS | 4.0 | 1.0 | 2.0 | 10.0 |
| C25E3S | 1.0 | — | — | 3.0 |
| C25E7 | 6.0 | 8.0 | 13.0 | 2.5 |
| TFAA | — | — | — | 4.5 |
| APA | — | 1.4 | — | — |
| TPKFA | 2.0 | — | 13.0 | 7.0 |
| Citric | 2.0 | 3.0 | 1.0 | 1.5 |
| Dodecenyl/tetradecenyl succinic acid | 12.0 | 10.0 | — | — |
| Rapeseed fatty acid | 4.0 | 2.0 | 1.0 | — |
| Ethanol | 4.0 | 4.0 | 7.0 | 2.0 |
| 1,2 Propanediol | 4.0 | 4.0 | 2.0 | 7.0 |
| Monoethanolamine | — | — | — | 5.0 |
| Triethanolamine | — | — | 8.0 | — |
| TEPAE | 0.5 | — | 0.5 | 0.2 |
| DETPMP | 1.0 | 1.0 | 0.5 | 1.0 |
| Cytochrome I | 0.1 | 0.2 | 0.5 | 0.05 |
| Electron donor I | 1.2 | 1.5 | 2.0 | 0.07 |
| Protease | 0.02 | 0.02 | 0.01 | 0.008 |
| Lipase | — | 0.002 | — | 0.002 |
| Amylase | 0.004 | 0.004 | 0.01 | 0.008 |
| Cellulase | — | — | — | 0.002 |
| SRP 2 | 0.3 | — | 0.3 | 0.1 |
| Boric acid | 0.1 | 0.2 | 1.0 | 2.0 |
| Ca chloride | — | 0.02 | — | 0.01 |
| Brightener 1 | — | 0.4 | — | — |
| Suds suppressor | 0.1 | 0.3 | — | 0.1 |
| Opacifier | 0.5 | 0.4 | — | 0.3 |
| NaOH up to pH | 8.0 | 8.0 | 7.6 | 7.7 |
| Miscellaneous and water | | | | |

EXAMPLE 12

The following liquid detergent compositions were prepared according to the present invention (Levels are given in parts per weight, enzymes are expressed in pure enzyme):

| | I | II | III | IV |
|---|---|---|---|---|
| LAS | 25.0 | — | — | — |
| C25AS | — | 13.0 | 18.0 | 15.0 |
| C25E3S | — | 2.0 | 2.0 | 4.0 |
| C25E7 | — | — | 4.0 | 4.0 |
| TF/AA | — | 6.0 | 8.0 | 8.0 |
| APA | 3.0 | 1.0 | 2.0 | — |
| TPKFA | — | 15.0 | 11.0 | 11.0 |
| Citric | 1.0 | 1.0 | 1.0 | 1.0 |
| Dodecenyl/tetradecenyl succinic acid | 15.0 | — | — | — |
| Rapeseed fatty acid | 1.0 | — | 3.5 | — |
| Ethanol | 7.0 | 2.0 | 3.0 | 2.0 |
| 1,2 Propanediol | 6.0 | 8.0 | 10.0 | 13.0 |
| Monoethanolamine | — | — | 9.0 | 9.0 |
| TEPAE | — | — | 0.4 | 0.3 |
| DETPMP | 2.0 | 1.2 | 1.0 | — |
| Cytochrome I | 0.05 | 0.07 | 0.07 | 0.1 |
| Electron donor I | 0.15 | 0.1 | 0.2 | 0.8 |
| Protease | 0.08 | 0.02 | 0.01 | 0.02 |
| Lipase | — | — | 0.003 | 0.003 |
| Amylase | 0.004 | 0.01 | 0.01 | 0.01 |
| Cellulase | — | — | 0.004 | 0.003 |
| SRP 2 | — | — | 0.2 | 0.1 |
| Boric acid | 1.0 | 1.5 | 2.5 | 2.5 |
| Bentonite clay | 4.0 | 4.0 | — | — |
| Brightener 1 | 0.1 | 0.2 | 0.3 | — |
| Suds suppressor | 0.4 | — | — | — |
| Opacifier | 0.8 | 0.7 | — | — |
| NaOH up to pH | 8.0 | 7.5 | 8.0 | 8.2 |
| Miscellaneous and water | | | | |

EXAMPLE 13

The following liquid detergent compositions were prepared according to the present invention (Levels are given in parts by weight, enzymes are expressed in pure enzyme):

| | I | II |
|---|---|---|
| LAS | 27.6 | 18.9 |
| C45AS | 13.8 | 5.9 |
| C13E8 | 3.0 | 3.1 |
| Oleic acid | 3.4 | 2.5 |
| Citric | 5.4 | 5.4 |
| Na hydroxide | 0.4 | 3.6 |
| Ca Formate | 0.2 | 0.1 |
| Na Formate | — | 0.5 |
| Ethanol | 7.0 | — |
| Monoethanolamine | 16.5 | 8.0 |
| 1,2 propanediol | 5.9 | 5.5 |
| Xylene sulfonic acid | — | 2.4 |
| TEPAE | 1.5 | 0.8 |
| Protease | 0.05 | 0.02 |
| Cytochrome I | 0.1 | 0.05 |
| Electron donor I | 1.2 | — |
| Electron donor II | — | 0.09 |
| Dehydrogenase IV | 0.1 | — |
| PEG | — | 0.7 |
| Brightener 2 | 0.4 | 0.1 |
| Perfume | 0.5 | 0.3 |
| Miscellaneous and water | | |

EXAMPLE 14

The following granular fabric detergent compositions which provide "softening through the wash" capability were prepared according to the present invention:

| | I | II |
|---|---|---|
| C45AS | — | 10.0 |
| LAS | 7.6 | — |
| C68AS | 1.3 | — |
| C45E7 | 4.0 | — |
| C25E3 | — | 5.0 |
| Coco-alkyl-dimethyl hydroxy-ethyl ammonium chloride | 1.4 | 1.0 |
| Citrate | 5.0 | 3.0 |
| Na-SKS-6 | — | 11.0 |
| Zeolite A | 15.0 | 15.0 |
| MA/AA | 4.0 | 4.0 |
| DETPMP | 0.4 | 0.4 |
| PB1 | 15.0 | — |
| Percarbonate | — | 15.0 |
| TAED | 5.0 | 5.0 |
| Smectite clay | 10.0 | 10.0 |
| HMWPEO | — | 0.1 |
| Cytochrome I | 0.1 | 0.1 |
| Electron donor I | 0.9 | 1.5 |
| Protease | 0.02 | 0.01 |
| Lipase | 0.02 | 0.01 |
| Amylase | 0.03 | 0.005 |
| Cellulase | 0.001 | — |
| Silicate | 3.0 | 5.0 |
| Carbonate | 10.0 | 10.0 |
| Suds suppressor | 1.0 | 4.0 |
| CMC | 0.2 | 0.1 |
| Water/minors | Up to 100% | |

EXAMPLE 15

The following rinse added fabric softener composition was prepared according to the present invention:

| | |
|---|---|
| DEQA (2) | 20.0 |
| Cytochrome I | 0.05 |
| Electron donor I | 0.5 |
| Cellulase | 0.001 |
| HCL | 0.03 |
| Antifoam agent | 0.01 |
| Blue dye | 25 ppm |
| $CaCl_2$ | 0.20 |
| Perfume | 0.90 |
| Miscellaneous and water | Up to 100% |

EXAMPLE 16

The following fabric softener and dryer added fabric conditioner compositions were prepared according to the present invention:

| | I | II | III | IV | V |
|---|---|---|---|---|---|
| DEQA | 2.6 | 19.0 | — | — | — |
| DEQA(2) | — | — | — | — | 51.8 |
| DTMAMS | — | — | — | 26.0 | — |
| SDASA | — | — | 70.0 | 42.0 | 40.2 |
| Stearic acid of IV = 0 | 0.3 | — | — | — | — |
| Neodol 45-13 | — | — | 13.0 | — | — |
| Hydrochloride acid | 0.02 | 0.02 | — | — | — |
| Ethanol | — | — | 1.0 | — | — |
| Cytochrome I | 0.05 | 0.07 | 0.1 | 0.05 | 0.07 |
| Electron donor I | 0.05 | 0.1 | 0.2 | 0.05 | 0.1 |
| Perfume | 1.0 | 1.0 | 0.75 | 1.0 | 1.5 |
| Glycoperse S-20 | — | — | — | — | 15.4 |
| Glycerol monostearate | — | — | — | 26.0 | — |
| Digeranyl Succinate | — | — | 0.38 | — | — |
| Silicone antifoam | 0.01 | 0.01 | — | — | — |
| Electrolyte | — | 0.1 | — | — | — |
| Clay | — | — | — | 3.0 | — |
| Dye | 10 ppm | 25 ppm | 0.01 | — | — |
| Water and minors | 100% | 100% | — | — | — |

EXAMPLE 17

The following laundry bar detergent compositions were prepared according to the present invention (Levels are given in parts per weight, enzymes are expressed in pure enzyme):

| | I | II | III | VI |
|---|---|---|---|---|
| LAS | — | — | 19.0 | 15.0 |
| C28AS | 30.0 | 13.5 | — | — |
| Na Laurate | 2.5 | 9.0 | — | — |
| Zeolite A | 2.0 | 1.25 | — | — |
| Carbonate | 20.0 | 3.0 | 13.0 | 8.0 |
| Ca Carbonate | 27.5 | 39.0 | 35.0 | — |
| Sulfate | 5.0 | 5.0 | 3.0 | 5.01 |
| TSPP | 5.0 | — | — | — |
| STPP | 5.0 | 15.0 | 10.0 | — |
| Bentonite clay | — | 10.0 | — | — |
| DETPMP | — | 0.7 | 0.6 | — |
| CMC | — | 1.0 | 1.0 | 1.0 |
| Talc | — | — | 10.0 | 15.0 |
| Silicate | — | — | 4.0 | 5.0 |
| PVNO | 0.02 | 0.03 | — | 0.01 |
| MA/AA | 0.4 | 1.0 | — | — |
| SRP 1 | 0.3 | 0.3 | 0.3 | 0.3 |
| Cytochrome I | 0.01 | 0.05 | 0.1 | 0.1 |
| Electron donor I | 0.1 | 0.2 | 0.9 | 0.9 |
| Amylase | — | — | 0.01 | — |

-continued

| | | | | |
|---|---|---|---|---|
| Protease | — | 0.004 | — | 0.003 |
| Lipase | — | 0.002 | — | 0.002 |
| Cellulase | — | .0003 | — | — |
| PEO | — | 0.2 | — | 0.2 |
| Perfume | 1.0 | 0.5 | 0.3 | 0.2 |
| Mg sulfate | — | — | 3.0 | 3.0 |
| Brightener | 0.15 | 0.1 | 0.15 | — |
| Photoactivated bleach (ppm) | — | 15.0 | 15.0 | 15.0 |

| | V | III | VI | V |
|---|---|---|---|---|
| LAS | 21.0 | 6.75 | 8.8 | — |
| C28AS | — | 15.75 | 11.2 | 22.5 |
| Na Laurate | — | — | — | — |
| Zeolite A | — | 1.25 | 1.25 | 1.25 |
| Carbonate | 10.0 | 15.0 | 15.0 | 10.0 |
| Ca Carbonate | — | 40.0 | — | 40.0 |
| Sulfate | 3.0 | — | — | 5.0 |
| TSPP | — | 5.0 | 2.5 | — |
| STPP | — | 7.0 | 8.0 | 10.0 |
| Bentonite clay | 5.0 | — | — | — |
| DETPMP | 0.6 | 0.7 | 0.7 | 0.7 |
| CMC | 1.0 | — | — | 1.0 |
| Talc | 10.0 | — | — | — |
| Silicate | 3.0 | — | — | — |
| PVNO | — | 0.02 | — | — |
| MA/AA | 0.2 | 0.4 | 0.5 | 0.4 |
| SRP 1 | 0.3 | 0.3 | 0.3 | 0.3 |
| Cytochrome I | 0.5 | 0.01 | 0.05 | 0.1 |
| Electron donor I | 2.0 | 0.1 | 0.2 | 0.9 |
| Amylase | — | — | 0.002 | — |
| Protease | 0.003 | — | — | 0.003 |
| Lipase | — | — | — | — |
| Cellulase | .0003 | .0002 | — | — |
| PEO | 0.3 | — | — | 0.3 |
| Perfume | 0.4 | — | — | 0.4 |
| Mg sulfate | 3.0 | — | — | — |
| Brightener | — | — | — | 0.1 |
| Photoactivated bleach (ppm) | 15.0 | — | — | 15.0 |

EXAMPLE 18

The following detergent additive compositions were prepared according to the present invention:

| | I | II | III |
|---|---|---|---|
| LAS | — | 5.0 | 5.0 |
| STPP | 30.0 | — | 20.0 |
| Zeolite A | — | 35.0 | 20.0 |
| PB1 | 20.0 | 15.0 | — |
| TAED | 10.0 | 8.0 | — |
| Protease | — | 0.3 | 0.3 |
| Amylase | — | 0.06 | 0.06 |
| Cytochrome I | 0.1 | 0.1 | 0.1 |
| Electron donor I | 0.01 | 0.01 | 0.01 |
| Minors, water and miscellaneous | | Up to 100% | |

EXAMPLE 19

The following compact high density (0.96 Kg/l) dishwashing detergent compositions were prepared according to the present invention:

| | I | II | III | IV |
|---|---|---|---|---|
| STPP | — | — | 54.3 | 51.4 |
| Citrate | 35.0 | 17.0 | — | — |
| Carbonate | — | 17.5 | 14.0 | 14.0 |
| Bicarbonate | — | — | — | — |
| Silicate | 32.0 | 14.8 | 14.8 | 10.0 |
| Metasilicate | — | 2.5 | — | 9.0 |
| PB1 | 1.9 | 9.7 | 7.8 | 7.8 |
| PB4 | 8.6 | — | — | — |
| Percarbonate | — | — | — | — |
| Nonionic | 1.5 | 2.0 | 1.5 | 1.7 |
| TAED | 5.2 | 2.4 | — | — |
| HEDP | — | 1.0 | — | — |
| DETPMP | — | 0.6 | — | — |
| MnTACN | — | — | — | — |
| PAAC | — | — | 0.008 | 0.01 |
| BzP | — | — | — | — |
| Paraffin | 0.5 | 0.5 | 0.5 | 0.5 |
| Cytochrome I | 0.05 | 0.005 | 0.08 | 0.1 |
| Electron donor I | 0.5 | 0.03 | 0.9 | 1.0 |
| Protease | 0.072 | 0.072 | 0.029 | 0.053 |
| Amylase | 0.012 | 0.012 | 0.006 | 0.012 |
| Lipase | — | 0.001 | — | 0.005 |
| BTA | 0.3 | 0.3 | 0.3 | 0.3 |
| MA/AA | — | — | — | — |
| 480N | 3.3 | 6.0 | — | — |
| Perfume | 0.2 | 0.2 | 0.2 | 0.2 |
| Sulphate | 7.0 | 20.0 | 5.0 | 2.2 |
| pH | 10.8 | 11.0 | 10.8 | 11.3 |
| Miscellaneous and water | | Up to 100% | | |

| | V | VI | VII | VIII |
|---|---|---|---|---|
| STPP | 51.4 | — | — | 50.9 |
| Citrate | — | 46.1 | 40.2 | — |
| Carbonate | 14.0 | — | 8.0 | 32.1 |
| Bicarbonate | — | 25.4 | — | — |
| Silicate | 10.0 | 1.0 | 25.0 | 3.1 |
| Metasilicate | 9.0 | — | — | — |
| PB1 | 7.8 | — | — | — |
| PB4 | — | — | — | — |
| Percarbonate | — | 6.7 | 11.8 | 4.8 |
| Nonionic | 1.5 | 2.6 | 1.9 | 5.3 |
| TAED | — | 2.2 | — | 1.4 |
| HEDP | — | — | — | — |
| DETPMP | — | — | — | — |
| MnTACN | — | — | 0.008 | — |
| PAAC | 0.007 | — | — | — |
| BzP | 1.4 | — | — | — |
| Paraffin | 0.5 | 0.6 | — | — |
| Cytochrome I | 0.004 | 0.009 | 0.05 | 0.005 |
| Electron donor I | 0.1 | 0.1 | 0.5 | 0.03 |
| Protease | 0.046 | 0.026 | 0.059 | 0.06 |
| Amylase | 0.013 | 0.009 | 0.017 | 0.03 |
| Lipase | — | — | — | — |
| BTA | 0.3 | — | 0.3 | 0.3 |
| MA/AA | — | — | 4.2 | — |
| 480N | — | — | — | 0.9 |
| Perfume | 0.2 | 0.2 | 0.1 | 0.1 |
| Sulphate | 0.8 | 12.0 | 4.6 | — |
| pH | 11.3 | 9.6 | 10.8 | 10.9 |
| Miscellaneous and water | | Up to 100% | | |

EXAMPLE 20

The following granular dishwashing detergent compositions of bulk density 1.02 Kg/L were prepared according to the present invention:

| | I | II | III | IV |
|---|---|---|---|---|
| STPP | 30.0 | 30.0 | 33.0 | 34.2 |
| Carbonate | 30.5 | 30.5 | 31.0 | 30.0 |
| Silicate | 7.4 | 7.4 | 7.5 | 7.2 |
| Metasilicate | — | — | 4.5 | 5.1 |
| Percarbonate | — | — | — | — |
| PB1 | 4.4 | 4.2 | 4.5 | 4.5 |
| NADCC | — | — | — | — |
| Nonionic | 1.2 | 1.0 | 0.7 | 0.8 |
| TAED | 1.0 | — | — | — |
| PAAC | — | 0.004 | 0.004 | 0.004 |
| BzP | — | — | — | 1.4 |
| Paraffin | 0.25 | 0.25 | 0.25 | 0.25 |
| Cytochrome I | 0.05 | 0.05 | 0.05 | 0.05 |
| Electron donor I | 0.05 | 0.1 | 0.15 | 0.05 |
| Protease | 0.036 | 0.015 | 0.026 | 0.028 |
| Amylase | 0.003 | 0.003 | 0.006 | 0.006 |
| Lipase | 0.005 | — | 0.001 | — |
| BTA | 0.15 | 0.15 | 0.15 | 0.15 |
| Perfume | 0.2 | 0.2 | 0.2 | 0.2 |
| Sulphate | 23.4 | 25.0 | 22.0 | 18.5 |
| pH | 10.8 | 10.8 | 11.3 | 11.3 |
| Miscellaneous and water | | Up to 100% | | |

| | V | VI | VII | VII |
|---|---|---|---|---|
| STPP | 29.6 | 31.1 | 26.6 | 17.6 |
| Carbonate | 23.0 | 39.4 | 4.2 | 45.0 |
| Silicate | 13.3 | 3.4 | 43.7 | 12.4 |
| Metasilicate | — | — | — | — |
| Percarbonate | — | 4.0 | — | — |
| PB1 | — | — | — | — |
| NADCC | 2.0 | — | 1.6 | 1.0 |
| Nonionic | 1.9 | 0.7 | 0.6 | 0.3 |
| TAED | — | 0.8 | — | — |
| PAAC | — | — | — | — |
| BzP | — | — | — | — |
| Paraffin | — | — | — | — |
| Cytochrome I | 0.03 | 0.03 | 0.03 | 0.03 |
| Electron donor I | 0.05 | 0.1 | 0.15 | 0.05 |
| Protease | — | 0.01 | — | — |
| Amylase | — | 0.006 | — | — |
| Lipase | — | — | — | — |
| BTA | — | — | — | — |
| Perfume | 0.1 | 0.2 | 0.2 | — |
| Sulphate | 30.1 | 19.3 | 23.1 | 23.6 |
| pH | 10.7 | 11.5 | 12.7 | 10.9 |
| Miscellaneous and water | | Up to 100% | | |

EXAMPLE 21

The following tablet detergent compositions were prepared according to the present invention by compression of a granular dishwashing detergent composition at a pressure of $13KN/cm^2$ using a standard 12 head rotary press:

| | I | II | III | IV | V | VI |
|---|---|---|---|---|---|---|
| STPP | — | 48.8 | 49.2 | 38.0 | — | 46.8 |
| Citrate | 26.4 | — | — | — | 31.1 | — |
| Carbonate | — | 5.0 | 14.0 | 15.4 | 14.4 | 23.0 |
| Silicate | 26.4 | 14.8 | 15.0 | 12.6 | 17.7 | 2.4 |
| Cytochrome I | 0.05 | 0.05 | 0.05 | 0.005 | 0.1 | 0.01 |
| Electron donor I | 0.05 | 0.015 | 0.5 | 0.05 | 1.0 | 0.1 |
| Protease | 0.058 | 0.072 | 0.041 | 0.033 | 0.052 | 0.013 |
| Amylase | 0.01 | 0.012 | 0.012 | 0.007 | 0.016 | 0.002 |
| Lipase | 0.005 | — | — | — | — | — |
| PB1 | 1.6 | 7.7 | 12.2 | 10.6 | 15.7 | — |
| PB4 | 6.9 | — | — | — | — | 14.4 |
| Nonionic | 1.5 | 2.0 | 1.5 | 1.65 | 0.8 | 6.3 |
| PAAC | — | — | 0.02 | 0.009 | — | — |
| MnTACN | — | — | — | — | 0.007 | — |
| TAED | 4.3 | 2.5 | — | — | 1.3 | 1.8 |
| HEDP | 0.7 | — | — | 0.7 | — | 0.4 |
| DETPMP | 0.65 | — | — | — | — | — |
| Paraffin | 0.4 | 0.5 | 0.5 | 0.55 | — | — |
| BTA | 0.2 | 0.3 | 0.3 | 0.3 | — | — |
| PA30 | 3.2 | — | — | — | — | — |
| MA/AA | — | — | — | — | 4.5 | 0.55 |
| Perfume | — | — | 0.05 | 0.05 | 0.2 | 0.2 |
| Sulphate | 24.0 | 13.0 | 2.3 | — | 10.7 | 3.4 |
| Weight of tablet | 25 g | 25 g | 20 g | 30 g | 18 g | 20 g |
| pH | 10.6 | 10.6 | 10.7 | 10.7 | 10.9 | 11.2 |
| Miscellaneous and water | | | Up to 100% | | | |

EXAMPLE 22

The following liquid dishwashing detergent compositions of density 1.40 Kg/L were prepared according to the present invention:

| | I | II | III | IV |
|---|---|---|---|---|
| STPP | 17.5 | 17.5 | 17.2 | 16.0 |
| Carbonate | 2.0 | — | 2.4 | — |
| Silicate | 5.3 | 6.1 | 14.6 | 15.7 |
| NaOCl | 1.15 | 1.15 | 1.15 | 1.25 |
| Polygen/carbopol | 1.1 | 1.0 | 1.1 | 1.25 |
| Nonionic | — | — | 0.1 | — |
| NaBz | 0.75 | 0.75 | — | — |
| Cytochrome I | 0.01 | 0.01 | 0.05 | 0.05 |
| Electron donor I | 0.05 | 0.1 | — | — |
| Electron donor II | — | — | 0.2 | 0.5 |
| NaOH | — | 1.9 | — | 3.5 |
| KOH | 2.8 | 3.5 | 3.0 | — |
| pH | 11.0 | 11.7 | 10.9 | 11.0 |
| Sulphate, miscellaneous and water | | up to 100% | | |

EXAMPLE 23

The following liquid rinse aid compositions were prepared according to the present invention:

| | I | II | III |
|---|---|---|---|
| Nonionic | 12.0 | — | 14.5 |
| Nonionic blend | — | 64.0 | — |
| Citric | 3.2 | — | 6.5 |
| HEDP | 0.5 | — | — |
| PEG | — | 5.0 | — |
| Cytochrome I | 0.004 | 0.005 | 0.005 |
| Electron donor I | 0.002 | 0.002 | 0.002 |
| SCS | 4.8 | — | 7.0 |
| Ethanol | 6.0 | 8.0 | — |
| pH of the liquid | 2.0 | 7.5 | / |

EXAMPLE 24

The following liquid dishwashing compositions were prepared according to the present invention:

| | I | II | III | IV | V |
|---|---|---|---|---|---|
| C17ES | 28.5 | 27.4 | 19.2 | 34.1 | 34.1 |
| Amine oxide | 2.6 | 5.0 | 2.0 | 3.0 | 3.0 |
| C12 glucose amide | — | — | 6.0 | — | — |
| Betaine | 0.9 | — | — | 2.0 | 2.0 |
| Xylene sulfonate | 2.0 | 4.0 | — | 2.0 | — |
| Neodol C11E9 | — | — | 5.0 | — | — |
| Polyhydroxy fatty acid amide | — | — | — | 6.5 | 6.5 |
| Sodium diethylene penta acetate (40%) | — | — | 0.03 | — | — |
| TAED | — | — | — | 0.06 | 0.06 |
| Sucrose | — | — | — | 1.5 | 1.5 |
| Ethanol | 4.0 | 5.5 | 5.5 | 9.1 | 9.1 |
| Alkyl diphenyl oxide disulfonate | — | — | — | — | 2.3 |
| Ca formate | — | — | — | 0.5 | 1.1 |
| Ammonium citrate | 0.06 | 0.1 | — | — | — |
| Na chloride | — | 1.0 | — | — | — |
| Mg chloride | 3.3 | — | 0.7 | — | — |
| Ca chloride | — | — | 0.4 | — | — |
| Na sulfate | — | — | 0.06 | — | — |
| Mg sulfate | 0.08 | — | — | — | — |
| Mg hydroxide | — | — | — | 2.2 | 2.2 |
| Na hydroxide | — | — | — | 1.1 | 1.1 |
| Hydrogen peroxide | 200 ppm | 0.16 | 0.006 | — | — |
| Cytochrome I | 0.005 | 0.007 | 0.009 | 0.1 | 0.15 |
| Electron donor I | 0.05 | 0.05 | 0.05 | 0.07 | 0.1 |
| Protease | 0.017 | 0.005 | .0035 | 0.003 | 0.002 |
| Perfume | 0.18 | 0.09 | 0.09 | 0.2 | 0.2 |
| Water and minors | | | Up to 100% | | |

EXAMPLE 25

The following liquid hard surface cleaning compositions were prepared according to the present invention:

| | I | II | III |
|---|---|---|---|
| Cytochrome I | 0.01 | 0.05 | 0.1 |
| Electron donor I | 0.1 | 0.9 | 0.9 |
| Amylase | 0.01 | 0.002 | 0.005 |
| Protease | 0.05 | 0.01 | 0.02 |
| EDTA* | 0.05 | 0.05 | 0.05 |
| Citrate | 2.9 | 2.9 | 2.9 |
| LAS | 0.5 | 0.5 | 0.5 |
| C12 AS | 0.5 | 0.5 | 0.5 |
| C12(E)S | 0.5 | 0.5 | 0.5 |
| C12, 13 E6.5 nonionic | 7.0 | 7.0 | 7.0 |
| Perfume | 1.0 | 1.0 | 1.0 |
| Hexyl carbitol** | 1.0 | 1.0 | 1.0 |
| SCS | 1.3 | 1.3 | 1.3 |
| Water | | Balance to 100% | |

*Na4 ethylenediamine diacetic acid
**Diethylene glycol monohexyl ether
***All formulas adjusted to pH 7–12

EXAMPLE 26

The following spray composition for cleaning of hard surfaces and removing household mildew was prepared according to the present invention:

| | |
|---|---|
| Cytochrome I | 0.01 |
| Electron donor I | 0.1 |
| Amylase | 0.01 |
| Protease | 0.01 |
| Na octyl sulfate | 2.0 |
| Na dodecyl sulfate | 4.0 |
| Na hydroxide | 0.8 |
| Silicate | 0.04 |
| Butyl carbitol* | 4.0 |
| Perfume | 0.35 |
| Water/minors | up to 100% |

*Diethylene glycol monobutyl ether

EXAMPLE 27

The following lavatory cleansing block compositions were prepared according to the present invention.

| | I | II | III |
|---|---|---|---|
| C16–18 fatty alcohol/50EO | 80.0 | — | — |
| LAS | — | — | 80.0 |
| Nonionic | — | 1.0 | — |
| Oleoamide surfactant | — | 26.0 | — |
| Partially esterified copolymer of vinylmethyl ether and maleic anhydride, viscosity 0.1–0.5 | 5.0 | — | — |
| Polyethylene glycol MW 8000 | — | 39.0 | — |
| Water-soluble K-polyacrylate MW 4000–8000 | — | 12.0 | — |
| Water-soluble Na-copolymer of acrylamide (70%) and acrylic acid (30%) low MW | — | 19.0 | — |
| Na triphosphate | 10.0 | — | — |
| Cytochrome I | 0.05 | 0.05 | 0.05 |
| Electron donor I | 0.02 | 0.02 | 0.02 |
| Dye | 2.5 | 1.0 | 1.0 |
| Perfume | 3.0 | — | 7.0 |
| KOH/HCL solution | | pH 6–11 | |

EXAMPLE 28

The following toilet bowl cleaning composition was prepared according to the present invention.

| | I | II |
|---|---|---|
| C14–15 linear alcohol 7EO | 2.0 | 10.0 |
| Citric acid | 10.0 | 5.0 |
| Cytochrome I | 0.05 | 0.05 |
| Electron donor I | 0.03 | 0.05 |
| DETPMP | — | 1.0 |
| Dye | 2.0 | 1.0 |
| Perfume | 3.0 | 3.0 |
| NaOH | pH 6–11 | |
| Water and minors | Up to 100% | |

EXAMPLE 29

The following single layer effervescent denture cleansing tablets were prepared according to the present invention:

| | I | II |
|---|---|---|
| Cytochrome I | 0.1 | 0.1 |
| Electron donor I | 0.5 | 0.5 |
| Protease | 0.05 | 2.0 |
| Sodium bicarbonate | 39.0 | 39.0 |
| Malic acid | 14.0 | 14.0 |
| Sulphamic acid | 3.0 | 3.0 |
| TAED | 2.0 | 2.0 |
| Dye/Flavor | 2.0 | 2.0 |

-continued

| | I | II |
|---|---|---|
| PB1 | 16.0 | 16.0 |
| EDTA | 3.0 | 3.0 |
| PEG 10,000 | 6.0 | 6.0 |
| K monopersulfate | 13.0 | 13.0 |
| Na carbonate | 1.0 | 1.0 |
| LAS | 1.0 | 1.0 |
| Pyrogenic silica | 2.0 | 2.0 |

EXAMPLE 30

The following dentifrice compositions were prepared according to the present invention:

| | I | II | III | IV |
|---|---|---|---|---|
| Sorbitol (70% aqueous solution) | 35.0 | 35.0 | 35.0 | 35.0 |
| PEG-6 | 1.0 | 1.0 | 1.0 | 1.0 |
| Silica dental abrasive | 20.0 | 20.0 | 20.0 | 20.0 |
| Sodium fluoride | 0.2 | 0.2 | 0.2 | 0.2 |
| Titanium dioxide | 0.5 | 0.5 | 0.5 | 0.5 |
| Sodium saccharin | 0.3 | 0.3 | 0.3 | 0.3 |
| Cytochrome I | 0.05 | 0.1 | 0.03 | 0.03 |
| Electron donor I | 0.09 | 0.2 | 0.3 | 0.5 |
| Protease | 0.05 | 0.1 | 0.9 | 2.0 |
| Sodium alkyl sulfate (27.9% aqueous solution) | 4.0 | 4.0 | 4.0 | 4.0 |
| Flavor | 1.0 | 1.0 | 1.0 | 1.0 |
| Carboxyvinyl polymer | 0.3 | 0.3 | 0.3 | 0.3 |
| Carrageenan | 0.8 | 0.8 | 0.8 | 0.8 |
| Miscellaneous and water | | Up to 100% | | |

EXAMPLE 31

The following mouthwash compositions were prepared according to the present invention:

| | I | II | III | IV |
|---|---|---|---|---|
| SDA 40 Alcohol | 8.0 | 8.0 | 8.0 | 8.0 |
| Flavor | 0.08 | 0.08 | 0.08 | 0.08 |
| Emulsifier | 0.08 | 0.08 | 0.08 | 0.08 |
| Sodium fluoride | 0.05 | 0.05 | 0.05 | 0.05 |
| Glycerin | 10.0 | 10.0 | 10.0 | 10.0 |
| Sweetener | 0.02 | 0.02 | 0.02 | 0.02 |
| Cytochrome I | 0.05 | 0.08 | 0.1 | 0.1 |
| Electron donor I | 0.5 | 0.8 | 0.5 | 1.0 |
| Protease | 0.01 | 0.09 | 0.2 | 2.0 |
| Benzoic acid | 0.05 | 0.05 | 0.05 | 0.05 |
| Sodium hydroxide | 0.2 | 0.2 | 0.2 | 0.2 |
| Dye | 0.04 | 0.04 | 0.04 | 0.04 |
| Miscellaneous and water | | Up to 100% | | |

What is claimed is:

1. A cleaning composition comprising a cytochrome, an electron carrier, an electron donor compound and one or more cleaning adjunct ingredients selected from the group consisting of: a bleach system, a detergent enzyme and mixtures thereof.

2. A cleaning composition according to claim 1 wherein said cytochrome is present at a level of from about 0.0001% to about 2% pure enzyme by weight of total composition.

3. A cleaning composition according to claim 2 wherein said cytochrome is present at a level of from about 0.001% to about 0.5% pure enzyme by weight of total composition.

4. A cleaning composition according to claim 3 wherein said cytochrome is present at a level of from about 0.005% to about 0.1% pure enzyme by weight of total composition.

5. A cleaning composition according to claim 1 wherein said cytochrome is a cytochrome P450.

6. A cleaning composition according to claim 1 wherein said electron carrier is comprised within the structure of said cytochrome.

7. A cleaning composition according to claim 6 wherein said cytochrome is a cytochrome P450 bm3.

8. A cleaning composition according to claim 1 wherein said electron donor compound is comprised at a level of from about $10^{-6}$% to about 15% by weight of the total composition.

9. A cleaning composition according to claim 8 wherein said electron donor compound is comprised at a level of from about $10^{-5}$% to about 5% by weight of the total composition.

10. A cleaning composition according to claim 9 wherein said electron donor compound is comprised at a level of from about 0.0001% to about 1% by weight of the total composition.

11. A cleaning composition according to claim 1 wherein the electron donor is selected from the group consisting of nicotine amide adenine dinucleotide (reduced), nicotine amide adenine dinucleotide phosphate (reduced), sodium sulphite, and/or mixtures thereof.

12. A cleaning composition according to claim 1 wherein said electron carrier is comprised at a level of from about 0.0001% to about 2% by weight of the total composition.

13. A cleaning composition according to claim 12 wherein said electron carrier is comprised at a level of from about 0.001% to about 0.5% by weight of the total composition.

14. A cleaning composition according to claim 12 wherein said electron carrier is comprised at a level of from about 0.005% to about 0.1% by eight of the total composition.

15. A cleaning composition according to claim 1 wherein said electron carrier is selected from the group consisting of flavine mononucleotide, flavine adenine dinucleotide, iron sulfur proteins, iron-sulfur protein reductase, and/or mixtures thereof.

16. A cleaning composition according to claim 1 wherein the weight ratio of pure cytochrome enzyme to electron donor compound or electron carrier is comprised between about 10:1 and about 1:1000.

17. A cleaning composition according to claim 16 wherein the weight ratio of pure cytochrome enzyme to electron donor compound or electron carrier is comprised between about 2:1 and about 1:100.

18. A cleaning composition according to claim 17 wherein the weight ratio of pure cytochrome enzyme to electron donor compound or electron carrier is comprised between about 1:1 and about 1:10.

19. A cleaning composition according to claim 1 wherein said cytochrome is alkaline.

20. A cleaning composition according to claim 1 wherein said detergent enzyme is selected from the group consisting of cellulase, lipase, protease, amylases and mixtures thereof.

21. A cleaning composition according to claim 1 wherein said bleach system is a conventional activated bleach system.

22. A cleaning composition according to claim 21 wherein said bleach system further comprises a bleaching agent selected from the group consisting of perborate, percarbonate and/or mixtures thereof and the activator selected from the group consisting of tetraacetylethylenediamine, nonanoyloxy-benzenesulfonate, 3,5-trimethylhexanoloxybenzene sulfonate and mixtures thereof.

23. A cleaning composition according to claim 1 wherein said bleach system is an enzymatic bleach system.

24. A cleaning composition according to claim 1 wherein said bleach system is a metallo catalyst based bleach system.

25. A cleaning composition according to claim 24 wherein said metallo catalyst is a transition metal complex of a macropolycyclic rigid ligand.

26. A cleaning composition according to claim 24 wherein said metallo catalyst is manganese.

27. A cleaning composition according to claim 1 which is in the form of an additive.

28. A fabric softening composition comprising a cytochrome, an electron carrier, an electron donor compound and a cationic surfactant comprising two long chain lengths.

* * * * *

UNITED STATES PATENT AND TRADEMARK OFFICE

CERTIFICATE OF CORRECTION

PATENT NO. : 6,492,316 B1

DATED : December 10, 2002

INVENTOR(S) : Ivan Maurice Alfons Jan Herbots and Alfred Busch

It is certified that error appears in the above-identified patent and that said Letters Patent is hereby corrected as shown below:

<u>Column 62,</u>
Line 32, "eight" should read -- weight --.

Signed and Sealed this

Twenty-second Day of April, 2003

JAMES E. ROGAN
*Director of the United States Patent and Trademark Office*